United States Patent
Voss et al.

(10) Patent No.: US 12,537,593 B2
(45) Date of Patent: Jan. 27, 2026

(54) THINSAT CONSTELLATIONS THAT ARE A GROUP OF SATELLITES FOR CARRYING PAYLOADS FOR EXPERIMENTATION AND DATA COLLECTION WHICH ARE LAUNCHED INTO AND ORBIT THROUGH LOW EARTH ORBIT (LEO) AND VERY LOW EARTH ORBIT (VLEO) CONDITIONS

(71) Applicants: Henry D Voss, Upland, IN (US); Jeff F Dailey, Upland, IN (US); Matthew C Voss, Upland, IN (US); Matthew B. Orvis, Upland, IN (US)

(72) Inventors: Henry D Voss, Upland, IN (US); Jeff F Dailey, Upland, IN (US); Matthew C Voss, Upland, IN (US); Matthew B. Orvis, Upland, IN (US)

(*) Notice: Subject to any disclaimer, the term of this patent is extended or adjusted under 35 U.S.C. 154(b) by 343 days.

(21) Appl. No.: 18/130,137

(22) Filed: Apr. 3, 2023

(65) Prior Publication Data
US 2024/0204864 A1    Jun. 20, 2024

Related U.S. Application Data

(60) Provisional application No. 63/326,893, filed on Apr. 3, 2022.

(51) Int. Cl.
*H04B 7/195* (2006.01)
*H04B 7/185* (2006.01)

(52) U.S. Cl.
CPC ..... *H04B 7/18515* (2013.01); *H04B 7/18513* (2013.01)

(58) Field of Classification Search
CPC ................ H04B 7/18513; H04B 7/18515
See application file for complete search history.

(56) References Cited

U.S. PATENT DOCUMENTS

| | | | | |
|---|---|---|---|---|
| 6,157,621 A | * | 12/2000 | Brown | H01Q 25/008 370/310 |
| 2007/0029446 A1 | * | 2/2007 | Mosher | B64G 1/10 244/158.1 |
| 2018/0098316 A1 | * | 4/2018 | Wang | H04L 5/0055 |
| 2018/0359656 A1 | * | 12/2018 | Liu | H04L 5/0048 |
| 2020/0198811 A1 | * | 6/2020 | Hahn, III | H02J 7/00712 |
| 2020/0252896 A1 | * | 8/2020 | Lei | H04W 74/0833 |
| 2022/0194632 A1 | * | 6/2022 | Aston | B64G 1/643 |
| 2022/0377731 A1 | * | 11/2022 | Yang | H04W 72/21 |

* cited by examiner

*Primary Examiner* — Syed Ali
(74) *Attorney, Agent, or Firm* — Ritchison Law Offices, PC; John D Ritchison

(57) ABSTRACT

An improved ThinSat constellations is a group of satellites for carrying experimentation and data collection payloads. They are launched and orbit through Low and Very Low Earth Orbit (LEO/VLEO). Thinsats solve complex communication and data retrieval issues with duplex radios, low power transceivers, and high gain tracking ground stations with infrequent and short line-of-sight overpasses. Thinsat modules can be structurally connected to provide improved data collection, workflow, redundancy, and solar/battery power plus drag systems for earlier re-entry. Thinsat includes a pair of thin patch PCB fastened on each side of a frame, power and EPS, a processor, GPS, antennas, wiring harnesses, a radio, solar cells, various sensors, and space for a selected payload. Thinsat is a cost effective means of space research with sensor testing, ground station calibration, and a variety of educational and commercial missions.

17 Claims, 30 Drawing Sheets

Figure 1:
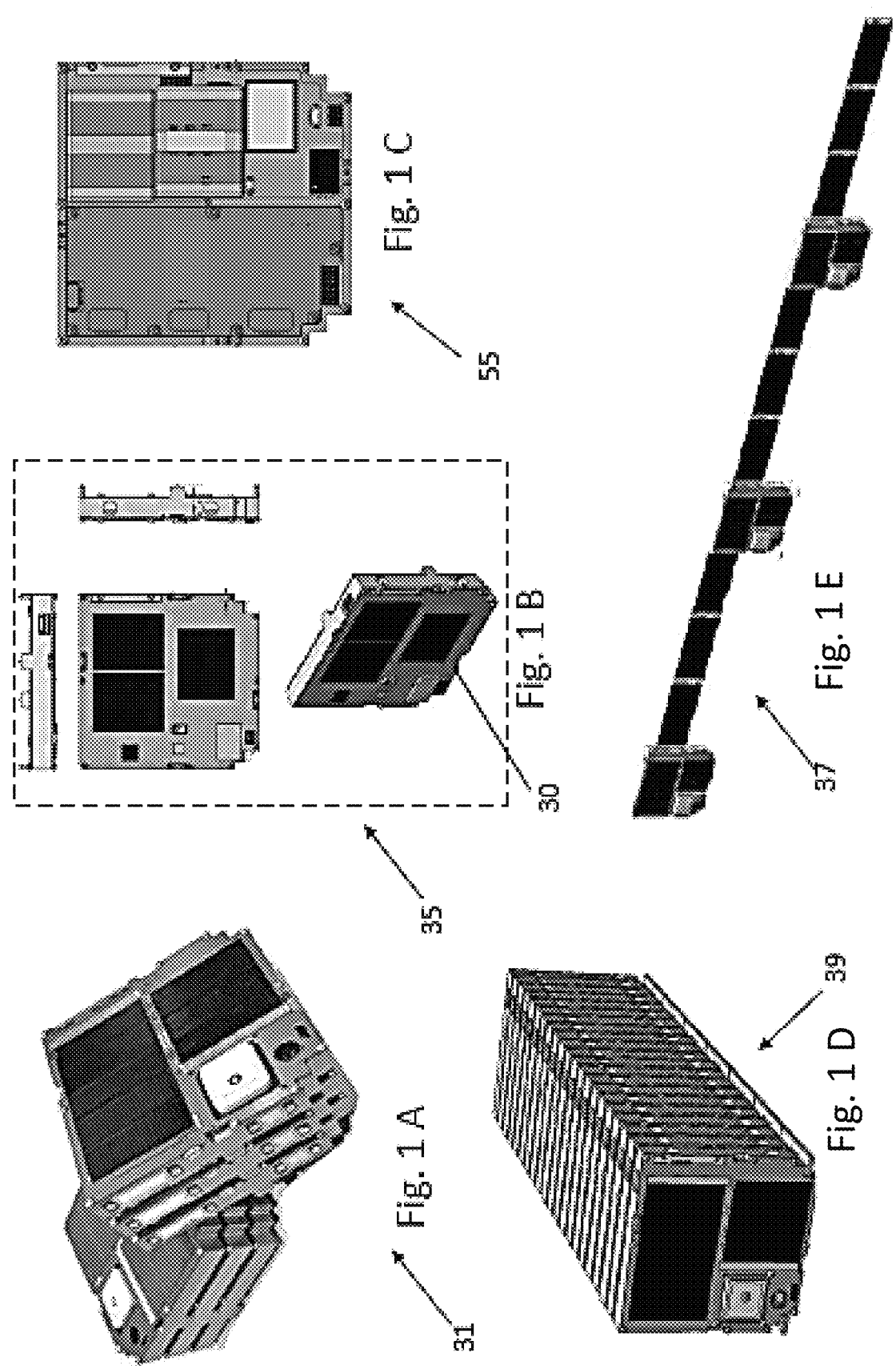

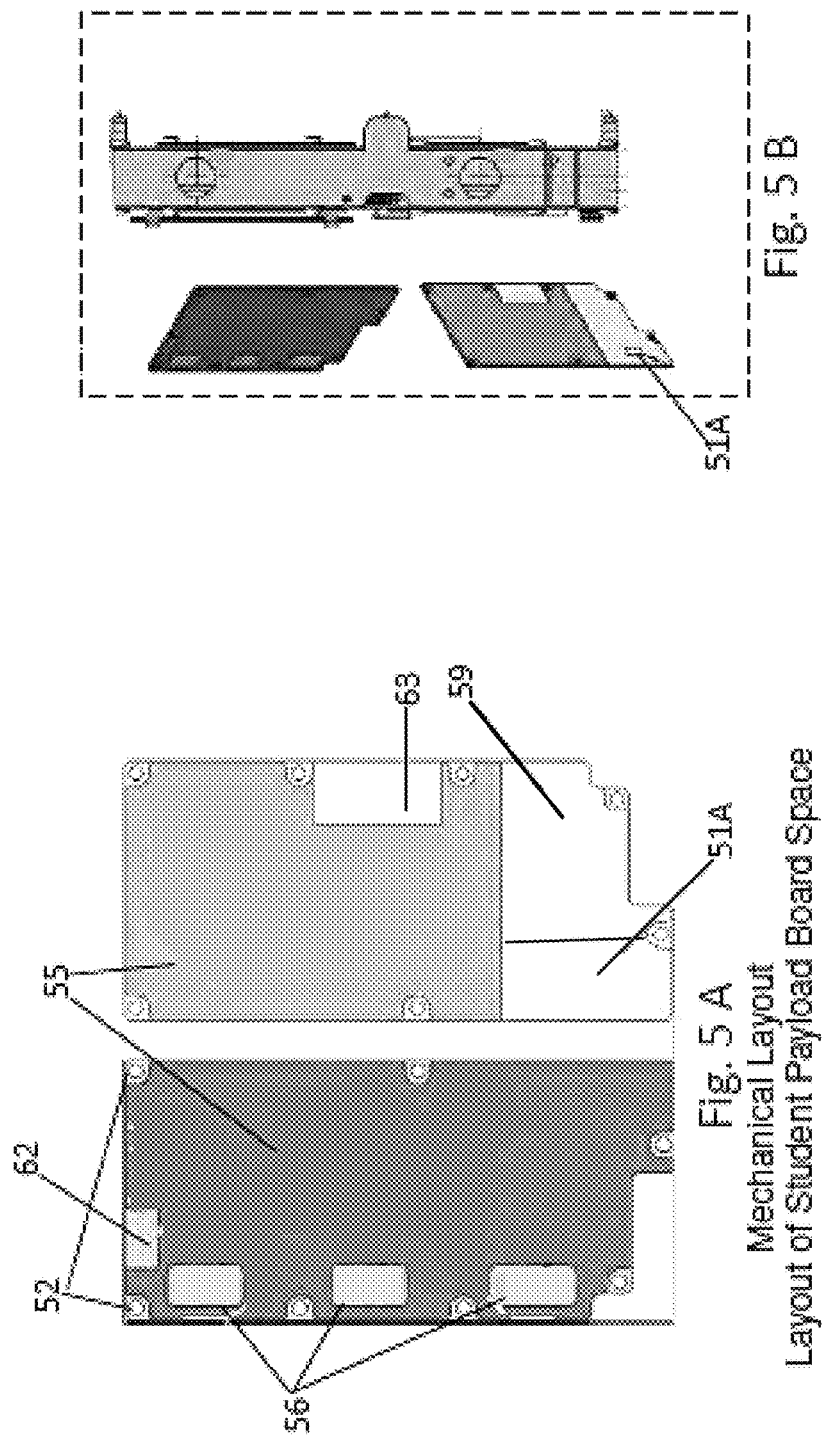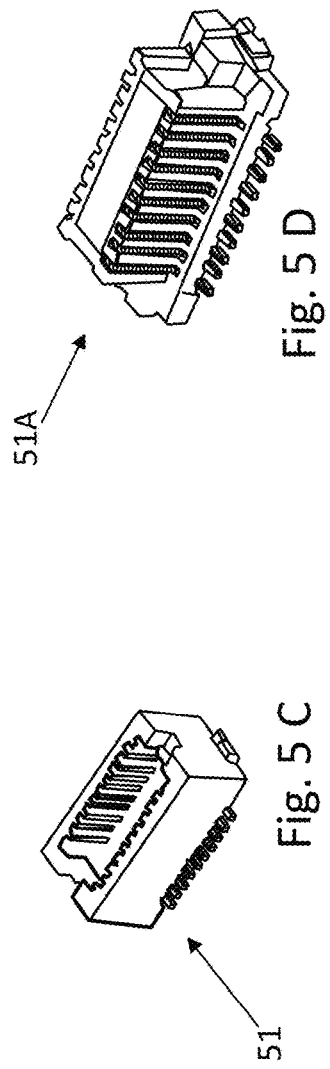
Fig. 5 A Mechanical Layout
Layout of Student Payload Board Space
Fig. 5 B
Fig. 5 C
Fig. 5 D

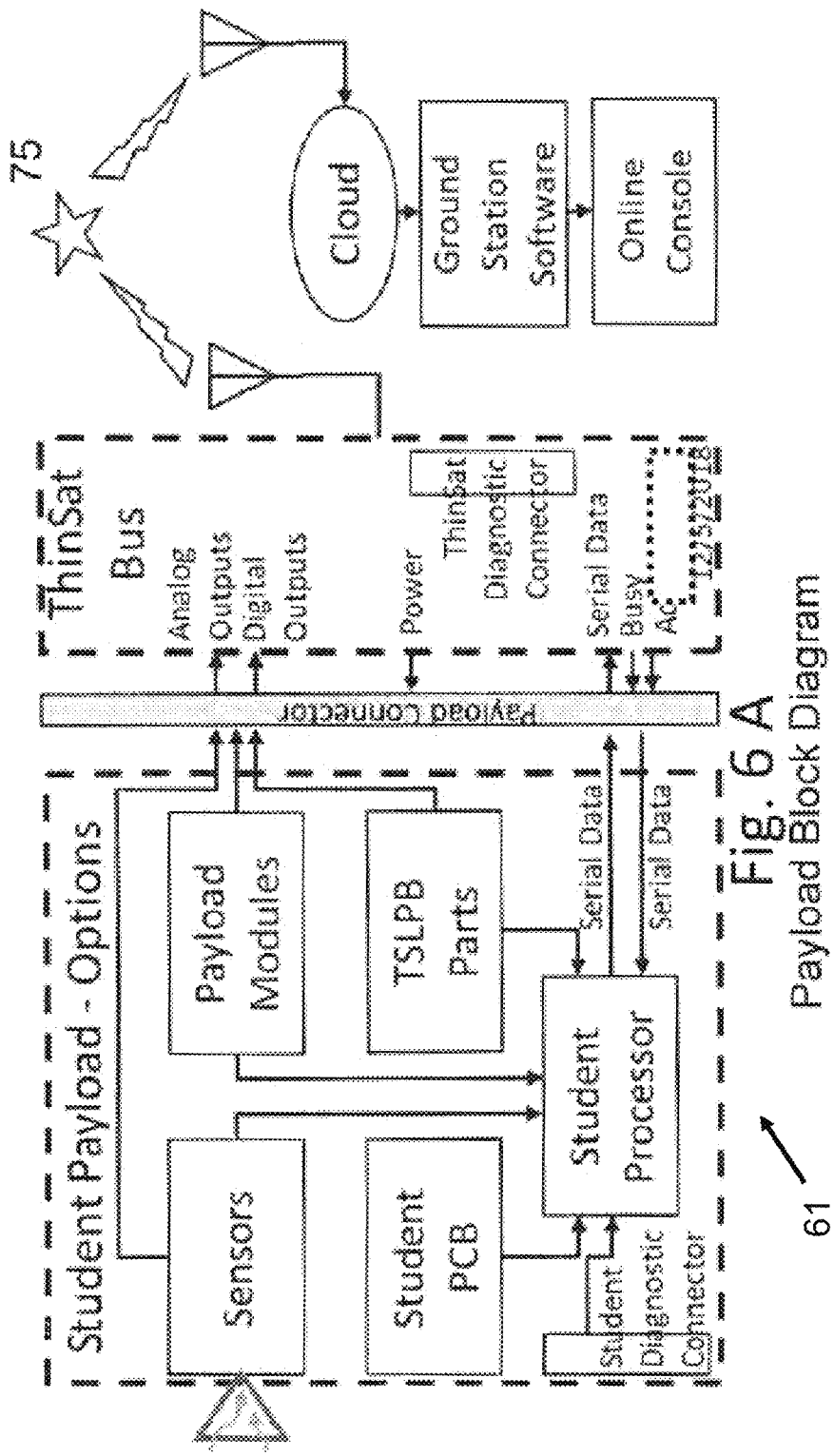
Fig. 6A Payload Block Diagram

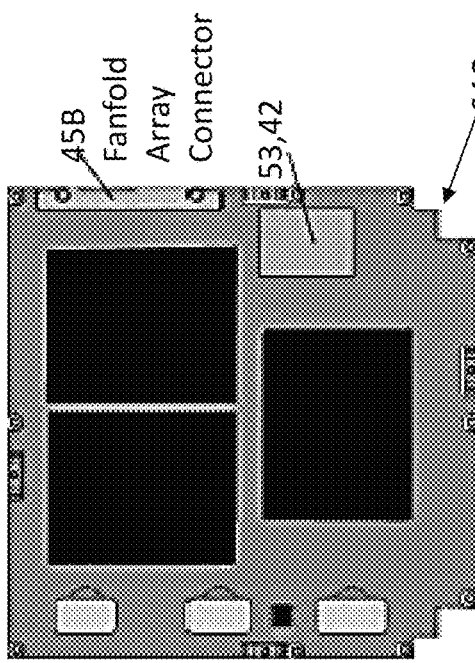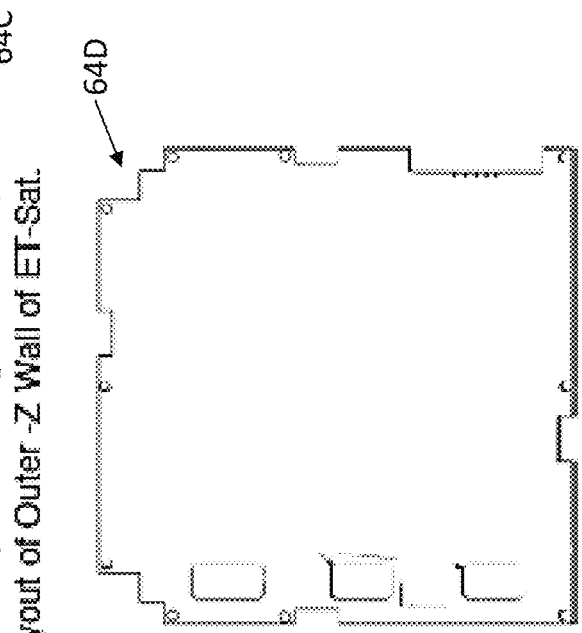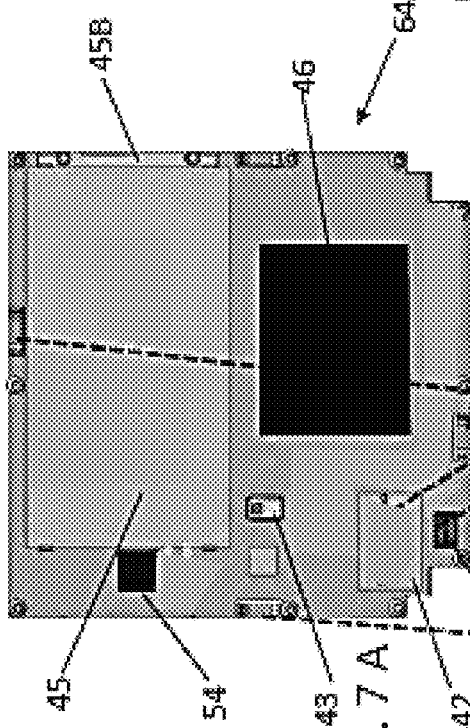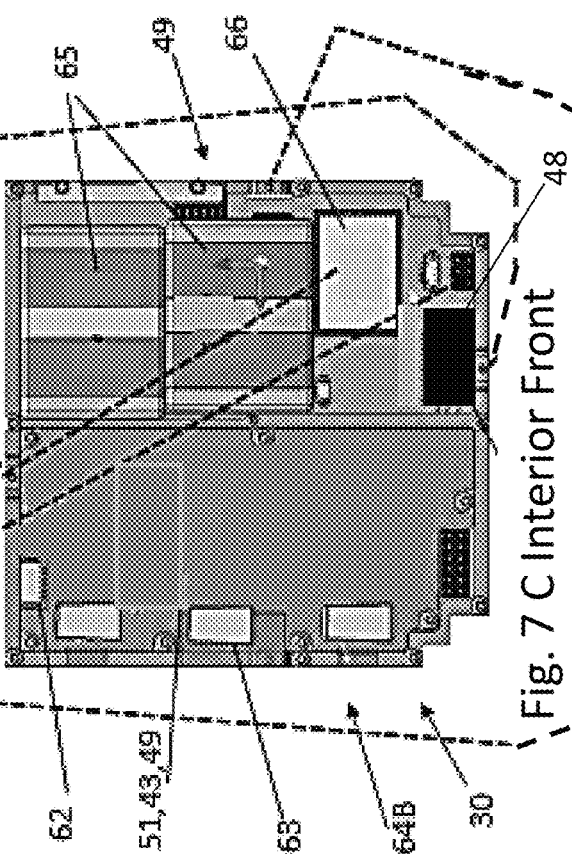
Fig. 7A
Fig. 7B System layout of Outer -Z Wall of ET-Sat.
Fig. 7C Interior Front
Fig. 7D Interior Back Phase 2 Engineering Unit Interface Diagram and Data Flow Phase 3 Flight Unit Data Flow Phase 1 Data Flow Phase 3 Flight Unit Interface Diagram

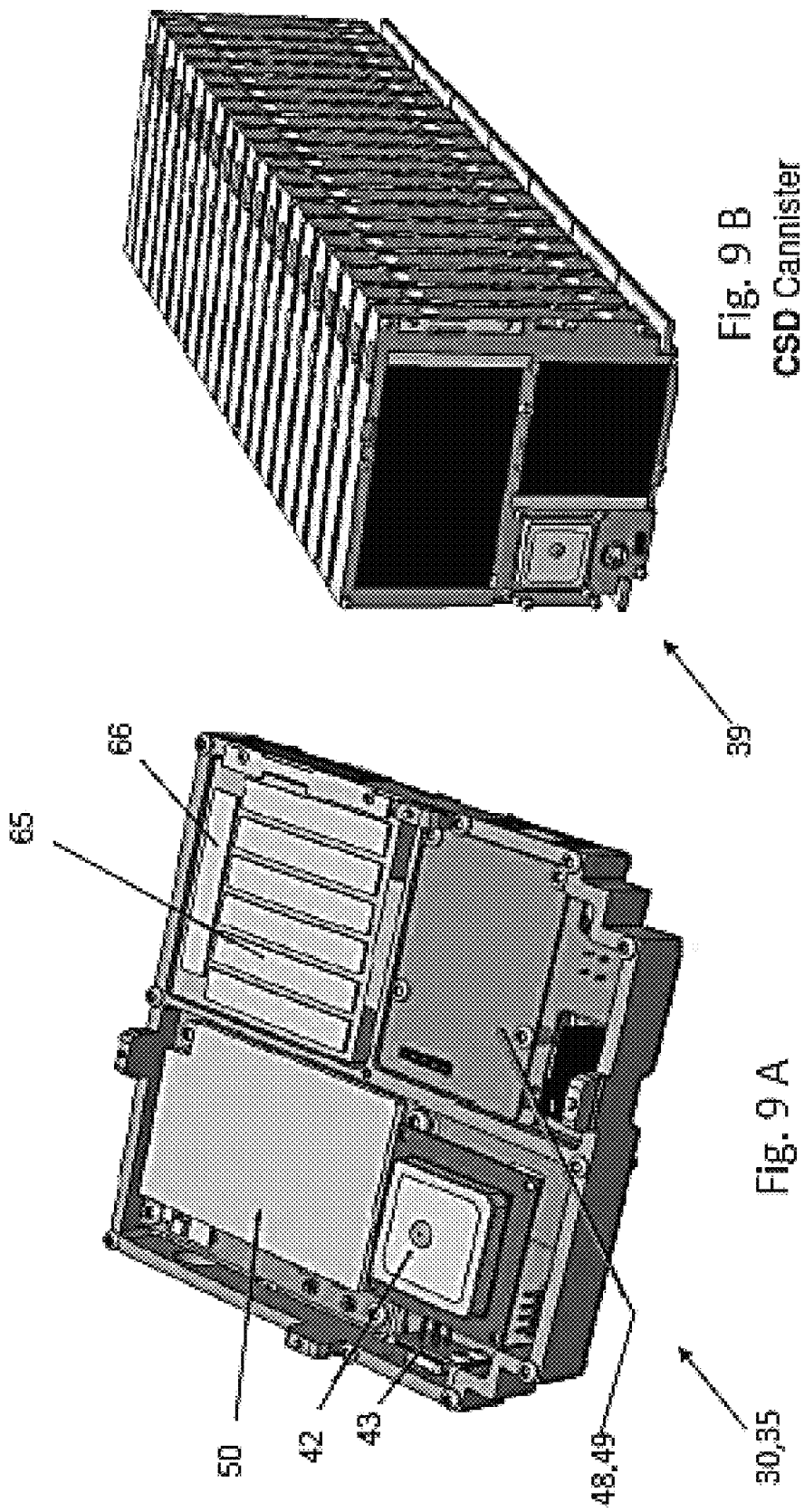

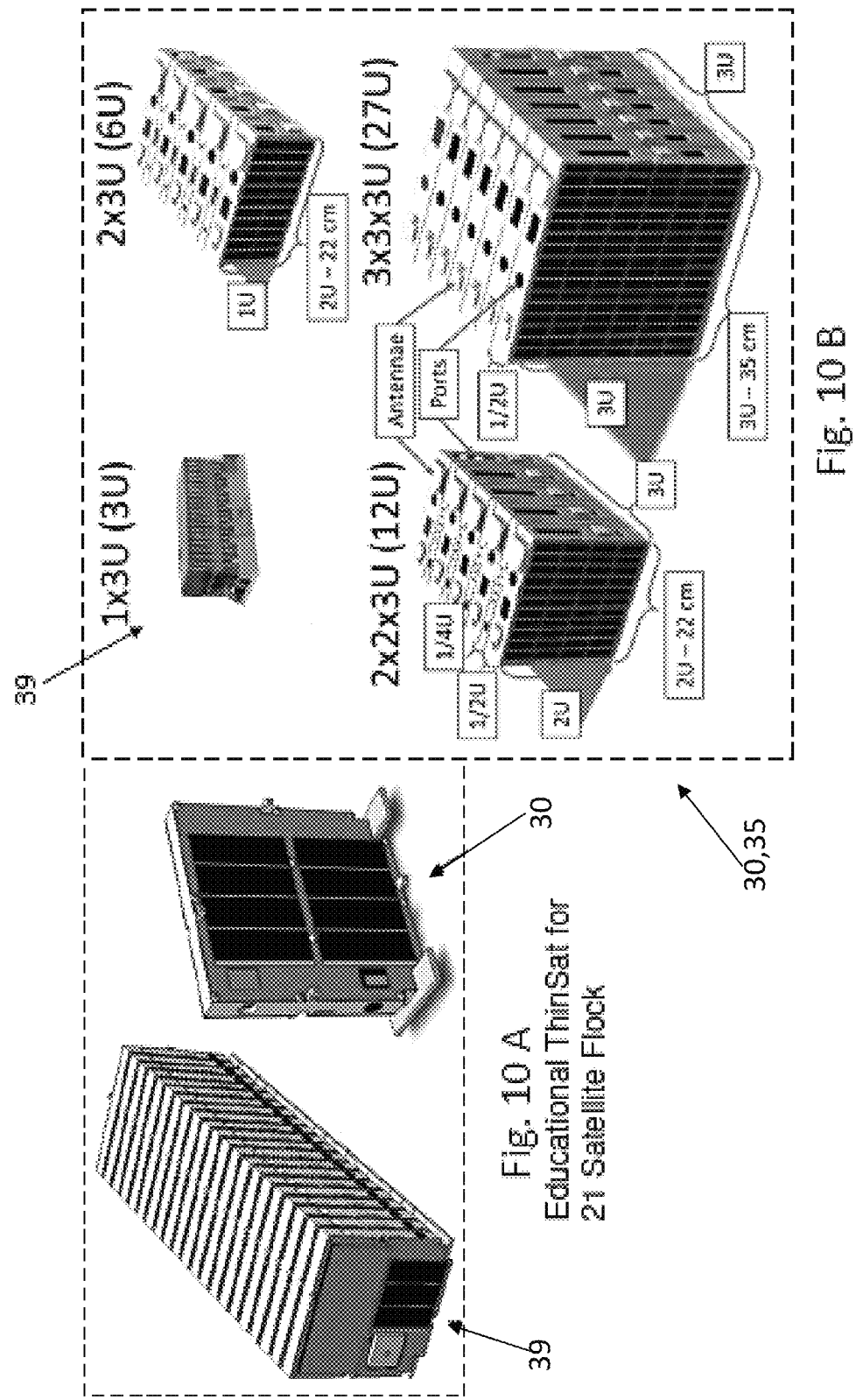

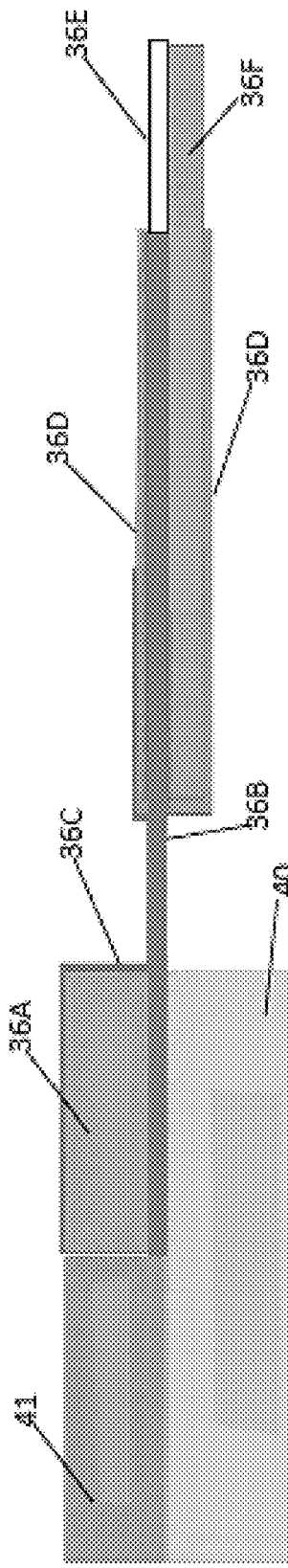
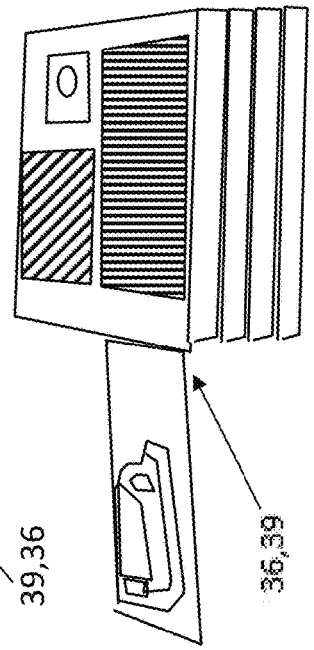
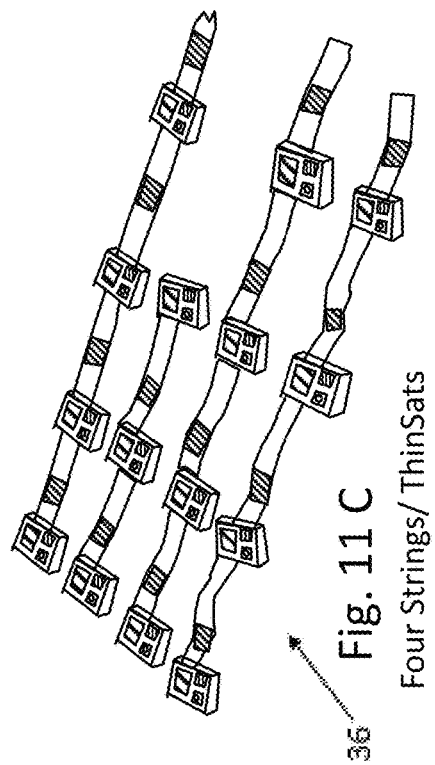
Fig. 11 A Block layout of the Foldout hinge
Fig. 11 B 3U stack of 21 ThinSats mounted to a Test Fixture secured to the vibration table for testing. All three 3U CSDs passed testing for the Northrop Grumman Antares rocket.
Fig. 11 D Student Foldout boom
Fig. 11 C Four Strings/ ThinSats System layout of ThinSat.
Showing the optional PPOD designed version.

CSD Canister launcher standard for the ThinSats.
21 Thinsats can fit in one 3U CSD launcher.

ThinSat and 3U Stack of 18 ThinSats designed for the PPOD launcher.

3 ThinSat Flocks & 12 Strings in Constellation

Autonomous NODE ThinSat Configuration

Flipper Orbital Configurations

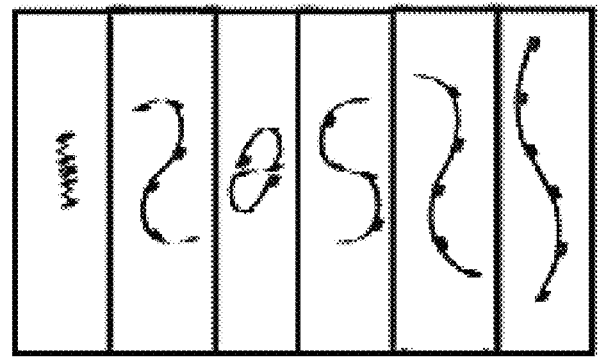
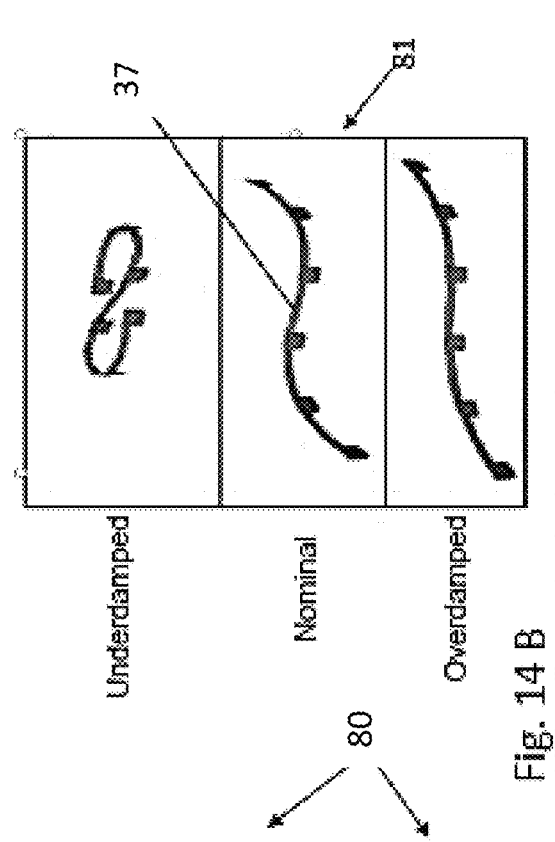
Fig. 14 B
Video Dynamic deployment
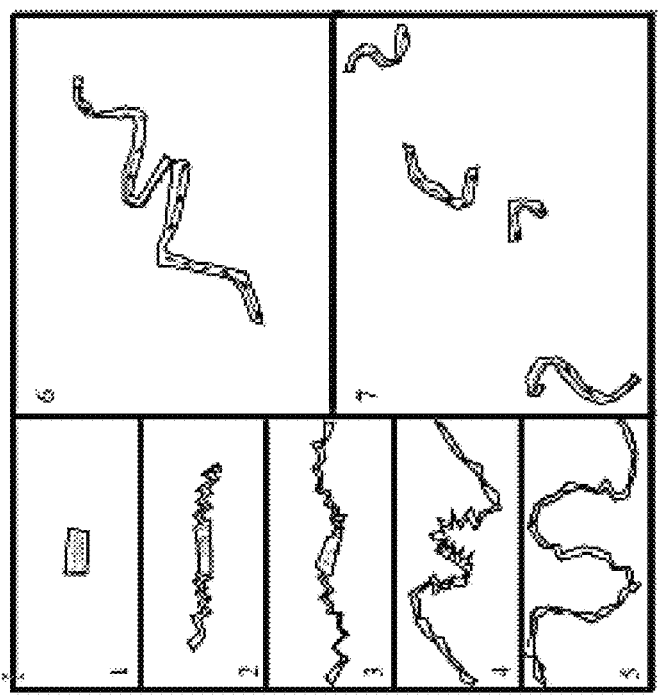
Fig. 14 A
Dynamic deployment of a full stack of 21 ThinSats, in 4 strings over time. Note the wave formations, and the snakelike twisting of panel 3.
Fig. 14 C Baseline NODE configuration showing the box solar array foldout and radar reflector on the right.

Snapshots of Baseline NODE configuration unfolding and showing the box

ThinSats loaded
Into Deployer

CSD Cannister

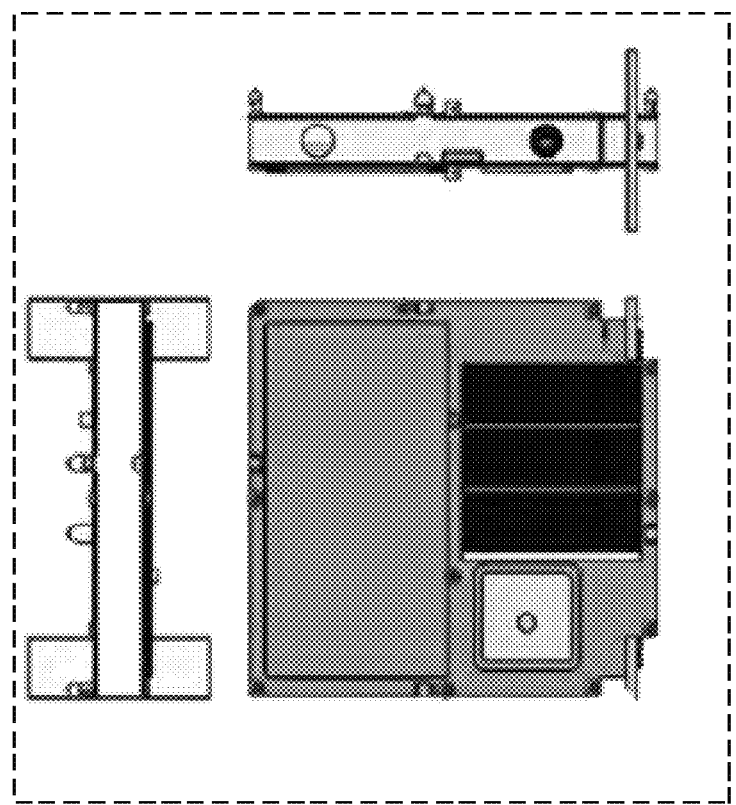
Fig. 17 C
ThinSat with Rails Dimensions (mm)
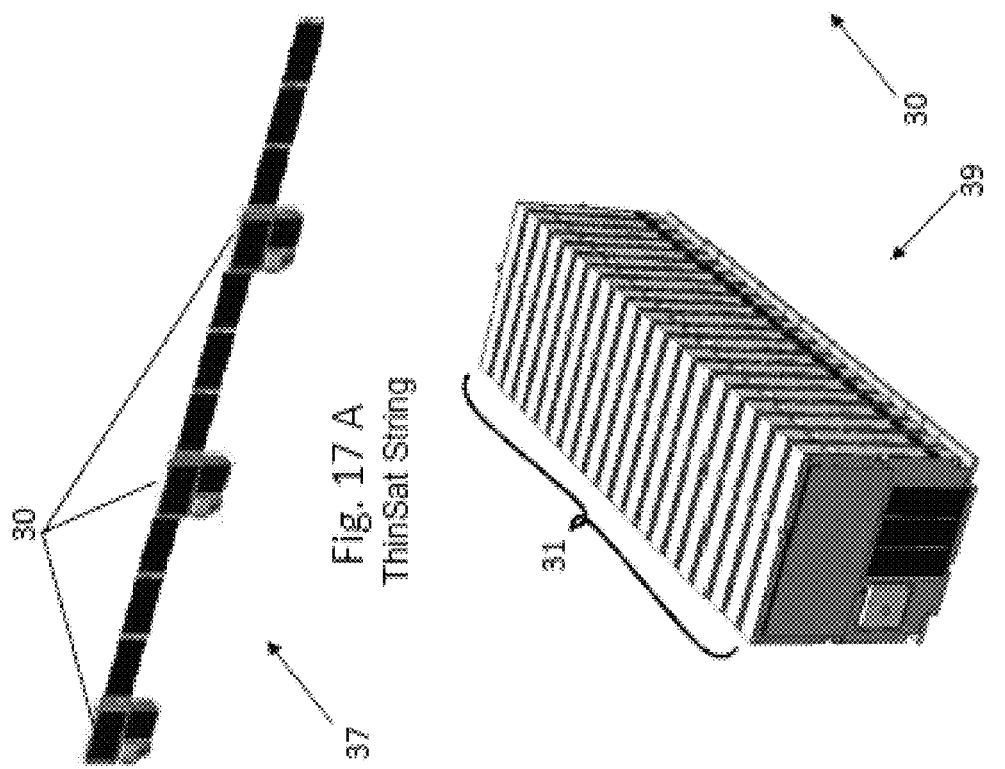
Fig. 17 A
ThinSat String
Fig. 17 B
3U "Stack" of 21 ThinSats

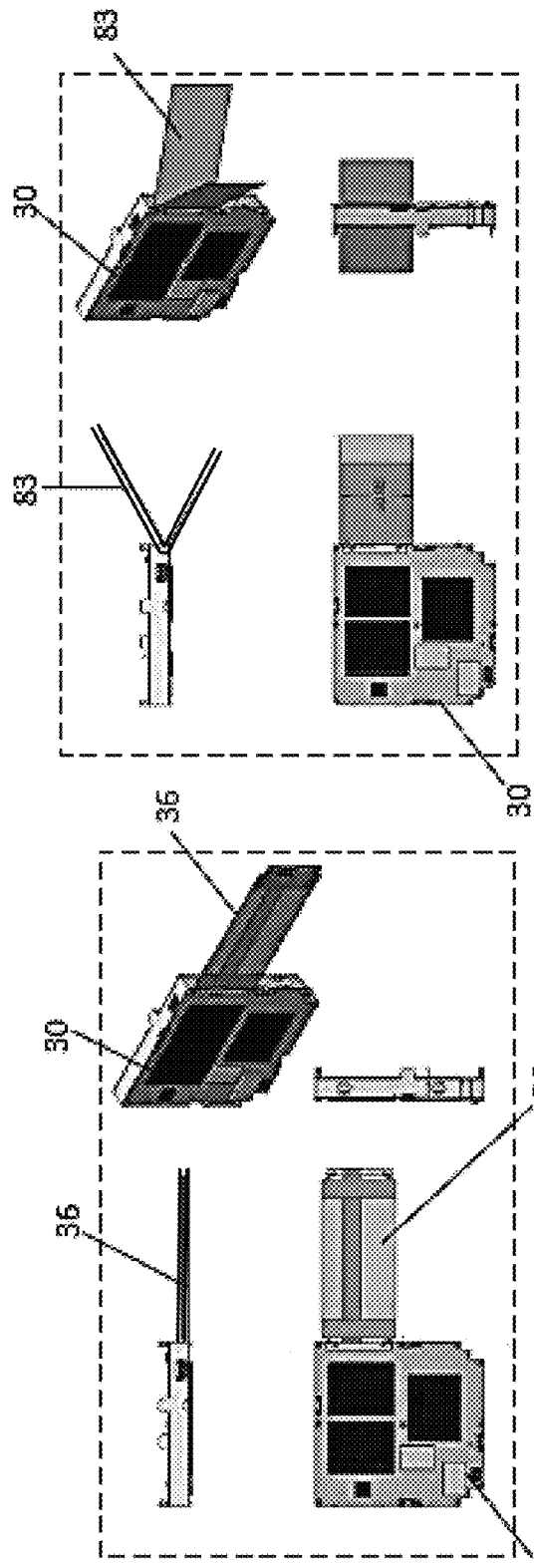
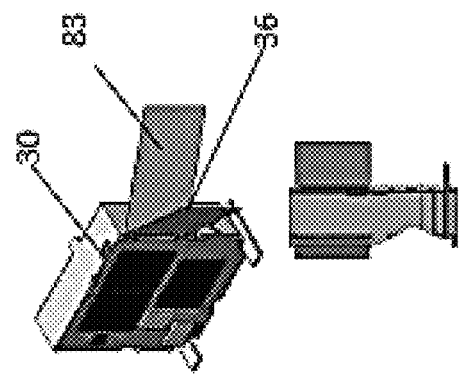
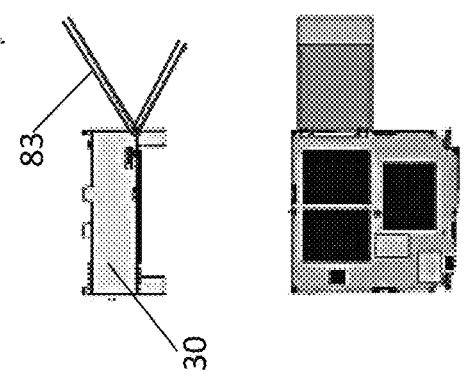
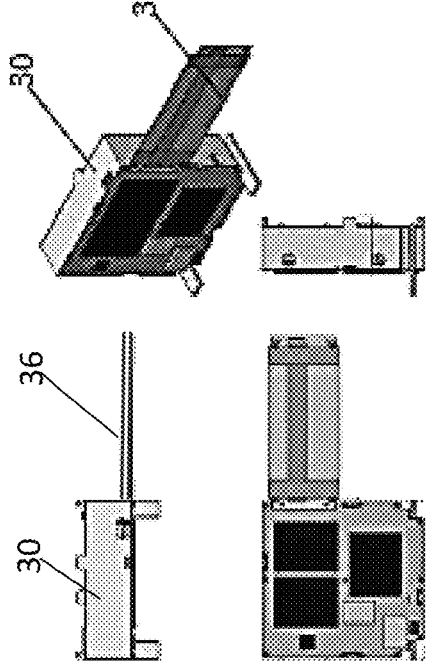

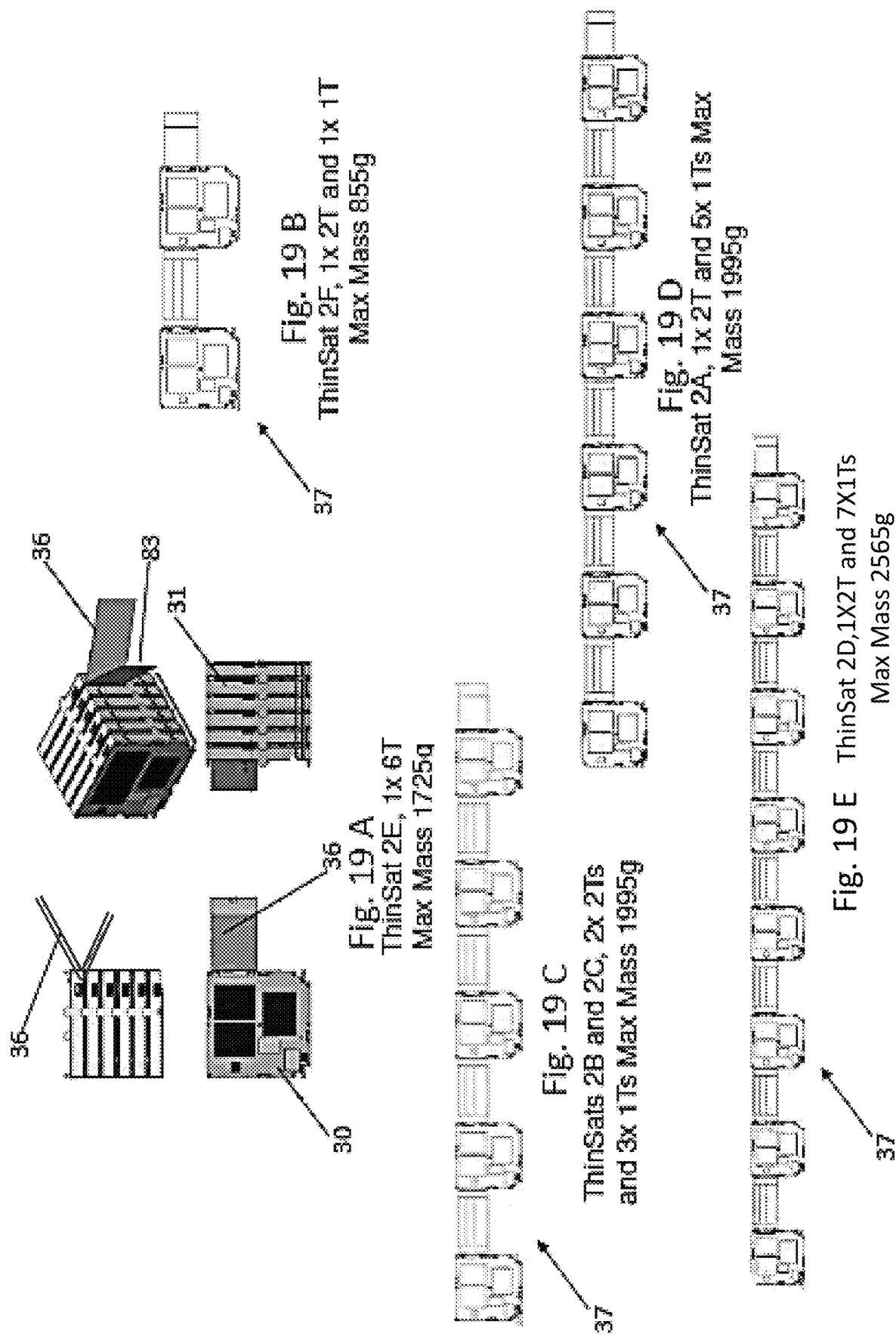

Fig. 20B Prior Art — Launch Profile
Fig. 20C Prior Art — ThinSat manifest on NG-11 launch Globalstar constellation of satellites for Global coverage and real-time 24/7 visibility.

Overall Communications Architecture.
Flow Diagram and Data transfer from

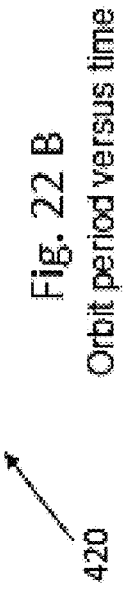
Fig. 22 B
Orbit period versus time
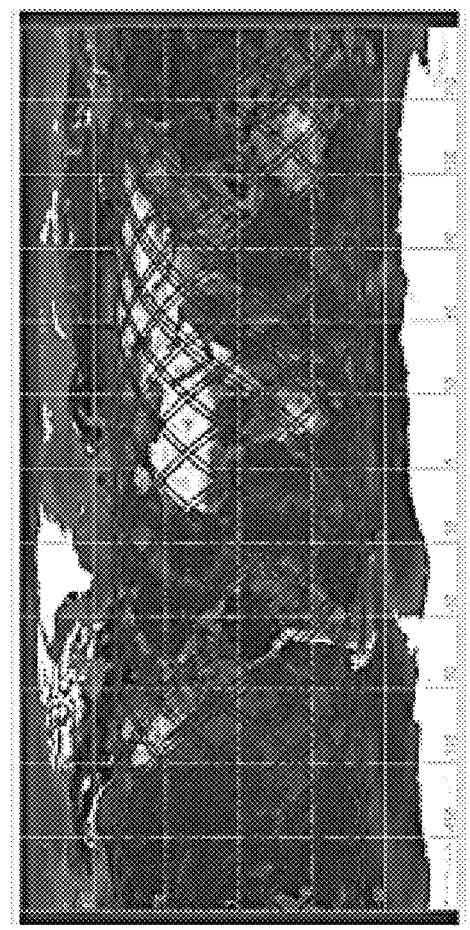
Fig. 22 A
ThinSat orbits for 50hr life using NASA's General Mission Analysis Tool (GMAT) software.
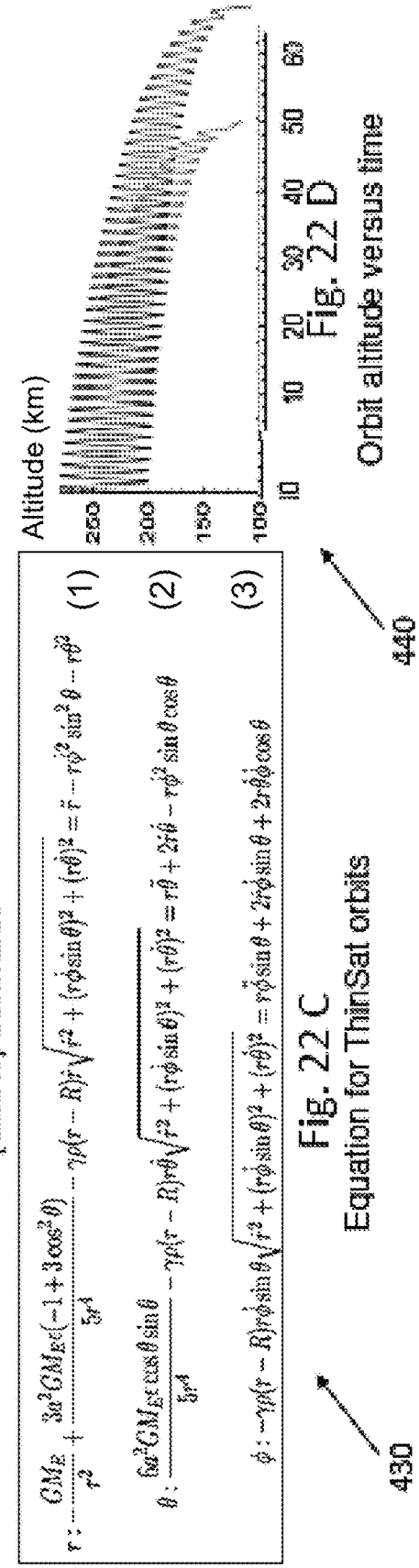
Fig. 22 D
Orbit altitude versus time
Fig. 22 C
Equation for ThinSat orbits 450
Simplex Coverage maps show good global coverage
Red dots show packet transmission.

460

Black Box Particle Detector option: Dose
Coverage option for Black Box
GEARRS2 energetic particle data coverage map Terminator periodic variation with ThinSat
solar cell data (zero points in eclipse Energetic particle measurements for
540 minutes from six ThinSats for comparison.

S81-1 SEEP Plasma and Energetic particle Space Weather nighttime measurements

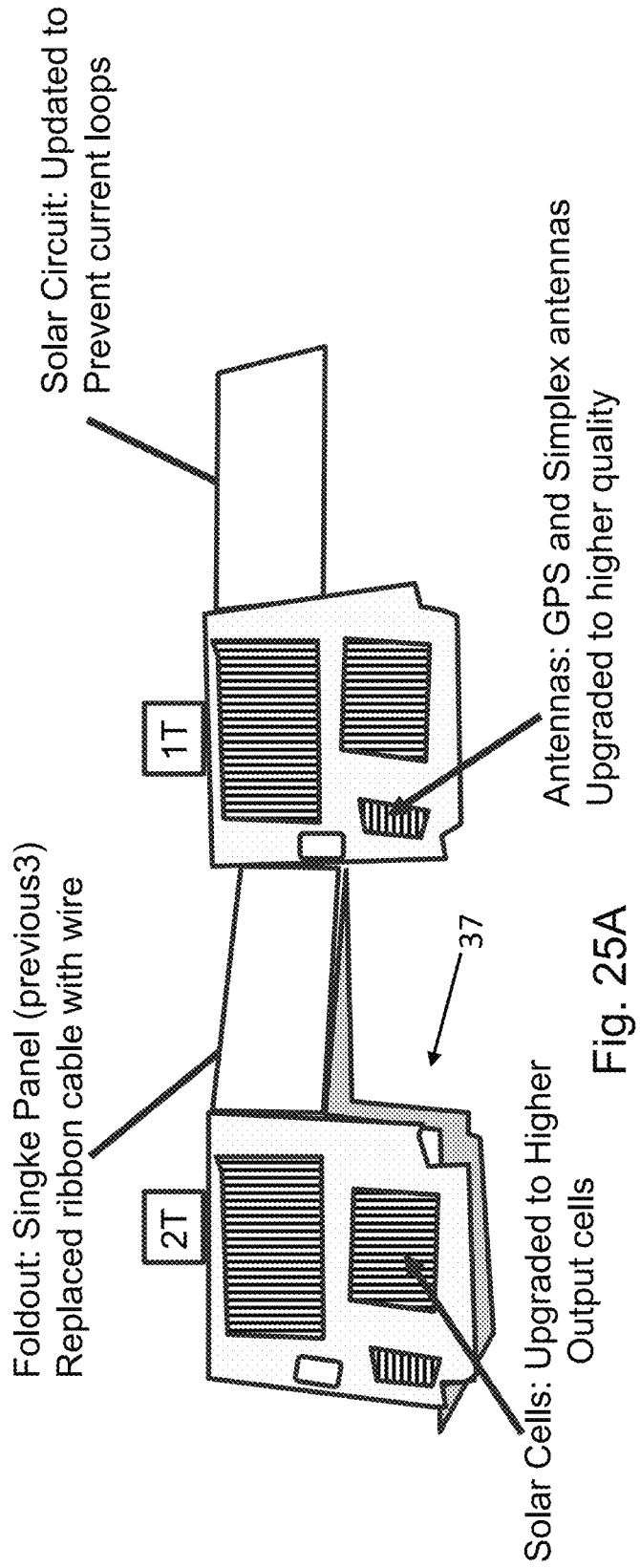
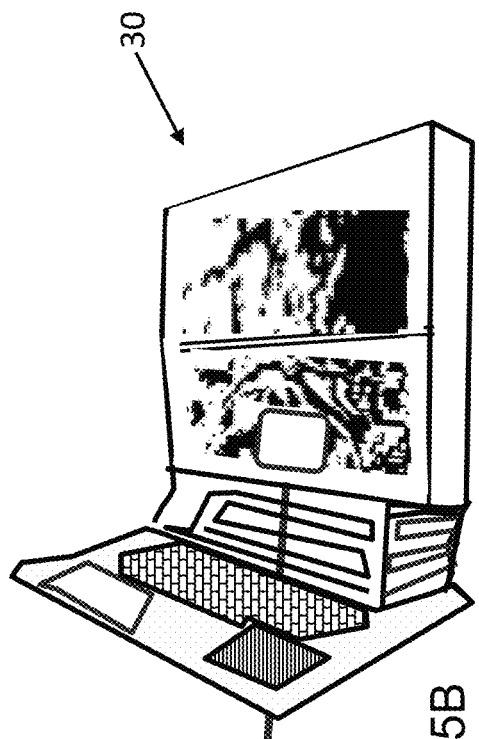
Fig. 25A
Fig. 25B
ThinSat Improvements

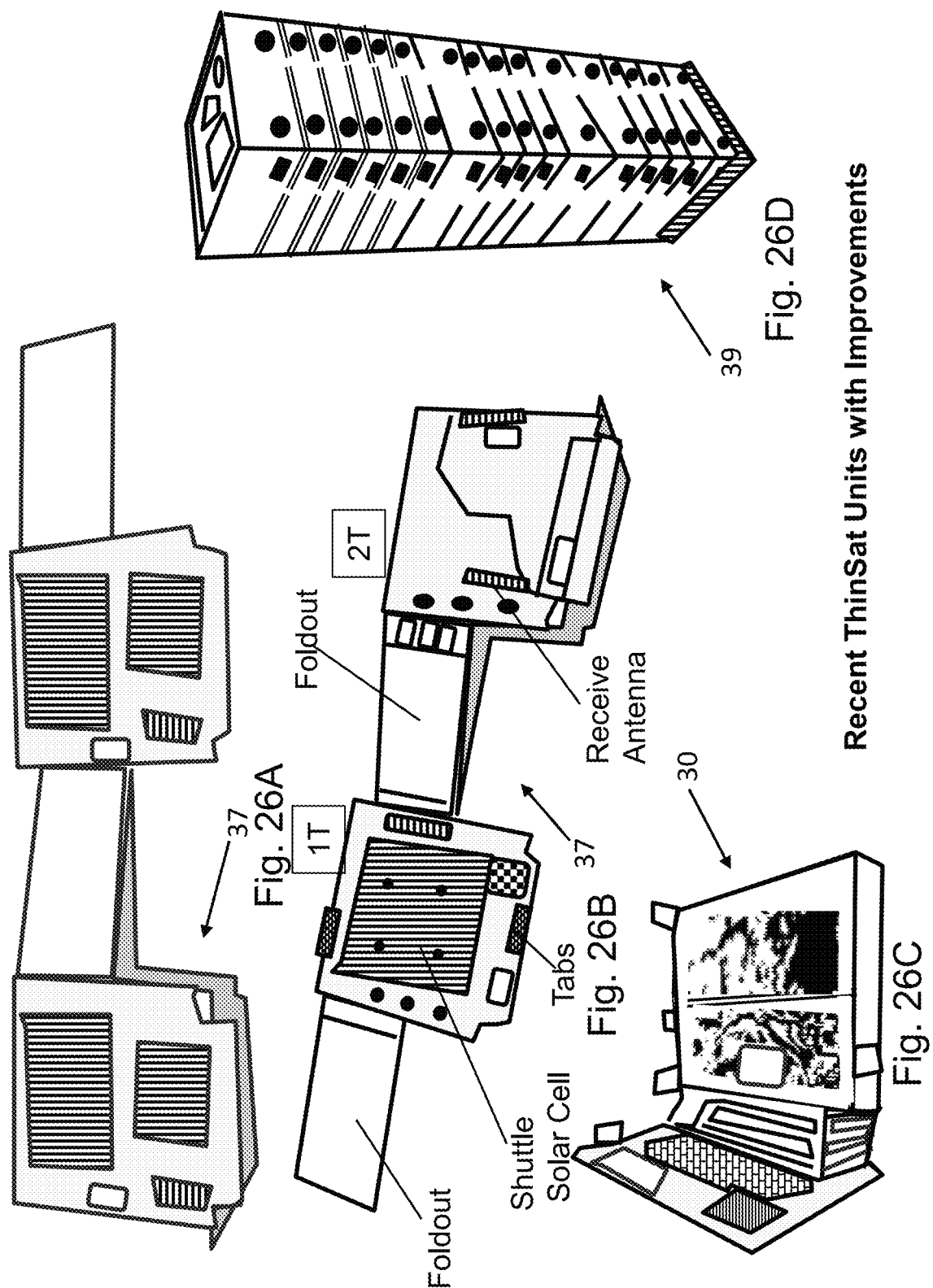

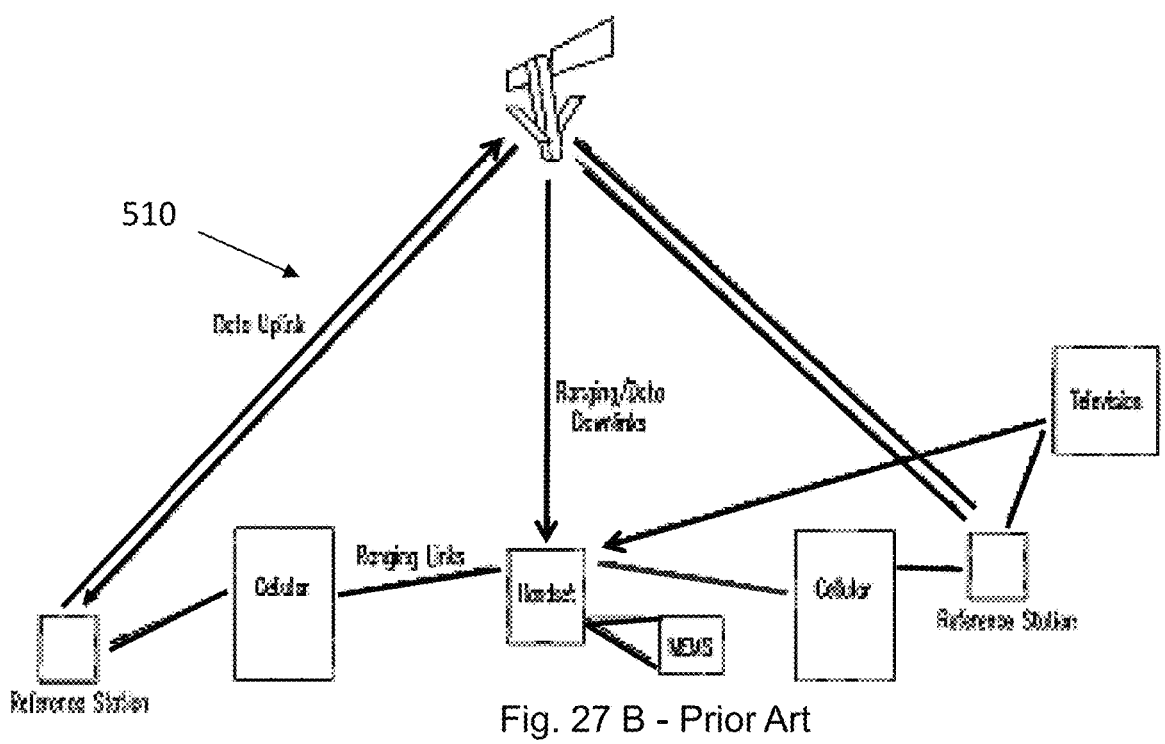
Fig. 27 B - Prior Art
US 7,583,225
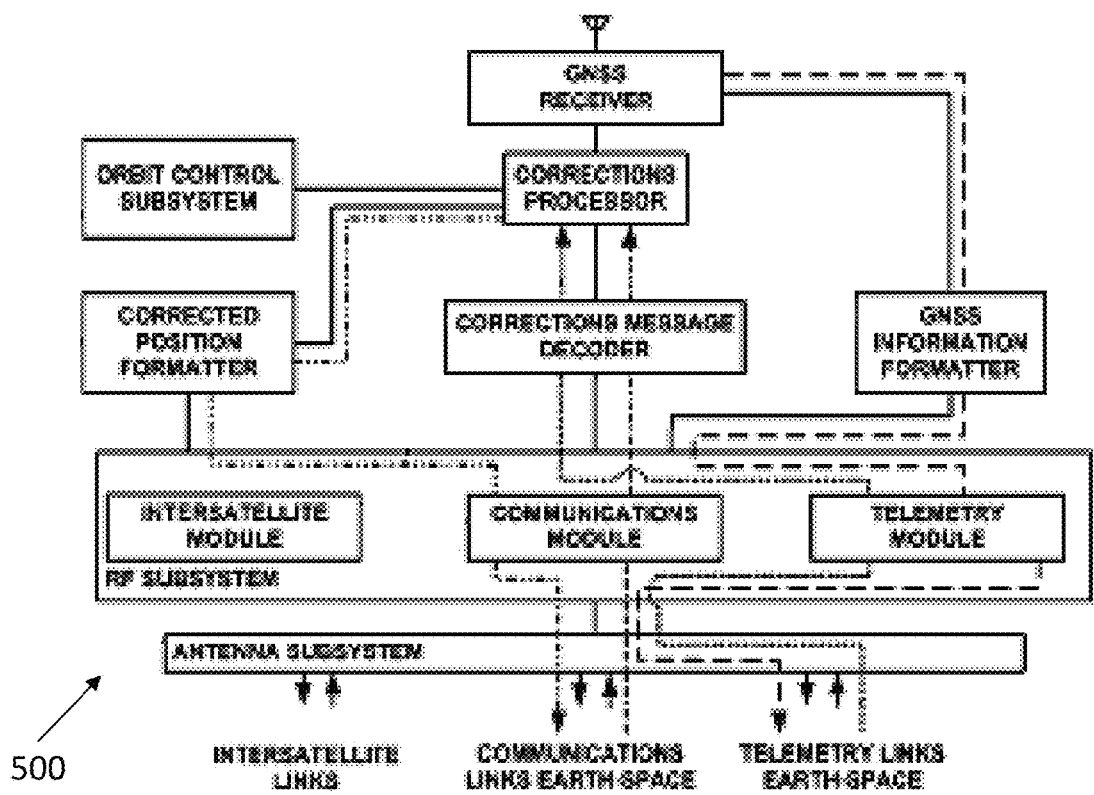
Fig. 27 A - Prior Art
US 9,121,932

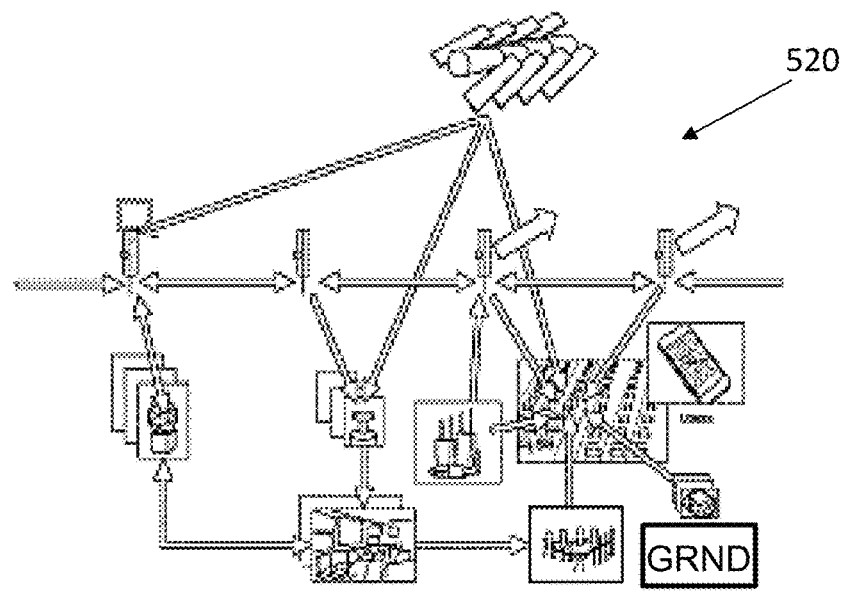
Fig. 27 C - Prior Art
US 11,073,622
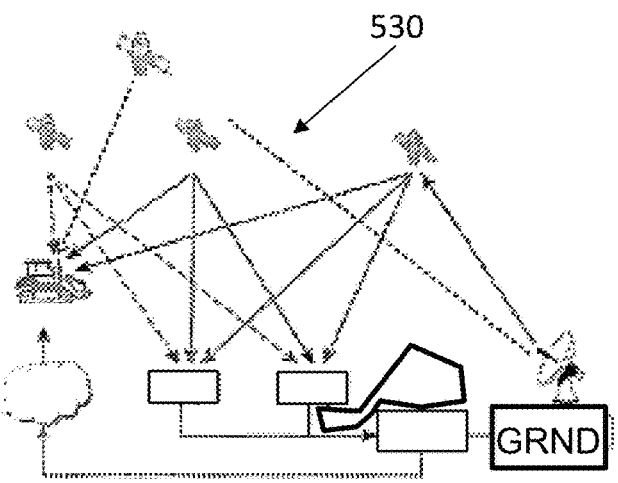
Fig. 27 D - Prior Art
US 11,226,416
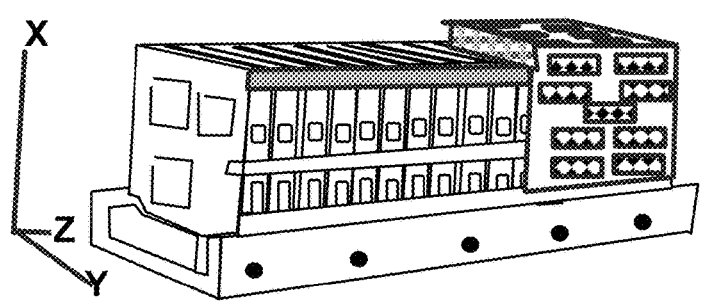
Fig. 27 E - Prior Art
TSAT (2U) and PhoneSAT (1U)
In P-Pod launcher during final
integration at Cal Poly

THINSAT CONSTELLATIONS THAT ARE A GROUP OF SATELLITES FOR CARRYING PAYLOADS FOR EXPERIMENTATION AND DATA COLLECTION WHICH ARE LAUNCHED INTO AND ORBIT THROUGH LOW EARTH ORBIT (LEO) AND VERY LOW EARTH ORBIT (VLEO) CONDITIONS

CROSS-REFERENCE TO RELATED APPLICATIONS

This application claims the benefit of United States Provisional Patent Application with Ser. No. 63/329,447 63/326,893 filed Apr. 3, 2022, by Hank D. Voss et al. The application is entitled "Improved ThinSat Constellations that are a group of satellites for carrying payloads for experimentation and data collection which are launched into and orbit through Low Earth Orbit (LEO) and Very Low Earth Orbit (VLEO) conditions". Note that Hank D. Voss is one and the same person as Henry D. Voss.

FEDERALLY SPONSORED RESEARCH

This invention was made with Government support under contract No. FA864921P0800 awarded by AFRL/US Air Force. The Government has certain rights in the invention.

FIELD OF INVENTION

This invention relates to an improved ThinSat constellations that are a group of satellites for carrying payloads for experimentation and data collection which are launched into and orbit through Low Earth Orbit (LEO) and Very Low Earth Orbit (VLEO) conditions. This relates to a satellite for experimentation and data transmission from Low Earth Orbit (LEO) and Very Low Earth Orbit (VLEO). relates generally to satellite navigation and satellite-based navigation techniques. The technical field relates to satellite positioning and use in experimentation in a LEO satellite. It concerns a method for placing a plurality of satellites in a Low Earth Orbit.

SEQUENCE LISTING OR PROGRAM

None.

BACKGROUND—FIELD OF INVENTION AND PRIOR ART

As far as known, there are no improved ThinSat constellations or the like that are a group of satellites for carrying payloads for experimentation and data collection which are launched into and orbit through Low Earth Orbit (LEO) and Very Low Earth Orbit (VLEO) conditions. It is believed that this product is unique in its design and technologies.

Background

Figure 6:
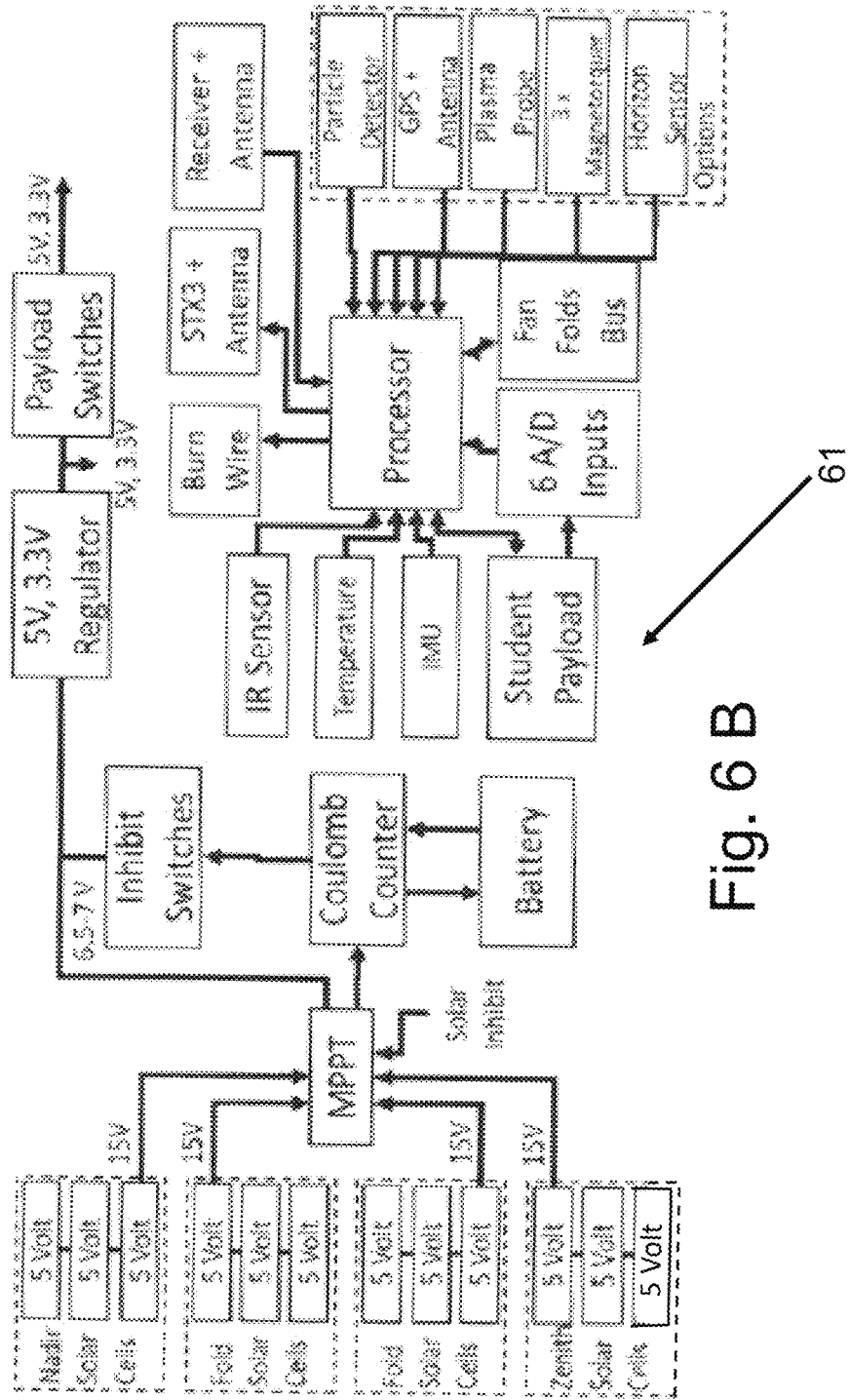

Low Earth Orbiting (LEO) satellites are satellites that orbit approximately 160-2000 km above the surface of the earth. THINSAT HERITAGE FOR BLACK BOX—The Black Box technology has evolved from the ThinSat production line which has embraced mass production and the miniaturization of electronics and mechanisms (FIG. 6). ThinSats have proven to be ideal for STEM learning, research applications, and exploring the new region from 100 to 350 km for climate, ionospheric and DoD discovery THINSAT HERITAGE—The TSAT and GEARRS pioneered the CubeSat-NSL/Globalstar communication network for global and real-time (low latency) visibility of satellites with no required CubeSat ground stations. With mass production and the miniaturization of electronics and mechanisms very low cost and powerful ThinSats can be manufactured. The ThinSat is ideal for STEM learning, Research applications, and exploring the new region from 100 to 350 km for climate, ionospheric and DOD discovery with little worry for orbital debris problems because of short lifetimes (<1 month).

The introduction of the CubeSat has radically increased the accessibility of space. CubeSats took advantage of cheap ride sharing opportunities to launch small, simple, high-risk missions with standardized designs. Their low cost allowed them to be developed by organizations with limited financial resources such as universities, schools and small businesses. This success has created new challenges as more universities are transitioning their efforts from educational programs towards research and new industries based around the commercial applications of CubeSats. As a result, the average CubeSat's have become more complex leading to higher costs and longer development times. Significant barriers to entry such as ground communication equipment (with associated knowledge of satellite communication and mission operations) and significant technical knowledge for space systems for integration and assembly still are issues for CubeSat developers.

Originally conceived by Prof. Robert Twiggs, the PocketQube was a first attempt to create a satellite with an even smaller form factor to build on the successes of the CubeSat standard. Specifically, the goal was to increase educational opportunities around spacecraft. PocketQubes have been launched and demonstrated successfully on orbit several times. However, they never reached the wide spread acceptance that CubeSats did. This was mainly due to fact that PocketQubes did not have many significant advantages over CubeSats. They were still relatively complex to fabricate and assemble and required dedicated deplorers. Using the lessons learned from the PocketQube, the Improved ThinSat unit mitigates their deficiencies and adds new capabilities. The standard is also pared to a program which significantly lowers the barriers to entry and provides plentiful launch opportunities. The Improved ThinSat unit continues to provide opportunities for students and other users, including: (1) decreasing the spacecraft development cycle time; (2) reducing the complexity and increase reliability; (3) providing regular launch opportunities, thereby increasing space access; (4) engaging students earlier in their education (4th to 12th grade); (5) reducing the burden of paperwork and licensing requirements; (6) mitigating the threat of space debris with short orbital life; (7) reducing the overall cost of spacecraft development and access to space; (8) creating a precursor program to CubeSat programs; and (9) creating a smaller spacecraft platform for valuable space research.

It is essential that the data from all satellite ground stations be unified and time-synchronized for multipoint measurements. The EyeStar radios and Globalstar-NSL ground network greatly simplify data correlation with satellite positioning. Using a communication model like the one employed on Improved ThinSat unit promises high reward potential as the opportunity for mission success greatly increases because of nearly global coverage of spacecraft telemetry with low latency, and no mission specific ground infrastructure beyond a data server. The Thinsat satellite was designed to better understand the E and F region global ionosphere below 325 km and down into the heating region below 120 km. This uncharted new region of investigation is called the Extremely Low Earth Orbit (or ELEO) region, and is relevant to the understanding of space weather, atmospheric models, climate, global electric circuit, remote sensing, and intelligence gathering. To accomplish this goal, a ruggedized radio system enhances ELEO science missions; it can transmit satellite data in nearly real time to the internet for any location on earth.

Problem Solved

The improvement and problem solved as to Improved ThinSat unit are many. Problems leading to small satellite failure include the complexity of the communication system; a sub-system that involves low power transceivers (and low mass and size), spacecraft protruding antennas, and high gain tracking ground stations with infrequent and short line-of-sight overpasses. In addition, there are many difficulties associated with international radio community coordination, preventing downward spurious contamination for radio astronomy antennas, personnel time required for operating ground stations, deploying antennas, using Two Line Elements (TLE) to find satellites and point ground antennas, time synchron-ization of data sent through multiple ground stations and organizations worldwide, and flight communication and ground station software systems. In addition, commanding a tumbling satellite during launch and early operations can be difficult, especially when transceiver power is low and short overpasses are spaced several hours apart. The ThinSat Units forged ahead and addressed many of these and other issues. However, now there are other issues to address as well. The improved ThinSat unit has a lengthy list of advantages (see below). The significant improvements include: Improved ThinSat unit modules can also be tied together structurally in improved ways to directly or in groups (Strings) to provide even improved data collection, workflow, redundancy, and solar/battery power; Improved the foldout design to stable the flight; Improved the circuit layout to prevent solar loops; Improved the solar arrays; Improved the antennas; Improved the GPS; Improved the spacing on bus; and Improved the manufacturing on the Improved ThinSat unit.

Prior Art

A novelty search revealed no other prior art that conflicts with this special eye frame leveling device. The prior art found included:
  A. U.S. Pat. No. 9,121,932 issued Sep. 1, 2015 to Janky et al.—REFINING A POSITION ESTIMATE OF A LOW EARTH ORBITING SATELLITE. In a method for refining a position estimate of a low earth orbiting (LEO) satellite a first position estimate of a LEO satellite is generated with a GNSS receiver on-board the LEO satellite. Corrections are received at the LEO satellite. The corrections are processed on-board the LEO satellite such that a corrected LEO satellite position estimate of the LEO satellite is generated for the first position estimate.
  B. U.S. Pat. No. 7,583,225 issued Sep. 1, 2009 to Cohen et al.—LOW EARTH ORBIT SATELLITE DATA UPLINK. A low earth orbit (LEO) satellite data uplink is provided. In one embodiment, a method of providing a data uplink to a LEO satellite includes determining position information using a LEO signal received from the LEO satellite, a first ranging signal received from a first ranging source, and a second ranging signal received from a second ranging source. The method also includes determining a timing advance parameter using a local clock reference and a LEO satellite clock reference. The method further includes preparing a data uplink signal comprising uplink data to be broadcast to the LEO satellite. In addition, the method includes synchronizing the data uplink signal with the LEO satellite using the timing advance parameter. The method also includes broadcasting the data uplink signal to the LEO satellite.
  C. U.S. Pat. No. 11,073,622 issued to Cohen on Jul. 27, 2021-PERFORMANCE AND COST GLOBAL NAVIGATION SATELLITE SYSTEM ARCHITECTURE. Significant, cost-effective improvement is introduced for Position, Navigation, and Timing (PNT) on a global basis, particularly enhancing the performance of Global Navigation Satellite Systems (GNSS), an example of which is the Global Positioning System (GPS). The solution significantly improves performance metrics including the accuracy, integrity, time to acquire, interference rejection, and spoofing protection. A constellation of small satellites employing a low-cost architecture combined with improved signal processing yields an affordable enabler for spectrum-efficient transportation mobility. As air traffic management modernization transitions to a greater dependence on satellite positioning, the solution provides aviation users new protections from both intentional and unintentional interference to navigation and surveillance, And in response to an era in which intelligent transportation is under development for automobiles, reliable wherein-lane positioning enables new applications in connected and autonomous vehicles. New military capability increases PNT availability.
  D. U.S. Pat. No. 11,226,416 issued to Pullen et al. on Jan. 18, 2022-SYSTEM AND METHOD TO REDUCE PPP FILTER CONVERGENCE TIME USING LEO FREQUENCY BAND SIGNALS. method of enhancing the accuracy of a navigation system which includes a GNSS receiver. The method includes receiving navigation signals from at least one GNSS constellation and a LEO constellation. Position estimates will be made through implementation of a filter using successive readings of pseudoranges and carrier-phase measurements from the GNSS constellation and carrier-phase measurements from the LEO constellation.
  E. TSAT (2U) and PhoneSAT (1U) In P-Pod launcher during final integration at Cal Poly.

As can be observed, none of the prior art has anticipated or caused one skilled in the art of LEO type satellites and constellations devices and systems to see the concept and invention by Voss et al. The device provides an answer to a safe, efficient, and effective satellite for experimentation and data collection in LEO and VLEO orbits.

SUMMARY OF THE INVENTION

This invention is an improved ThinSat constellations that are a group of satellites for carrying payloads for experimentation and data collection which are launched into and orbit through Low Earth Orbit (LEO) and Very Low Earth Orbit (VLEO) conditions. Taught here is the Improved ThinSat that is a functional and physical unit with various electrical and electronic characteristics. It is intended to provide a payload and payload board as an integrator with the necessary features and parameters to provide a person and/or student to perform multi-satellite experiments. The Improved ThinSat unit can be configured to share data and power between other ThinSat units in the constellation. Various configurations permit different numbers of the Improved ThinSat units to be placed in a 3U CubeSat launcher, a 1U launcher, as well as options in 6U, 12U, and 27U launchers. The main improvements are listed above and create an even better Improved ThinSat unit to be placed in the constellations and launched as satellites with payloads to perform experiments and gather data as they orbit through Low Earth Orbit (LEO) and Very Low Earth Orbit (VLEO) conditions. ThinSats are designed to be a cost-effective means of getting research into space, making them a perfect option for sensor testing, ground station calibration, or any variety of educational or commercial missions. The ThinSats contain all the vital flight components of a FastBus CubeSat (EPS, EyeStar™ radio, battery, flight processor, etc.) all in the scalable body of the ThinSat. An improved ThinSat constellations is a group of satellites for carrying experimentation and data collection payloads. They are launched and orbit through Low and Very Low Earth Orbit (LEO/VLEO). Thinsats solve complex communication and data retrieval issues with duplex radios, low power transceivers, and high gain tracking ground stations with infrequent and short line-of-sight overpasses. Thinsat modules can be structurally connected to provide improved data collection, workflow, redundancy, and solar/battery power plus drag systems for earlier re-entry. Thinsat includes a pair of thin patch printed circuit boards (PCBs) fastened on each side of a frame, power and EPS, a processor, Global Position System (GPS), GPS receiver, antennas, wiring harnesses, a radio, solar cells, various sensors, and space for a selected payload. Thinsat is a cost effective means of space research with sensor testing, ground station calibration, and a variety of educational and commercial missions.

The preferred embodiment of the Improved ThinSat unit is comprised of: a pair of thin patch printed circuit boards (PCBs) fastened on each side of an AL7075 aluminum frame, a 2.2 Ahr Battery, an electrical power system (EPS), a data processor, a Global Position System (GPS), GPS Receiver, a pair of antennas, a set of inhibits, a set of wiring harnesses; a Simplex radio, a set of solar cells, and a series of various sensors; a selected payload; Further the Improved ThinSat unit 30 includes an optional fanfold array structure whereby multiple ThinSats can be linked in order to form a constellation; and an addition of a Single panel (previous 3 panel), a ribbon cable replaced with wire; a Solar Circuit: an updated component to prevent current loops; a set of Solar Cells: an upgraded component to higher output cells; an upgraded antennas: a pair of GPS and Simplex antennas upgraded to higher quality; and an upgraded GPS radio for the GPS wherein the ThinSat design with a thinner and wider design evolved to maximize the surface for the designed enclosed volume and allows sets of solar arrays to be mounted on front and back; wherein the Al 7075 frame clamped between two PCBs permits the electrical design to be greatly simplified and minimize the need for additional connectors and interfacing between boards; Wherein the inner volume is divided into two sections, separated by an aluminum wall as a Payload section and a NSL Bus section which permits half of the inner volume of the satellite to be available for the payload and the other half used completely by the NSL Bus electronics which further simplifies the design and allows a single point electrical interface and a clean mechanical interface; wherein the payload has multiple ports, providing an unobstructed access and viewing of space and two circular ports available along the thin, aluminum side and three larger ports are available on the larger face; and wherein the Improved ThinSat unit enables more possibilities for research, education, and product development; and wherein improved ThinSat unit are designed to be a cost effective means of getting research into space, making them a perfect option for short term sensor testing, ground station calibration, or any variety of short-term educational or commercial missions. The Improved ThinSat unit further described with enhanced with Key Product highlights including: connection to Iridium or Globalstar network as a 24/7 real-time connection for data communication and distribution; a Zenith Pointing Via Eyestar radio; an efficient payload integration; an included ground station; an unibody design provides EMI radiation shielding; effectively the smallest satellite on market; at least 50% of structure dedicated to customer payload; and a wide array of launch configurations; as well as other options including: assembly as a set pf constellations or in-dividual units; a Langmuir probe, a temperature sensor, a particle sensor, a system complete with full mission support; a GPS system; and a camera.

OBJECTS AND ADVANTAGES

There are several objects and advantages of the Improved ThinSat unit. There are currently no known data or experiment carrying devices that are effective at providing the objects of this invention. The advantages and benefits are:

| Item | Advantages |
| --- | --- |
| 1 | Is fast to create the experiments. |
| 2 | Uses component parts for the improved Thinsat that already produced and available but in a unique combination. |
| 3 | Is a universal design for attachments to fit the PCN for different experiments by the user/student. |
| 4 | Has ease of assembly: automated assembly using two exterior parallel PC Board composite & structural assembly, shielding for radiation and EMI reduction (Pancake assembly), Iridium or Globalstar/NSL EyeStar Product fits with 24/7 real-time monitoring for ordered database. |
| 5 | Uses larger solar array: area and fit with fixed volume. |
| 6 | Is aerodynamic: for less drag when small edge is pointing into ram direction. More drag if rotated 90 degrees. |
| 7 | Has significant lower cost: by a factor of 10 for constellations to manufacture compared to using many smaller PC boards with connectors. One main PCB with few connectors. |
| 8 | Is easy testing: and debugging of ThinSat since it is comparable to a Flat-Sat. Easy workflow with multiple subsystems. |
| 9 | Uses advanced manufacturing and robotic mass assembly with modular ThinSat frames and 3D printing. |
| 10 | Has no internal launcher: required for ThinSats since they stack in existing Canisterized Satellite Dispenser (CSD) and PPOD launch canisters. |
| 11 | Has improved thermal: heat dissipation and isothermal shorting. |
| 12 | Is great for pushing new technologies to smaller smart phone sizes. |
| 13 | Can have much greater RADAR cross section especially with the foldouts. |
| 14 | Can have much greater RADAR cross section especially with the foldouts. |
| 15 | Has ease of calibration, charging, burn-in, and environmental testing |
| 16 | Provides isolation can separate noisy bus and payload sections with a foldout: isolation of sensitive low power plasma, magnetic, and cooled experiments. |
| 17 | Architecturally and structurally, ThinSat modules can also be tied together directly or in groups (strings) to provide improved data collection, workflow, redundancy, and solar/battery power. |
| 18 | Improved the foldout design to stabilize the flight. |
| 19 | Improved the circuit layout to prevent solar loops. |
| 20 | Improved the solar arrays. |

-continued

| Item | Advantages |
|---|---|
| 21 | Improved the antennas. |
| 22 | Improved the GPS. |
| 23 | Improved the spacing on bus. |
| 24 | Improved the manufacturing on the improved ThinSat unit. |
| 25 | Has a concern with the ThinSats form factor is the volume constraint, but this can be mitigated with multiple T-sections in series or parallel or scale to larger ThinSats. |

Finally, other advantages and additional features of the present Improved ThinSat unit will be more apparent from the accompanying drawings and from the full description of the device. For one skilled in the art of satellite and accompanying devices for gathering data and performing experiments in Low Earth Orbit (LEO) and Very Low Earth Orbit (VLEO) conditions it is readily understood that the features shown in the examples with this Improved ThinSat unit are readily adapted to other types of satellite systems and accompanying devices.

DESCRIPTION OF THE DRAWINGS—FIGURES

The accompanying drawings, which are incorporated in and constitute a part of this specification, illustrate an embodiment of the improved ThinSat constellations that are a group of satellites devices for carrying payloads for experimentation and data collection which are launched into and orbit through Low Earth Orbit (LEO) and Very Low Earth Orbit (VLEO) conditions that is preferred. The drawings together with the summary description given above and a detailed description given below explain the principles of the Improved ThinSat unit or device. It is understood, however, that the device described herein is not limited to only the precise arrangements and instrumentalities shown.

FIGS. 1A through 1 E are sketches of the general improved ThinSat constellations that are a group of satellites for carrying payloads in various configurations.

Figure 2:
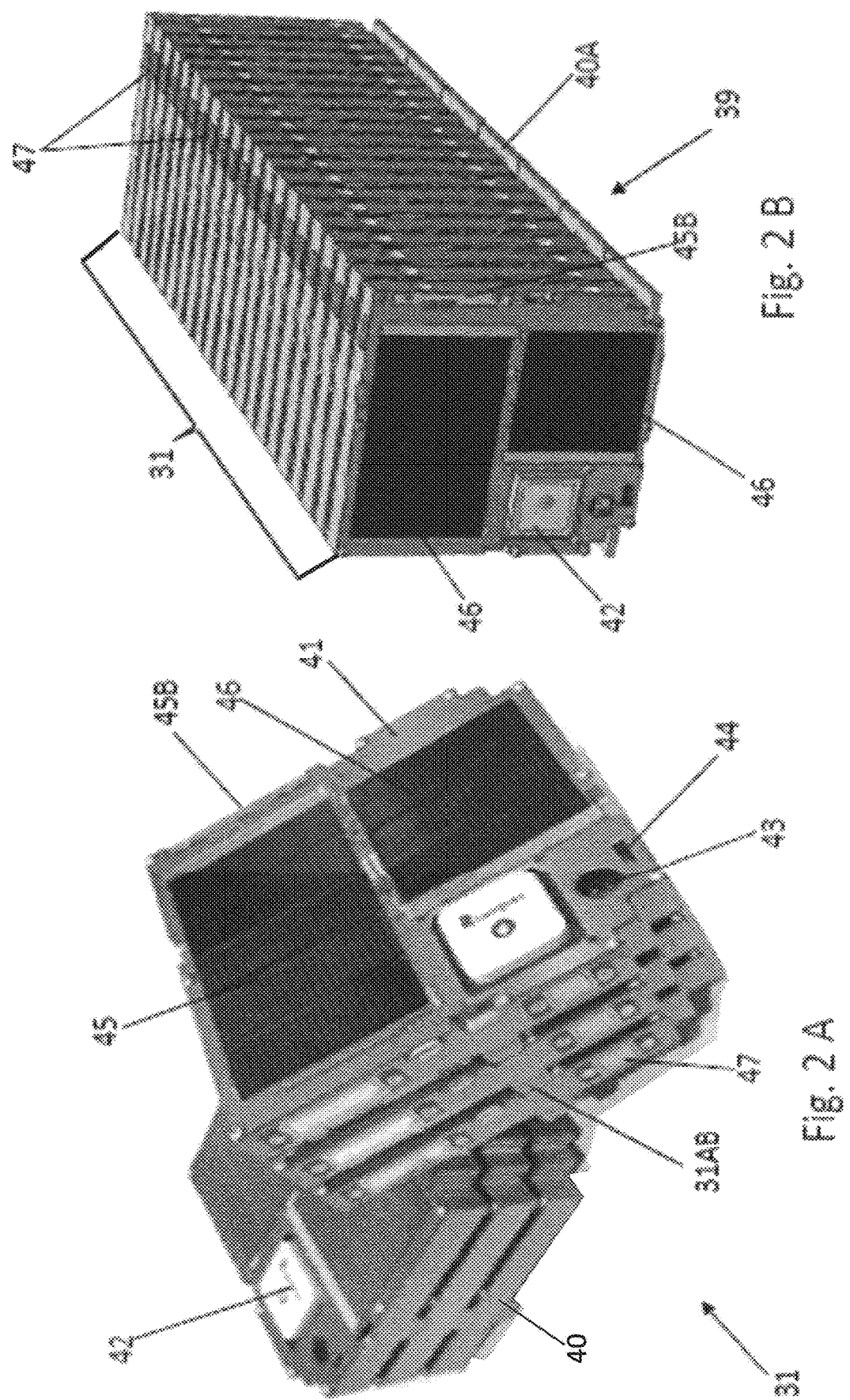

FIGS. 2A and 2 B are sketches of the general improved ThinSat constellations that are a group of satellites for carrying payloads in completed sets and device with components and features noted and as a Canisterized Satellite Dispenser.

Figure 3:
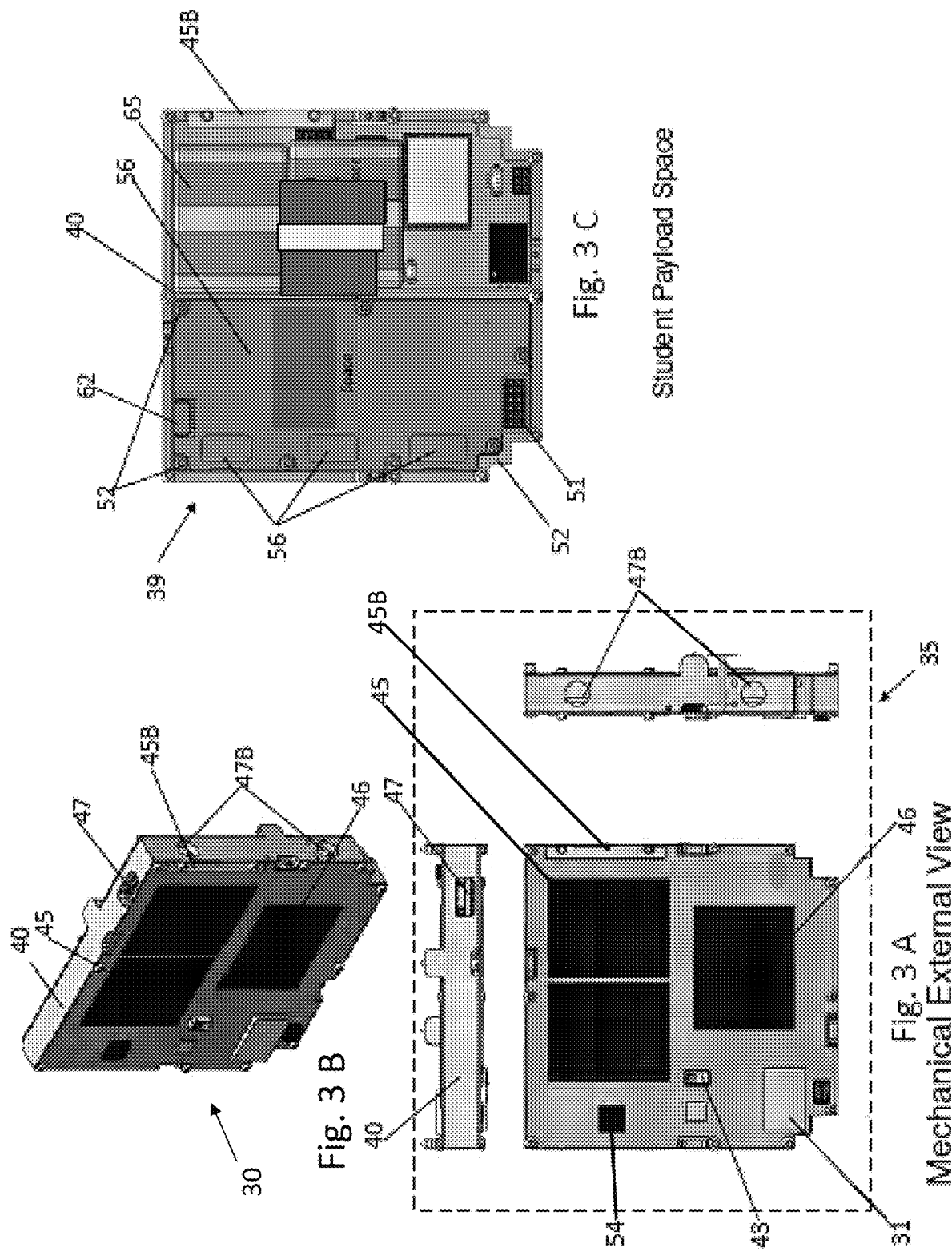

FIGS. 3A through 3 C are sketches of improved ThinSat constellations that are a group of satellites for carrying payloads with the components and features shown from a top view.

Figure 4:
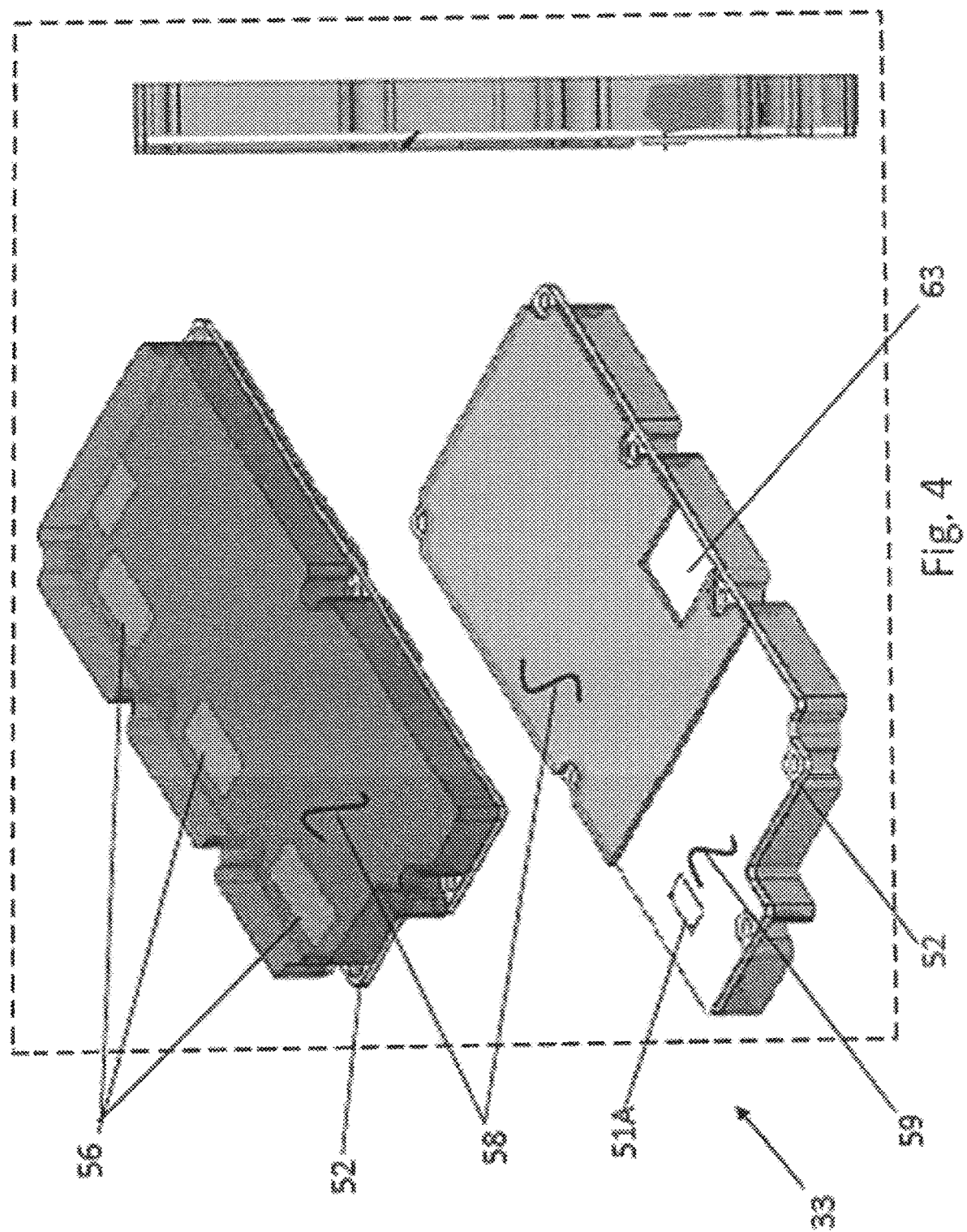

FIG. 4 is a sketch of the improved ThinSat unit showing the payload area and keep-out zones with unit components for launch, flight and tracking the Thinsat unit.

FIGS. 5A through 5 D are sketches of an improved ThinSat unit with the layout of the circuit boards and the payload connectors.

FIGS. 6A and 6 B are sketches of the Payload block diagram and the Thinsat System block diagram for the improved ThinSat unit.

FIGS. 7A through 7 D are system layouts of the front and back printed circuit boards (PCBs) of the improved ThinSat unit.

Figure 8:
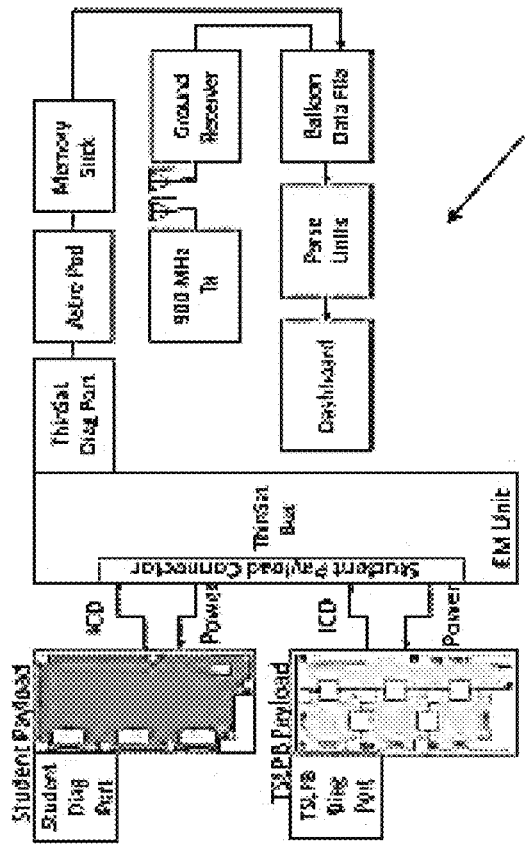
Figure 8:
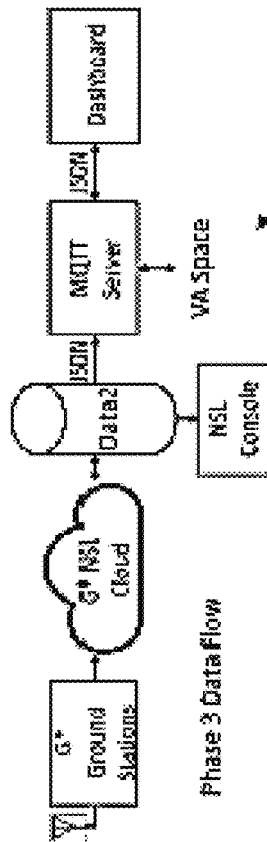
Figure 8:
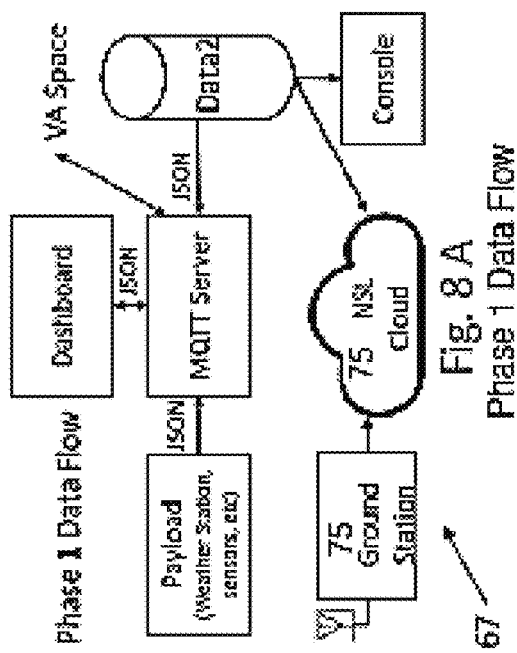
Figure 8:
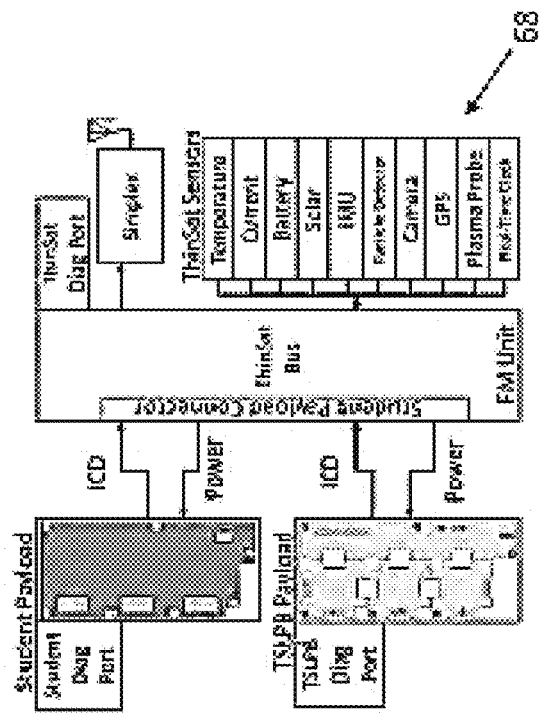

FIGS. 8A through 8 D are data flowcharts of the flight data communication path as well as the engineering and flight unit interface diagrams.

FIGS. 9A and 9 B are sketches of an Improved ThinSat unit, the layout view, and the Canisterized Satellite Dispenser (CSD).

FIGS. 10A and 10 B are sketches of a Canisterized Satellite Dispenser (CSD) and build views for layout of different sizes of Improved ThinSat units.

FIGS. 11A through 11 D are block layout of the Foldout hinge assembly and prototypes of the hinge assembly and as cannisters.

Figure 12:
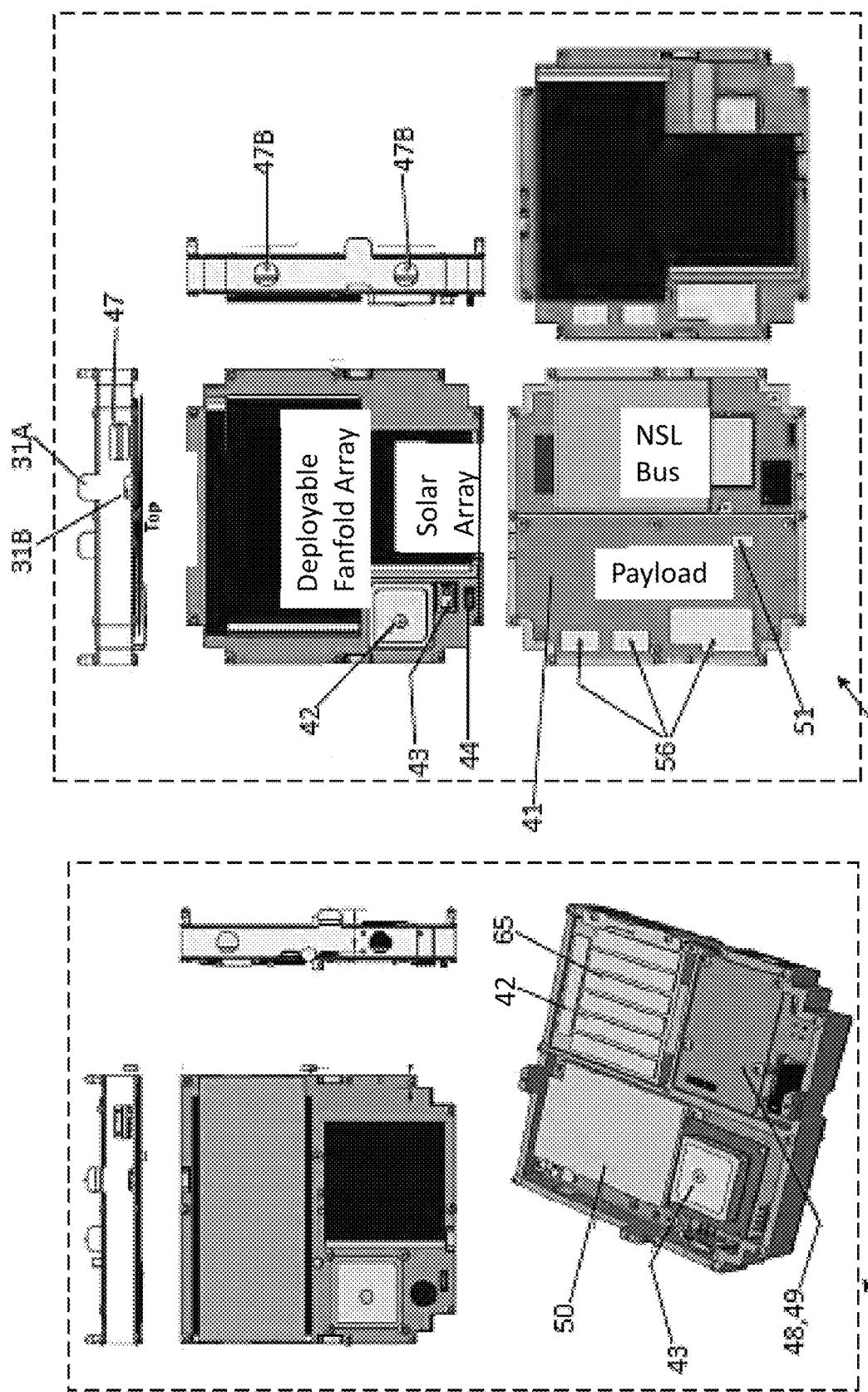

FIGS. 12A and 12 B are system layout of ThinSat.

Figure 13:
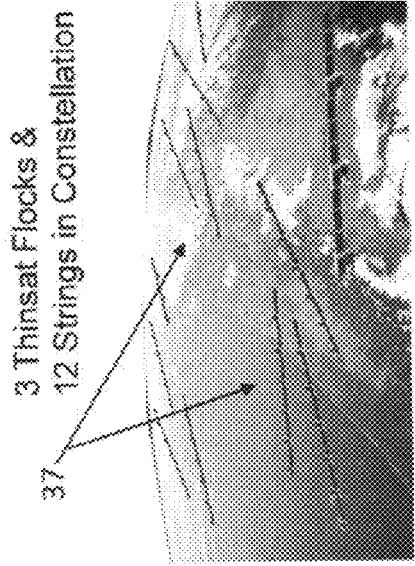
Figure 13:
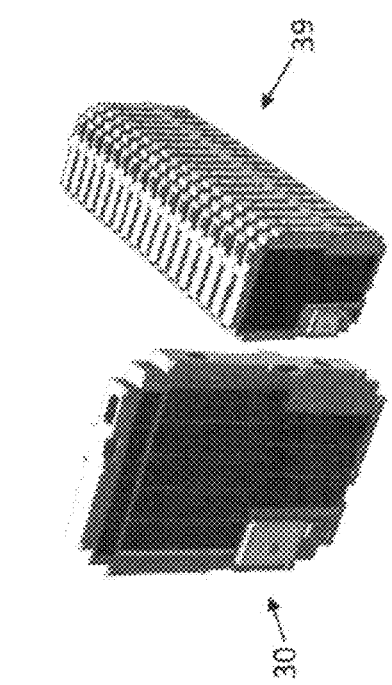
Figure 13:
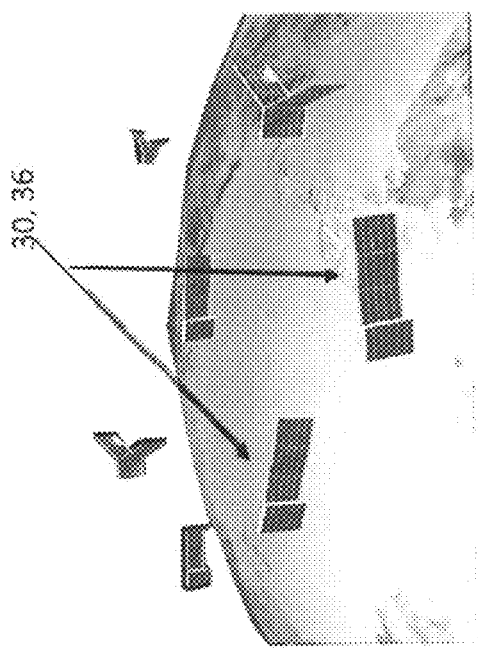
Figure 13:
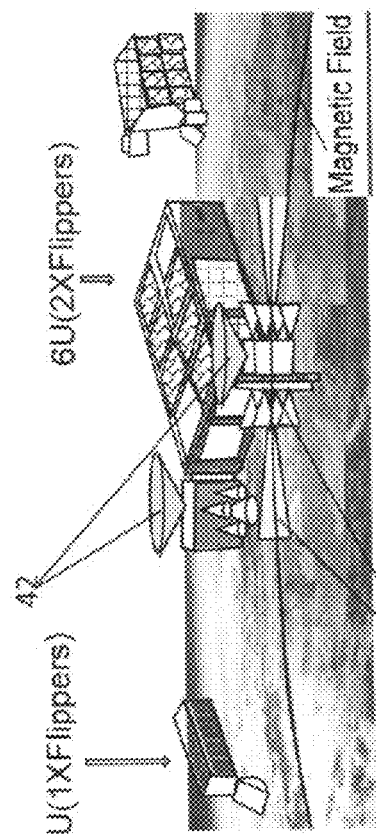

FIGS. 13A through 13 D are ThinSat and 3U Stack of ThinSats plus STRINGS and ThinSat after launch as autonomous nodes and with the flipper unit.

FIGS. 14A through 14 C are deployment sketches of the Foldout hinge assembly and reactions of the deployment.

Figure 15:
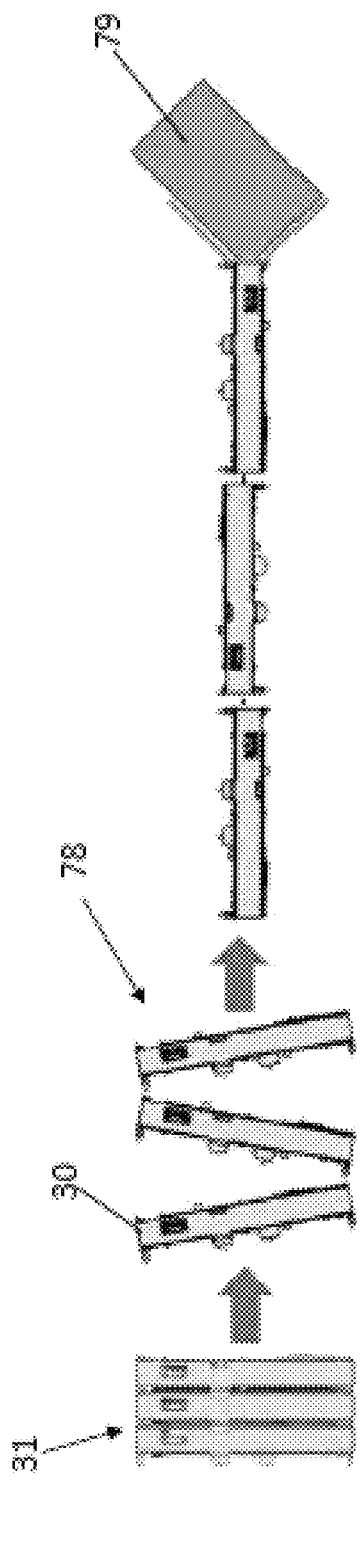
Figure 15:
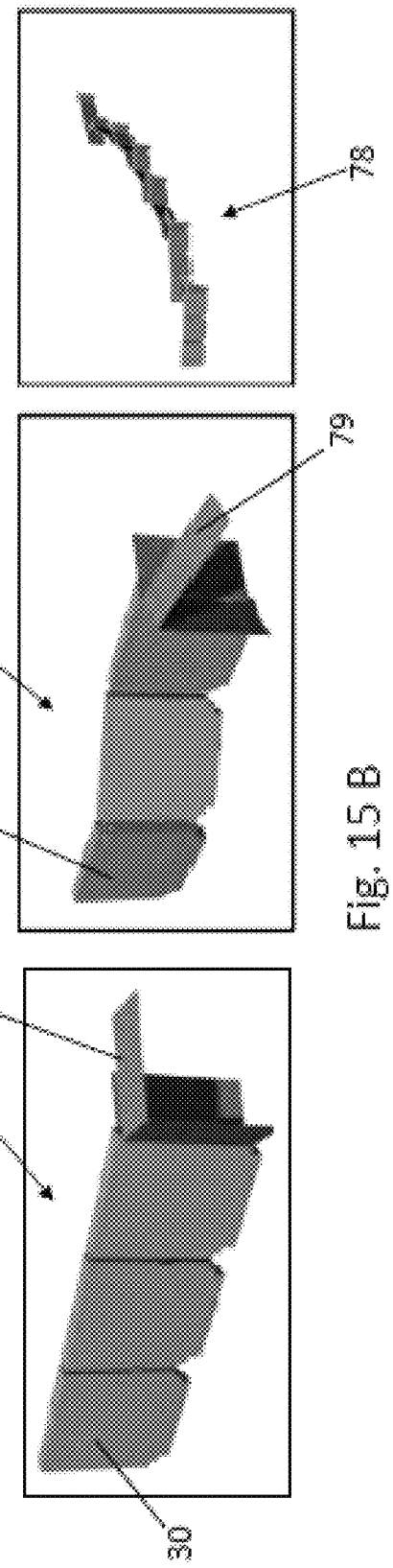

FIGS. 15A and 15 B are snapshots of baseline NODE configuration and the unfolding of the box solar array foldout.

Figure 16C:
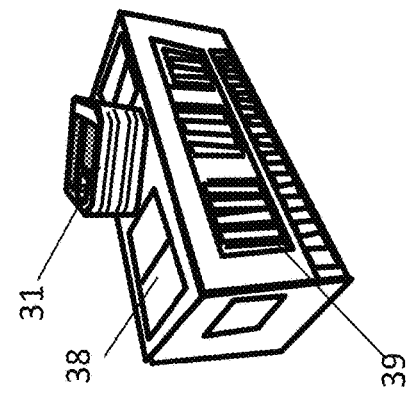
Figure 16E:
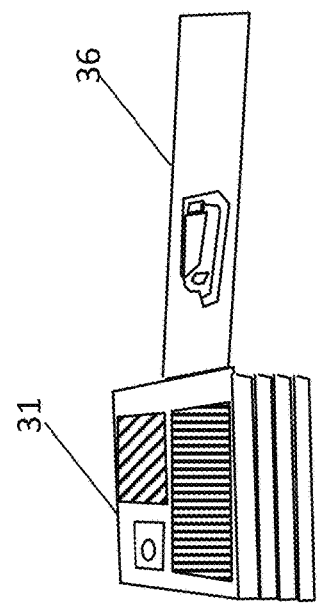
Figure 16:
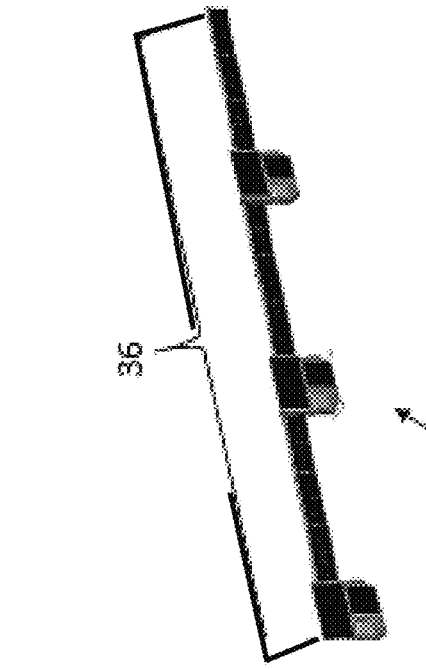
Figure 16:
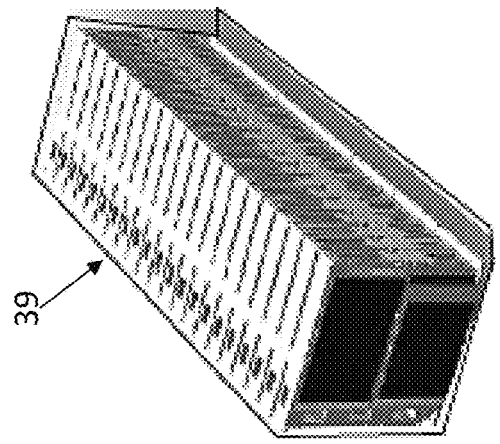
Figure 16:
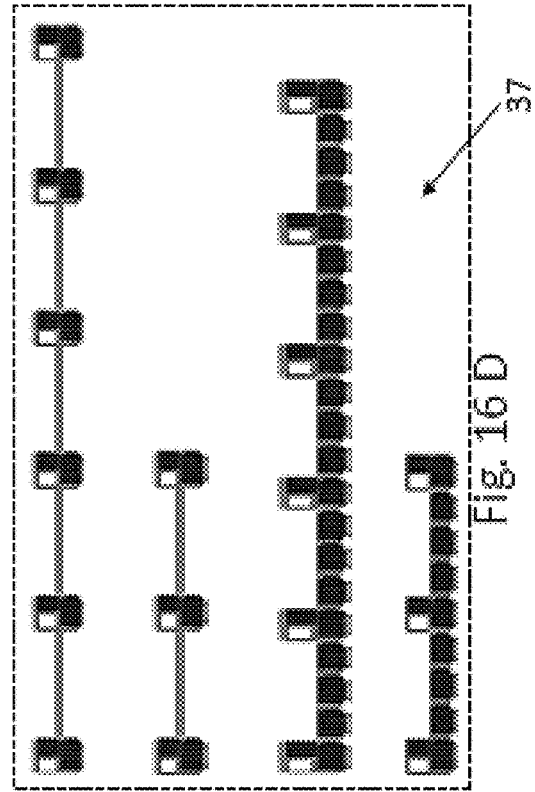

FIGS. 16A through 16 E are recent sketches of the foldout hinge assembly, cannister and prototypes of the Improved ThinSat unit.

FIGS. 17A through 17 C are recent sketches of the Foldout hinge assembly, cannister and improved ThinSat unit on rails.

FIGS. 18A through 18 D are recent sketches of the prototypes of the improved ThinSat unit as single and double frames and with the foldout solar and the drag details.

FIGS. 19A through 19 E are sketches of the foldout hinge assembly with various numbers of the improved ThinSat units.

Figure 20A:
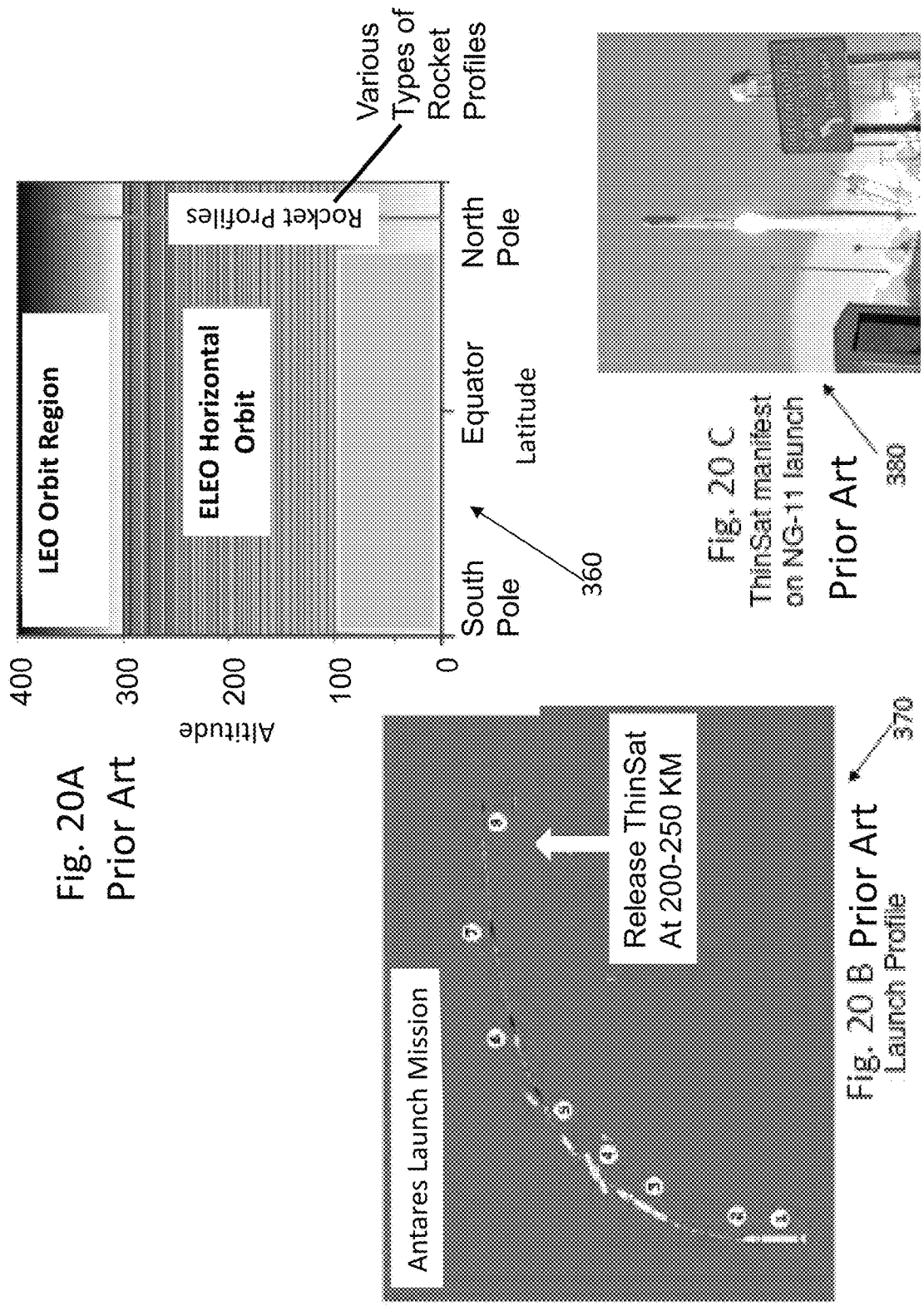

FIGS. 20A through 20 C are sketches of the launch details and atmosphere orbit regions for the constellations of the improved ThinSat unit.

Figure 21A:
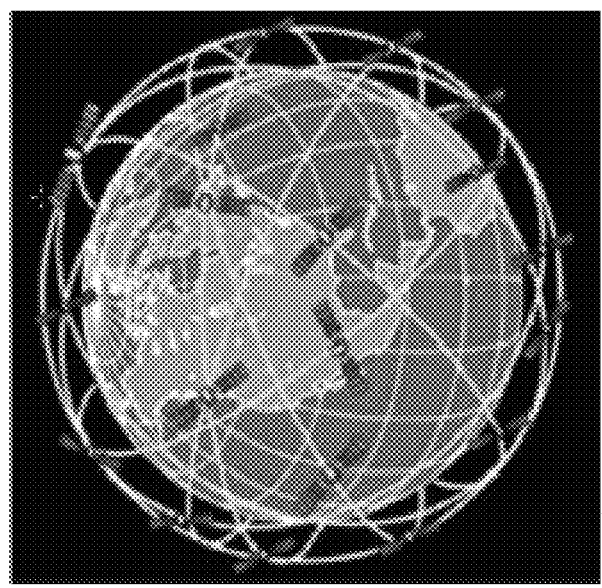

FIGS. 21A and 21 B are diagrams of the communication system used with the improved ThinSat unit.

FIGS. 22A through 22 D are tracking sketches, orbit decay and equations used in the operation of launching and tracking the improved ThinSat unit.

Figure 23:
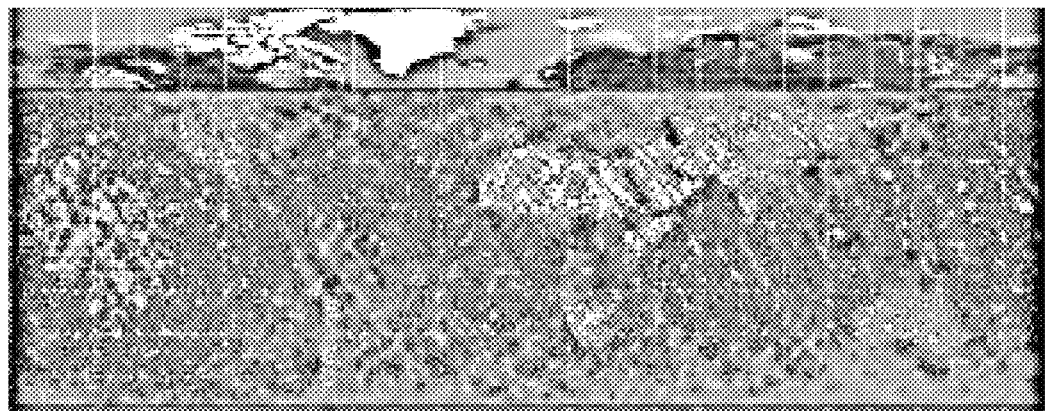
Figure 23:
Figure 23:
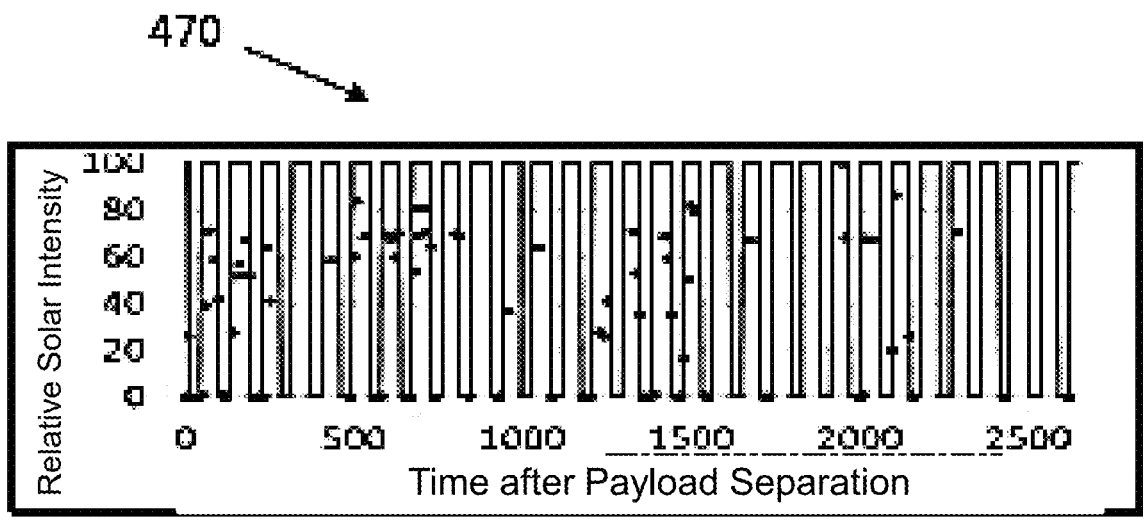
Figure 23:
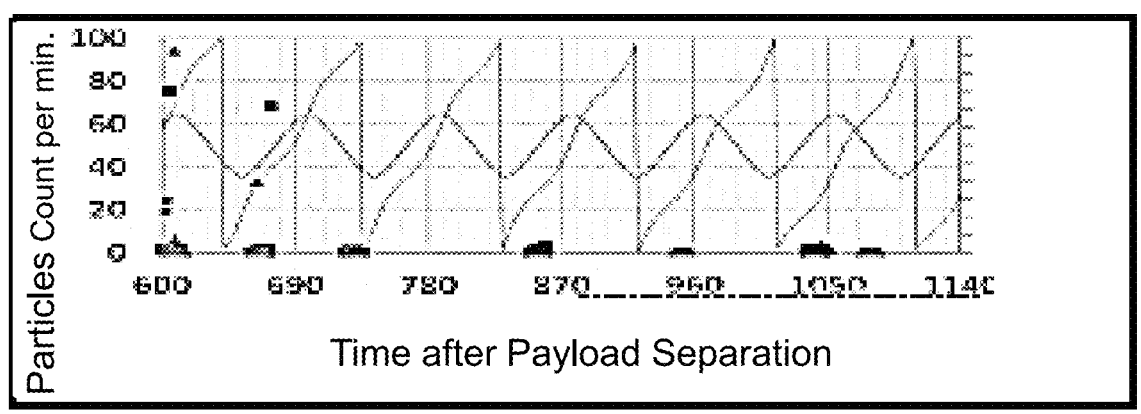

FIGS. 23A through 23 D are sketches of tracking and revealing data from the launch and communication with improved ThinSat unit.

Figure 24:
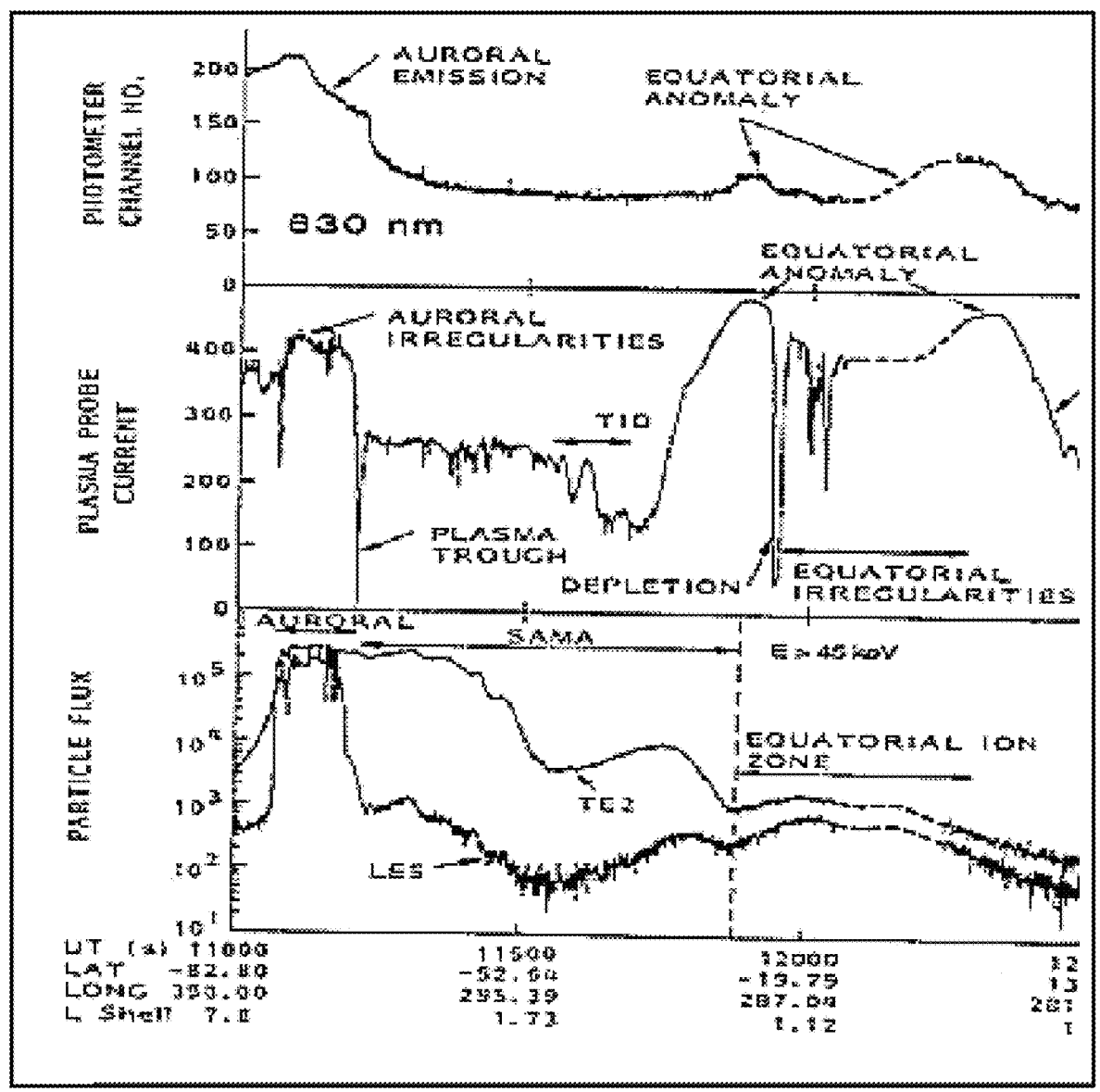

FIG. 24 is an example of weather data from one of the improved ihinSat unit.

FIGS. 25A through 25 F show some of the enhancements of the improved ThinSat unit including a flipper unit.

FIGS. 26A through 26 D show some of the recent ThinSat units with Improvements of the Improved ThinSat unit.

FIGS. 27A through 27 E show some of the prior art for satellite systems used in ELEO and LEO type operations.

DESCRIPTION OF THE DRAWINGS—REFERENCE NUMERALS

The following list refers to the drawings:

TABLE B

Reference numbers

| Ref # | Description |
|---|---|
| 30 | improved ThinSat unit 30 as part of the improved ThinSat constellations that are a group of satellites for carrying payloads for experimentation and data collection |

TABLE B-continued

Reference numbers

| Ref # | Description |
|---|---|
| | which are launched into and orbit through Low Earth Orbit (LEO) and Very Low Earth Orbit (VLEO) conditions |
| 31 | ThinSats 31 in groups of three locked together with tabs 31A and slots 31B to fully constrain in X and Y directions |
| 33 | payload available space and keep-out zones 33 |
| 35 | layout view 35 of ThinSat 30 |
| 36 | foldout hinge assembly 36 with copper tape and clamps (FIG. 11 A) |
| 36A | aluminum AL 6061 clamp 36A (strip 36B to frame 40) |
| 36B | NITI flat wire 36B |
| 36C | KaptonRTM tape 36C are made from polyimide film with silicone adhesive or equal |
| 36D | copper tape 36D or equal |
| 36E | flex strip 36E or equal |
| 36F | stainless steel panel 36F or equal |
| 37 | ThinSat string 37 - connected series of deployed ThinSats 30 |
| 38 | chassis 38 to contain canister |
| 39 | Canisterized Satellite Dispenser (CSD) 39 dispenses multiple ThinSats 30 |
| 40 | AL7075 frame 40, chassis of ThinSat 30 connecting parts and boards, Al 7075 frame clamped between two printed circuit boards (PCBs) chassis rails 40A |
| 40A | mounting rail slot 40A of frame 40 |
| 41 | Printed Circuit Board (PCB) 41 |
| 42 | simplex antenna 42 |
| 43 | earth/horizon sensor 43 (IR sensor able to remotely sense temperatures between 0 to +80 C., and functioned as an Earth Horizon Sensor, contributing to the attitude determination) |
| 44 | inhibit 44 switch/light sensor - decommissioning sensor-a 2-fault tolerant inhibit system, with a final solar panel illumination requirement to activate full data broadcast mode |
| 45 | deployable foldout/fanfold/foldout array/cells 45 foldout supports 45A fanfold array connector 45B |
| 46 | solar array/solar cells 46 shuttle solar cell 46A on a Thinset 30 |
| 47 | frame diagnostic port 47 side port 47B |
| 48 | Electric Power System (EPS) 48 - data processor - various sensors |
| 49 | electronic sensors 49 horizon sensor other sensors temperature current battery solar IMU Particle detector camera GPS Plasma Probe Real-time clock |
| 50 | Global Positioning System (GPS) receiver 50 |
| 51 | payload [20] pin (male) receptacle 51 for EyeStar Radio transmit |
| 51A | ThinSat [20] pin (female) receptacle 51A |
| 52 | mounting supports 52 for payload PCB mounting (7 shown) |
| 53 | receiver antenna 53 |
| 54 | particle detector 54 |
| 55 | primary/student payload circuit board 55 |
| 56 | primary/student diagnostic ports 56 |
| 57 | student payload connector 57 |
| 58 | payload zone 55 |
| 59 | keep-out zone 59 |
| 60 | payload block diagram 60 |
| 61 | Thinsat system block diagram 61 |
| 62 | diagnostic pin connector |
| 63 | Pull Before Flight switch (PBF) switch 63 |
| 64 | system layouts 64 of the front and back printed circuit boards (PCBs) of the improved ThinSat unit [System layout 64A of Outer +Z Wall of ET-Sat, System layout 64B of Inner +Z Wall of ET-Sat, System layout 64C of Outer −Z Wall of ET-Sat, and System layout 64D of Inner −Z Wall of ET-Sat] |
| 65 | 2.2 Ahr battery 65 |
| 66 | simplex radio 66 |
| 67 | data flowcharts 67 of communication path |
| 68 | flight unit interface diagram 68 |
| 69 | engineering Unit Interface Diagram 69 and Data Flow |
| 70 | flight unit data flow 70 |
| 75 | Data link - 24/7 - Global Star simplex/one way and Iridium - two way, receive and command duplex |
| 78 | box solar array foldout 78 |

TABLE B-continued

Reference numbers

| Ref # | Description |
|---|---|
| 79 | radar reflector 79 |
| 80 | dynamic deployment 80 of a full stack 31 of 21 ThinSats 30, in 4 strings 39 over time |
| 81 | more dynamic deployment 81 of a full stack 31 of 21 ThinSats 30, in 4 strings over time |
| 82 | resonant oscillations 82 as the foldouts 39 unfold to steady state |
| 83 | drag detail, drag array 83 on a Thinset 30 |
| 85 | foldout: single panel 85 (previous 3), replaced ribbon cable with wire |
| 86 | solar circuit: updated 86 to prevent current loops |
| 87 | solar cells: upgraded 87 to higher output cells |
| 88 | antennas: GPS and simplex antennas upgraded 88 to higher quality |
| 89 | GPS: upgraded GPS radio 89 |
| 90 | flipper 90 on a Thinset mount 30 |
| 360 | a graphic 360 showing a unique purpose for ThinSats is to map and explore the ionosphere and atmosphere in the VLEO and ELEO region (350 to 90 km) . |
| 370 | a depiction 370 of a ThinSat launch profile |
| 380 | launching of a ThinSat 380 i.e., a ThinSat manifest on NG-11 launch |
| 390 | a graphic depiction 390 of Globalstar constellation of satellites for Global coverage and real-time 24/7 visibility |
| 400 | a chart 400 demonstrating the overall Communications Architecture and Flow Diagram/Data transfer from many ThinSat EyeStar radios to the Internet, Console and Dashboard for the constellation Ground Segment |
| 410 | a chart 410 shoeing ThinSat orbits for 50 hr life using NASA's General Mission Analysis Tool (GMAT) software |
| 420 | a graph 420 plotting orbit period versus time |
| 430 | an equation 430 for calculating ThinSat orbits |
| 440 | a graph 440 plotting Orbit altitude versus time for ThinSat |
| 450 | a chart 450 Simplex Coverage maps show good global coverage. Red dots show packet transmission. |
| 460 | a chart 460 Black Box Particle Detector option demonstrating energetic particle data coverage map |
| 470 | a chart 470 demonstrating Terminator periodic variation with ThinSat solar cell data (zero points in eclipse |
| 480 | a chart 480 Energetic particle measurements for 540 minutes from six ThinSats for comparison |
| 490 | a series of charts 490 showing Plasma and Energetic particle Space Weather nighttime measurements in the VLEO region (180-240 km) |
| 500 | Prior Art 500 U.S. Pat. No. 9,121,932 Sep. 1, 2015 Janky et al. - Refining a position estimate of a low earth orbiting satellite |
| 510 | Prior Art 510 U.S. Pat. No. 7,583,225 Sep. 1, 2009 Cohen et al. - low earth orbit satellite uplink |
| 520 | Prior Art 520 U.S. Pat. No. 11,073,622 Cohen Jul. 27, 2021 - performance and cost global navigation satellite system architecture |
| 530 | Prior Art 530 U.S. Pat. No. 11,226,416 Pullen et al. Jan. 18, 2022 - system and method to reduce PPP filter convergence time using LEO frequency band signals |
| 540 | Prior Art 540 TSAT (2U) and PhoneSAT (1U) In P-Pod launcher during final integration at Cal Poly |

DETAILED DESCRIPTION OF PREFERRED EMBODIMENT

This present invention relates to an improved ThinSat constellations that are a group of satellites for carrying payloads for experimentation and data collection which are launched into and orbit through Low Earth Orbit (LEO) and Very Low Earth Orbit (VLEO) conditions. This relates to a satellite for experimentation and data transmission from Low Earth Orbit (LEO) and Very Low Earth Orbit (VLEO). This also relates to satellite navigation and satellite-based navigation techniques. The technical field presented relates to satellite positioning and use in experimentation in a LEO satellite. It concerns a method for placing a plurality of satellites in a Low Earth Orbit.

The advantages for the Improved ThinSat unit 30 are listed above in the introduction. Succinctly the benefits are that the device:
  A. Is fast to create the experiments.
  B. Uses component parts for the improved Thinsat that already produced and available but in a unique combination.
  C. Is a universal design for attachments to fit the PCN for different experiments by the user/student.

D. Has ease of assembly: automated assembly using two exterior parallel PC Board composite & structural assembly, shielding for radiation and EMI reduction (Pancake assembly), Iridium or Globalstar/NSL Eye-Star Product fits with 24/7 real-time monitoring for ordered database.
E. Uses larger solar array: area and fit with fixed volume.
F. Is aerodynamic: for less drag when small edge is pointing into ram direction. More drag if rotated 90 degrees.
G. Has significant lower cost: by a factor of 10 for constellations to manufacture compared to using many smaller PC boards with connectors. One main PCB with few connectors.
H. Is easy testing; and debugging of ThinSat since it is comparable to a Flat-Sat. Easy workflow with multiple subsystems.
I. Uses advanced manufacturing and robotic mass assembly with modular ThinSat frames and 3D printing.
J. Has no internal launcher: required for ThinSats since they stack in existing Canisterized Satellite Dispenser (CSD) and PPOD launch canisters.
K. Has improved thermal: heat dissipation and isothermal shorting.
L. Is great for pushing new technologies to smaller smart phone sizes.
M. Can have much greater RADAR cross section especially with the foldouts.
N. Can have much greater RADAR cross section especially with the foldouts.
O. Has ease of calibration, charging, burn-in, and environmental testing.
P. Provides isolation can separate noisy bus and payload sections with a foldout: isolation of sensitive low power plasma, magnetic, and cooled experiments.
Q. Architecturally and structurally, ThinSat modules can also be tied together directly or in groups (strings) to provide improved data collection, workflow, redundancy, and solar/battery power.
R. Improved the foldout design to stabilize the flight.
S. Improved the circuit layout to prevent solar loops.
T. Improved the solar arrays.
U. Improved the antennas.
V. Improved the GPS.
W. Improved the spacing on bus.
X. Improved the manufacturing on the improved ThinSat unit.
Y. Has a concern with the ThinSats form factor is the volume constraint, but this can be mitigated with multiple T-sections in series or parallel or scale to larger ThinSats.

Constellation Manufacture-One notes that to significantly reduce small satellite constellation cost it is advantageous to make use of mass production techniques that maintain high mission assurance while implementing new miniaturized mechanical and electronic technologies, 3-D printing, bulk CNC machining, automated pick-and-place electronic assembly, automated computer testing and inspection of each node, trace, and function. In addition, a rigorous burn-in, day-in-the-life, environmental vibration is performed on the improved ThinSat unit.

The preferred embodiment of the improved ThinSat unit 30 is comprised of: a pair of thin patch printed circuit boards (PCBs) fastened on each side of an AL7075 aluminum frame, a 2.2 Ahr Battery, an electrical power system (EPS), a data processor, a Global Position System (GPS), GPS Receiver, a pair of antennas, a set of inhibits, a set of wiring harnesses; a Simplex or Duplex radio, a set of solar cells, and a series of various sensors; a selected payload; Further the improved ThinSat unit 30 includes an optional fanfold array structure whereby multiple ThinSats can be linked in order to form a constellation; and an addition of a single panel 85 (previous 3 panel), a ribbon cable replaced with wire; a solar circuit: an updated component 86 to prevent current loops; a set of solar cells: an upgraded component 87 to higher output cells; an upgraded antennas: a pair of GPS and simplex antennas upgraded 88 to higher quality; and an upgraded GPS Radio 89 for the GPS wherein the ThinSat design with a thinner and wider design evolved to maximize the surface for the designed enclosed volume and allows sets of solar arrays to be mounted on front and back; wherein the Al 7075 frame clamped between two printed circuit boards (PCBs) permits the electrical design to be greatly simplified and minimize the need for additional connectors and interfacing between boards; wherein the inner volume is divided into two sections, separated by an aluminum wall as a payload section and a NSL bus section which permits half of the inner volume of the satellite to be available for the payload and the other half used completely by the NSL bus electronics which further simplifies the design and allows a single point electrical interface and a clean mechanical interface; wherein the payload has multiple ports, providing an unobstructed access and viewing of space and two circular ports available along the thin, aluminum side and three larger ports are available on the larger face; and wherein the improved ThinSat unit 30 enables more possibilities for research, education, and product development; and wherein improved ThinSat unit 30 is designed to be a cost effective means of getting research into space, making them a perfect option for short term sensor testing, ground station calibration, or any variety of short-term educational or commercial missions. The improved ThinSat unit 30 is further described with enhanced with Key Product highlights including: connection to Iridium or Globalstar network as a 24/7 real-time connection for data communication and distribution; a Zenith Pointing Via Eyestar radio; an efficient payload integration; an included ground station; an unibody design provides EMI radiation shielding; effectively the smallest satellite on market; at least 50% of structure dedicated to customer payload; and a wide array of launch configurations; as well as other options including: assembly as a set pf constellations or in-dividual units; a Langmuir probe, a temperature sensor, a particle sensor, a system complete with full mission support; a GPS system; and a camera.

There is shown in FIGS. 1-27 a complete description and operative embodiment of the improved ThinSat unit. In the drawings and illustrations, one notes well that the FIGS. 1-27 demonstrate the general configuration and use of this product. The various example uses are in the operation and use section, below.

The accompanying drawings, which are incorporated in and constitute a part of this specification, illustrate an embodiment of the improved ThinSat unit 30 as it is incorporated in the satellite constellation. The drawings together with the summary description given above and a detailed description given below explain the principles of the Improved ThinSat unit or device 30. It is understood, however, that the special improved ThinSat unit 30 is not limited to only the precise arrangements and instrumentalities shown. Other examples of satellite devices and data seeking configurations and uses are still understood by one skilled in the art of satellites and The improved ThinSat is a functional and physical unit with various electrical and electronic characteristics. It is intended to provide a payload and payload board as an integrator with the necessary features and parameters to provide a person and/or student to perform multi-satellite experiments. The improved ThinSat unit can be configured to share data and power between other ThinSat units in the constellation. Various configurations permit different numbers of the improved ThinSat units to be placed in a 3U CubeSat launcher, a 1U launcher, as well as options in 6U, 12U, and 27U launchers. The main improvements are listed above and create an even better improved ThinSat unit to be placed in the constellations and launched as satellites with payloads to perform experiments and gather data as they orbit through Low Earth Orbit (LEO) and Very Low Earth Orbit (VLEO) conditions.

The ThinSat is a revolutionary new product from Near-Space Launch Inc. Measuring in at only 11.4 cm×11.2 cm×1.5 cm it is poised to be the smallest satellite in orbit. ThinSats are designed to be a cost effective means of getting research into space, making them a perfect option for short term sensor testing, ground station calibration, or any variety of short-term educational or commercial missions. The ThinSats contain all of the vital flight components of a FastBus CubeSat (EPS, EyeStar® radio, battery etc.) all in the smaller body of the ThinSat. With the unique NSL fanfold array structure, Multiple ThinSats can be linked in order to form a constellation. This enables even more possibilities for research, education, and product development. The ThinSats currently a fraction of a conventional cubesat, thus opening doors for countless research and educational ventures alike.

FIGS. 1A through 1E are sketches of the general improved ThinSat constellations that are a group of satellites for carrying payloads in various configurations. Demonstrated here are the various components and improved Thinsats discussed herein. These include: an improved ThinSat unit 30 as part of the improved ThinSat constellations that are a group of satellites for carrying payloads for experimentation and data collection which are launched into and orbit through Low Earth Orbit (LEO) and Very Low Earth Orbit (VLEO) conditions; a ThinSats 31 in groups of three locked together with tabs 31A and slots 31B to fully constrain in X and Y directions; a layout view 35 of ThinSat 30; a ThinSat string 37—connected series of deployed ThinSats 30; a Canisterized Satellite Dispenser (CSD) 39 dispenses multiple ThinSats 30; and a payload zone 55. The ThinSats in each constellation can be connected into multiple 'strings' to allow multiple sets of ThinSats to share power and data. Contact NSL to learn more.

FIGS. 2A and 2B are sketches of the general improved ThinSat constellations that are a group of satellites for carrying payloads in completed sets and device with components and features noted and as a Canisterized Satellite Dispenser. Provided here are sketches showing: an improved ThinSat unit 30 as part of the improved ThinSat constellations that are a group of satellites for carrying payloads for experimentation and data collection which are launched into and orbit through Low Earth Orbit (LEO) and Very Low Earth Orbit (VLEO) conditions; a ThinSats 31 in groups of three locked together with tabs 31A and slots 31B to fully constrain in X and Y directions; a payload available space and keep-out zones 33; a layout view 35 of ThinSat 30; a foldout hinge assembly 36 with copper tape and clamps (FIG. 11A); an aluminum AL 6061 clamp 36A (strip 36B to frame 40); a NITI flat wire 36B; a KaptonR® tape 36C are made from polyimide film with silicone adhesive or equal; a copper tape 36D or equal; a flex strip 36E or equal; a stainless steel panel 36F or equal; a ThinSat string 37—connected series of deployed ThinSats 30; a chassis 38 to contain canister; a Canisterized Satellite Dispenser (CSD) 39 dispenses multiple ThinSats 30; an AL7075 frame 40, chassis of ThinSat 30 connecting parts and boards, Al 7075 frame clamped between two PCBs; a pair of chassis rails 40A; a mounting rail slot 40A of frame 40; a pair of Printed Circuit Boards (PCB) 41; a simplex antenna 42; a sensor 43 such as a earth/horizon sensor 43 (IR sensor able to remotely sense temperatures between 0 to +80 C, and functioned as an earth horizon sensor, contributing to the attitude determination); an inhibit 44 switch/light sensor—decommissioning sensor—essentially a 2-fault tolerant inhibit system, with a final solar panel illumination requirement to activate full data broadcast mode; a deployable foldout/fanfold/foldout array/cells 45; a group of Foldout supports 45A; a fanfold array connector 45B; a solar array/solar cells 46; a set of one or more shuttle solar cell 46A; a frame diagnostic port 47; and a side port 47B. Completed sets of ThinSats in groups of three locked together with tabs 31A and slots 31B to fully constrain in X and Y directions. By building test fixtures for 21 satellites were locked together in diagnostics during testing. Another innovation was an automatic diagnostic test connector for each subsystem with the ability to charge up to 84 ThinSat batteries in parallel. Strings are ideal architectures for data and power connection between individual ThinSats for coordinated experiments with different purposes such as 1) ThinSat with GPS, IMU, cameras, 2) propulsion unit like a train and extra batteries (like coal car), 3) space weather experiments (on plasma and particles), and 4) space weather experiment with field deployables, etc. The string with the flex cable bus can also act as a boom for plasma experiments. (See FIG. 11A) Other advantages include gravity gradient stabilization with longer strings and various flying angled and circular geometries.

FIGS. 3A through 3C are sketches of improved ThinSat constellations that are a group of satellites for carrying payloads with the components and features shown from a top view. These views show: an improved ThinSat unit 30 as part of the improved ThinSat constellations that are a group of satellites for carrying payloads for experimentation and data collection which are launched into and orbit through Low Earth Orbit (LEO) and Very Low Earth Orbit (VLEO) conditions; a ThinSats 31 in groups of three locked together with tabs 31A and slots 31B to fully constrain in X and Y directions; a layout view 35 of ThinSat 30; an AL7075 frame 40, chassis of ThinSat 30 connecting parts and boards, Al 7075 frame clamped between two PCBs; the pair of Printed Circuit Board (PCB) 41; a simplex antenna 42; a sensor 43 such as a earth/horizon sensor 43 (IR sensor able to remotely sense temperatures between 0 to +80 C, and functioned as an earth horizon sensor, contributing to the attitude determination); an inhibit 44 switch/light sensor-decommissioning sensor-essentially a 2-fault tolerant inhibit system, with a final solar panel illumination requirement to activate full data broadcast mode; a deployable foldout/fanfold/foldout array/cells 45; a fanfold array connector 45B; a solar array/solar cells 46; a set of one or more shuttle solar cell 46A; a frame diagnostic port 47; a side port 47B; an Electric Power System (EPS) 48; a payload pin (male) receptacle 51 for EyeStar® Radio transmit; a receiver antenna 53; a particle detector 54; a primary/student payload circuit board 55; a primary/student diagnostic port 56; a student payload connector 57; and a payload zone 55. Labeled portion is assigned payload space. A unit is comprised of a single or double thickness aluminum frame as shown in FIGS. 1 and 2 above, printed circuit boards and small components including radio, antenna, and batteries, and the accordion folding panels. Batteries—The NSL battery NSL140743 is a pouch type cell, using Polymer Li-ion chemistry. It stores 700 math at 3.7 volts. The UL listing number of the battery is BBCV2.MH50009. It is used with a battery circuit protection module providing over-charge/over-current protection and over-discharge circuitry.

FIG. 4 is a sketch of the Improved ThinSat unit showing the payload area and keep-out zones with unit components for launch, flight and tracking the Thinsat unit.

PCBs can be placed anywhere within the allowable region. Provided are: a Payload Available Space and Keep-Out Zones 33; a payload pin (male) receptacle 51 for EyeStar® Radio transmit; a ThinSat pin (female) receptacle 51A; a set of mounting supports 52 for payload PCB mounting (7 shown); a primary/student payload circuit board 55; a primary/student diagnostic port 56; a student payload connector 57; a payload zone 55; a keep-out zone 59; and a Pull Before Flight switch (PBF) switch 63. One notes that there are two types of data packets which are sent from the payload: serial data and beacon data. Beacon data is a set of digital and analog inputs that are sent at a set interval for health and safety information. From the ThinSat payload, there are six analog and two digital inputs available for automatic transmissions of payload data to the ThinSat bus. Serial data is created and commanded by the payload. It can be sent whenever the transmitter is not beaconing to the ThinSat bus. When designing a payload, the payload developer has considerable freedom, but should closely follow the payload requirements and adhere to the keep-out zone space. One has 5 sensor ports to access space outside and may also be able to drill other openings in the frame or one of the PCBs if required to accommodate a payload designs. All electronic interconnects and power are available through the ThinSat 20-pin connector for EyeStar® Radio transmit and one has 7 mounting supports 52 as shown. The only thing payloads must do is conform to set electrical and mechanical interfaces and it can fly on any ThinSat, on any deplorer, on any mission. The payload requirements do not change depending on the String type or length. The standard payload area is ~107x~52x~10 millimeters. For thicker ThinSats (i.e., 2T or greater ThinSats) the allowable depth of the payload increases by increments of ~10 millimeters.

FIGS. 5A through 5D are sketches of an Improved ThinSat unit with the layout of the circuit boards and the payload connectors. These sketches demonstrate a payload pin (male) receptacle 51 for EyeStar® Radio transmit; a ThinSat pin (female) receptacle 51A; a set of mounting supports 52 for payload PCB mounting (7 shown); a primary/student payload circuit board 55; a primary/student diagnostic port 56; a student payload connector 57; a payload zone 55; a keep-out zone 59; a payload block diagram 60; a Thinsat system block diagram 61; a diagnostic pin connector 62; and a Pull Before Flight switch (PBF) switch 63. Board dimensions include 0.25 mm tolerance to the frame to ensure a fit. There is 7.5 mm available above a 1.6 mm board, and 9.1 mm available above the payload mounts. Connector numbers: connector on ThinSat board: DF12 (3.0)-20DP-0.5V (86) Header and Required mating connector on payload board: F12 (3.0)-20DS-0.5V (86) receptacle. Note that the mounting plane is in line with payload mounts, which rise 3 mm off the ThinSat main PCB.

FIGS. 6A and 6B are sketches of the payload block diagram and the Thinsat system block diagram for the improved ThinSat unit. Shown here are: a payload zone 55; a keep-out zone 59; a payload block diagram 60 and a Thinsat system block diagram 61. Data and Communication Protocol: ThinSat bus beacon communication packet format has the simplex radio that will beacon at a set Beacon rate, a time interval. This beacon will send out an 18-byte packet of the health and safety of the satellite, as well as IR/Mag packets, particle data packets, and possibly plasma data packets. Some of this data will be accessible to users for data analysis after the mission. The payload analog/digital inputs mode an option of the user/student does not wish to transmit the payload data serially, one may use the analog and digital inputs consisting of 6 analog inputs (A1-A6), with 2 bytes each, and 1 byte total for the 2 digital inputs (P1DI) which are available to be sampled on this payload connector. The radio will read each of these inputs at a set interval before it beacons and fills up the packet with one's data before transmitting it. For the payload serial mode, if one would like more data sent than simply what is available in the beacon packet, one can command the simplex to transmit serially at any point that the radio is not beaconing, and power is supplied to the payload. For the payload serial communication packet format, the payload sends data to the modem when the BUSY signal is LOW. Once data is sent to the modem, the modem will return an ACK (acknowledge) from RX Input to acknowledge the packet, or a NAK (no acknowledge) if there is a problem with the packet. If the packet is good, the modem will set the BUSY line HI and send the data to the IRIDIUM (duplex) or GlobalStar (simplex) network. Once finished sending, the BUSY line is set back to LOW, and the module waits to receive the next packet from the payload. For the serial port, a half-duplex LVTTL/TTL/RS232 asynchronous serial port (UART) is the primary interface to payload. The serial port operates with the serial parameters of 38,400 bps, 8 data bits, no parity, 1 stop bit. The TX, RX, and BUSY lines are 5V TTL. Each data packet to the modem is sent in serial. Upon receiving the packet, the modem answers with an ACK if the packet is correct and transmits the packet. If the packet is incorrect, it will send a NAK back to the payload. FIG. 6A: Payload Electrical Block Diagram-All electronic interconnects and power are done through a single NSL 20-pin connector. While not necessary, NSL suggests all payload developers include a payload diagnostic port for technicians to test one's payload during integration and testing. Each ThinSats can generate around ~1.25 W for payloads to use.

FIG. 6B: ThinSat constellation system Block diagram: The block diagram for the existing ⅐U ThinSat which is 1.7 cm thick is shown in FIG. 21 The EyeStar radio product (dashed box) is shown as one of the redundant, 24/7 links. Power is generated from 16 solar cells for low-rate beacon transmissions and higher rates if power is available. The Grid IR array is 8 by 8 pixels and is used as a horizon sensor and/or a crude imager to verify deployments and/or view earth/sun. Other options for the basic ThinSat include a) a high sensitivity, low bandwidth imager (96 by 128 pixels) to snapshot internal or external mechanisms, b) encryption, c) additional mission specific sensors, d) many sizes, e) an integrated GPS receiver and antenna, f) extra battery power, and g) quality control testing levels. During normal operations, the ThinSat can transmit mission critical data at 8 bytes/sec using the Globalstar satellite network over the entire globe, with 24/7 coverage (or Iridium fir duplex/two-way command) and a latency of seconds after the ThinSat is activated. A full ICD for students is referenced for all the mechanical, electrical, and sensor details for the payload and the bus.

FIGS. 7A through 7D are system layouts of the front and back printed circuit boards (PCBs) of the improved ThinSat unit. Noted in these drawings are: an improved ThinSat unit 30 as part of the improved ThinSat constellations that are a group of satellites for carrying payloads for experimentation and data collection which are launched into and orbit through Low Earth Orbit (LEO) and Very Low Earth Orbit (VLEO) conditions; a Printed Circuit Board (PCB) 41; a simplex antenna 42; a sensor 43 such as a earth/horizon sensor 43 (IR sensor able to remotely sense temperatures between 0 to +80 C, and functioned as an Earth Horizon Sensor, contributing to the attitude determination); an inhibit 44 switch/light sensor-decommissioning sensor-essentially a 2-fault tolerant inhibit system, with a final solar panel illumination requirement to activate full data broadcast mode; a fanfold array connector 45B; a solar array/solar cells 46; an Electric Power System (EPS) 48; a group of electronic sensors 49; a horizon sensor; a GPS receiver 50; a receiver antenna 53; a particle detector 54; a primary/student payload circuit board 55; a Pull Before Flight switch (PBF) switch 63; a system layouts 64 of the front and back printed circuit boards (PCBs) of the improved ThinSat unit [system layout 64A of Outer+Z Wall of ET-Sat, system layout 64B of Inner+Z Wall of ET-Sat, system layout 64C of Outer-Z Wall of ET-Sat, and system layout 64D of Inner-Z Wall of ET-Sat]; a 2.2 Ahr battery 65; and a simplex radio 66.

FIGS. 8A through 8D are data flowcharts of the flight data communication path as well as the engineering and flight unit interface diagrams. This is described in the Operations Section, below.

FIGS. 9A and 9B are sketches of an Improved ThinSat unit, the layout view, and the Canisterized Satellite Dispenser (CSD). Seen here are: an improved ThinSat unit 30 as part of the improved ThinSat constellations; a layout view 35 of ThinSat 30; a Canisterized Satellite Dispenser (CSD) 39 dispenses multiple ThinSats 30; a simplex antenna 42; a sensor 43 such as a earth/horizon sensor 43 (IR sensor able to remotely sense temperatures between 0 to +80 C, and functioned as an earth horizon sensor, contributing to the attitude determination); an Electric Power System (EPS) 48; a group of electronic sensors 49; a GPS receiver 50; a 2.2 Ahr battery 65; and a simplex radio 66. A ThinSat mothership/constellation includes a thin patch PCB, 2.2 Ahr battery, EPS, data processor, Global Positioning System (GPS) and receiver, antennas, simplex or duplex radio, solar cells, sensors, and AL7075 frames. One CSD canister launches up to 21 ThinSats at a time while minimizing orbital debris problems because of short lifetimes (<1 month.). This improved ThinSat unit represents a natural maturation of the miniaturization of ThinSat technology.

FIGS. 10A and 10B are sketches of a Canisterized Satellite Dispenser (CSD) and build views for layout of different sizes of improved ThinSat units. Demonstrated are: an improved ThinSat unit 30 as part of the improved ThinSat constellations that are a group of satellites for carrying payloads for experimentation and data collection; a layout view 35 of ThinSat 30; and a Canisterized Satellite Dispenser (CSD) 39 dispenses multiple ThinSats 30. Other components shown are described in several other views. FIG. 10A: The two parallel composite PCB plates (10×10× 0.1 cm) as shown in FIG. 10A with associated unibody frames with tabs are used to build the constellation with automation. The composite multilayered plates permit high density electronic part placements, thermal heat sink, EMI shield, radiation shielding, shear plane, and solar array thermal connection with a fused common bus electrical flex cable. The spring-loaded foldout can also be used as a boom for experiments. It can support torques for stiffness and attitude control, unlike a tether, and can also connect to sensors. The ThinSats were daisy chained in strings with the foldouts so that six satellites have a length of 3 m. A 3U string with 21 ThinSats is possible and would have a length of about 8.5 m and improve formation coordination and gravity gradient stabilization. The foldouts were also used as an option to significantly increase solar cell area and power, maintain ground plane with plasma, and used with position control for increasing drag up to tenfold. FIG. 10B: Larger 2.5 and 5 cm thick ThinSats permit improved volume for larger subsystems (e.g., ADACs and propulsion). Standard CSD and PPOD CubeSat launchers are available for constellations. One notes that the ThinSat is also very scalable, from $\frac{1}{2}$U CubeSats, to larger proposed sets (as shown in above figure). These range from a 2×3U (6U) CubeSat up to a 3×3×3U (27U) CubeSat. The 2×3U (6U) CubeSat is composed of $\frac{1}{2}$U and $\frac{1}{4}$U thick ThinSats, each spanning the 2U width, making them and $\frac{1}{2}$U volume, respectively. The 2×2×3U (12U) CubeSat is composed of $\frac{1}{2}$U and $\frac{1}{4}$U thick ThinSats, each 2×2U across the width and height, resulting in 2U and 1U volume "slices". The larger 3×3×3U (27U) is composed of $\frac{1}{2}$U thick ThinSat slices, each of them 3×3U across the width and height. This results in units of 4$\frac{1}{2}$U volume each. Each ThinSat slice in the resulting stack is a fully contained, functional, and independent satellite capable of conducting relevant and powerful science and technical missions. This concept follows the CubeSat standard, and common sized CubeSats can even be incorporated in to the ThinSat stack.

FIGS. 11A through 11D are Block layout of the Foldout hinge assembly and prototypes of the hinge assembly and as cannisters. Demonstrated in these drawings are: a ThinSats 31 in groups of three locked together with tabs 31A and slots 31B to fully constrain in X and Y directions; a foldout hinge assembly 36 with copper tape and clamps (FIG. 11A); an aluminum AL 6061 clamp 36A (strip 36B to frame 40); a NITI flat wire 36B; a Kapton & tape 36C are made from polyimide film with silicone adhesive or equal; a copper tape 36D or equal; a flex strip 36E or equal; a stainless steel panel 36F or equal; a ThinSat string 37—connected series of deployed ThinSats 30; a chassis 38 to contain canister; a Canisterized Satellite Dispenser (CSD) 39 dispenses multiple ThinSats 30; an AL7075 frame 40, chassis of ThinSat 30 connecting parts and boards, Al 7075 frame clamped between two PCBs; a pair of chassis rails 40A; a mounting rail slot 40A of frame 40; and a Printed Circuit Board (PCB) 41. FIG. 11A: Block layout of the Foldout hinge assembly for mass production (total of 240 hinges on 60 Sats). FIG. 11B—3U stack of 21 ThinSats mounted to a Test Fixture secured to the vibration table for testing. All three 3U CSDs passed testing for the Northrop Grumman Antares rocket. FIG. 11C: Four Strings of ThinSats in each CSD launch canister. FIG. 11D: Student Foldout boom for plasma diagnostics experiment.

FIGS. 12A and 12B are System layout of ThinSat. Shown are: an improved ThinSat unit 30 as part of the improved ThinSat units and a ThinSats 31 in groups of three locked together with tabs 31A and slots 31B to fully constrain in X and Y directions. Other components shown are described in several other views. With size and power as the driving constraints on the ThinSat design, a thinner and wider design evolved to maximize the surface for the designed enclosed volume. This allowed sets of ~2 W Alta Devices solar arrays to be mounted on front and back. With an Al 7075 frame clamped between two PCBs, the electrical design was greatly simplified with no need for additional connectors and interfacing between boards. The inner volume was divided into two sections, separated by an aluminum wall: The payload section and the NSL Bus section. Half of the inner volume of the satellite is available to be used by the payload, with the other half used completely by the NSL bus electronics. This division continues to simplify the design by allowing a single point electrical interface, and a clean mechanical interface, with no mixing of systems. The payload has multiple ports, providing an unobstructed access and viewing of space. Two circular ports are available along the thin, aluminum side, while three larger ports are available on the larger face. A diagnostic port is also available for direct testing of the payload while integrated into the ThinSat. ThinSats are designed to be fully independent satellites, but if desired can be connected in sets, or strings, of any number of units. For the NG-11 mission, strings of 3 and 6 were used. These strings were connected by articulating foldout arrays, or foldouts. Sets of panels joined by spring loaded hinges provided a gentle deployment, with semi-rigidity once deployed to transfer rotational momentum. The ThinSat constellation launched on the NG-11 mission used three sets of 3U Planetary Systems Corporation (PSC) Canisterized Satellite Dispensers (CSD). Several design features were driven by this selection of dispenser. This includes the total length of the ThinSat stack, which drives the spacing between ThinSats, as well as the thickness of the individual units. This also includes the use of clamping rails and the inability to contact the +Z door of the dispenser. Another large feature is the ability to make use of four areas traditionally used for the rails (standoffs) of a CubeSat.

PPOD Mechanical Design: The ThinSat design has been adapted to meet the requirements of many different form factors, as well as different CubeSat dispensers. It is currently designed to meet the specifications of the most traditional launcher, the PPOD. In order to accommodate the shorter total length available to a 3U form, the number of ThinSats in a stack reduced from 21 to 18. However, this reduction in total ThinSats also allowed for more space for the thickness of each ThinSat, as well as the spacing between them. FIG. 12A: CSD canister launcher standard for the ThinSats. 21 Thinsats can fit in one 3U CSD launcher. FIG. 12 B: system layout of ThinSat. showing the PPOD designed version.

Figure 21B:
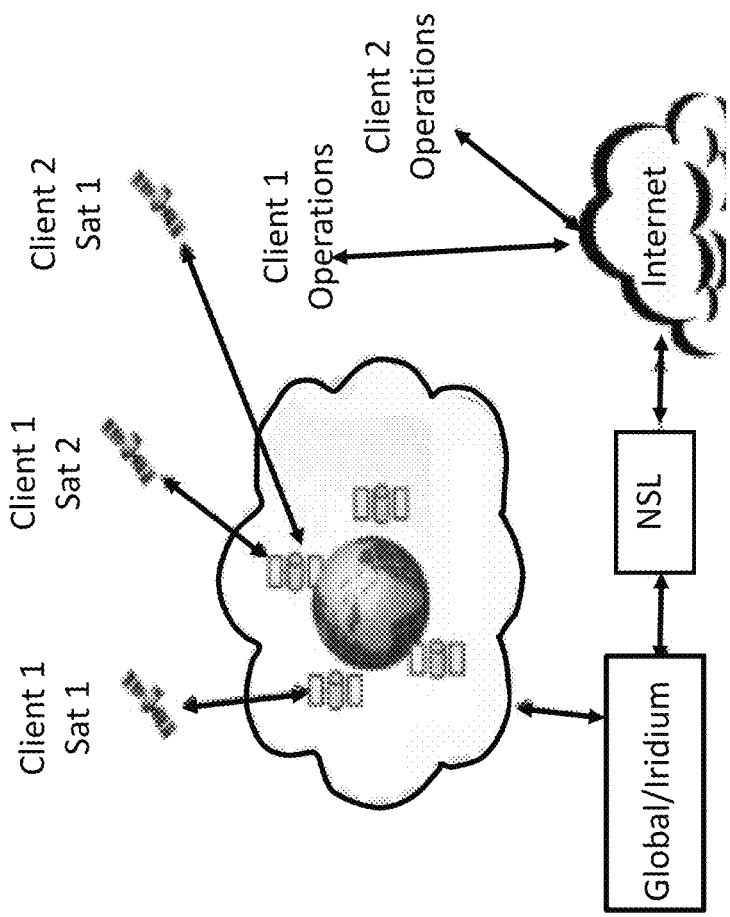

FIGS. 13A through 13D are ThinSat and 3U Stack of ThinSats plus STRINGS and ThinSat after launch as autonomous nodes and with the flipper unit. FIGS. 14A through 14C are deployment sketches of the Foldout hinge assembly and reactions of the deployment. FIGS. 15A and 15B are snapshots of baseline NODE configuration and the unfolding of the box solar array foldout. FIGS. 16A through 16E are recent sketches of the foldout hinge assembly, cannister and prototypes of the Improved ThinSat unit. FIGS. 17A through 17C are recent sketches of the foldout hinge assembly, cannister and improved ThinSat unit on rails. FIGS. 18A through 18D are recent sketches of the prototypes of the improved ThinSat unit as single and double frames and with the foldout solar and the drag details. FIGS. 19A through 19E are sketches of the foldout hinge assembly with various numbers of the improved ThinSat units. FIGS. 20A through 20C are sketches of the launch details and atmosphere orbit regions for the constellations of the improved ThinSat unit. FIGS. 21A and 21B are diagrams of the communication system used with the improved ThinSat unit. FIGS. 22A through 22D are tracking sketches, orbit decay and equations used in the operation of launching and tracking the improved ThinSat unit. FIGS. 23A through 23D are sketches of tracking and revealing data from the launch and communication with improved ThinSat unit. FIG. 24 is an example of weather data from one of the improved ThinSat unit. These drawings and sketches are described in the Operations Section, below.

FIGS. 25A through 25F show some of the enhancements of the improved ThinSat 30 unit including a flipper unit 90. Shown in these drawings are: a foldout: single panel 85 (previous 3 panel), replaced ribbon cable with wire; a solar circuit: Updated 86 to prevent current loops; a set of solar cells: Upgraded 87 to higher output cells; an antennas: GPS and simplex antennas upgraded 88 to higher quality; and for the GPS: an upgraded GPS radio 89. The improved ThinSat unit has a lengthy list of advantages (see below). The significant improvements include: improved ThinSat unit 30 modules can also be tied together architecturally and structurally in improved ways to directly or in groups (strings) to provide even improved data collection, workflow, redundancy, and solar/battery power; Improved the foldout design to stable the flight; improved the circuit layout to prevent solar loops; improved the solar arrays; improved the antennas; improved the GPS; Improved the spacing on bus; and improved the manufacturing on the improved ThinSat unit. FIG. 25C through 25F are related to the ThinSat FLIPPER 90 option for the ThinSat 30. FIGS. 25C and D show a real size FLIPPER Box 90 concept design, TRL 2, using two 3D printed Boxes and a NSL fabricated 6U flight structure to speed up visual improvements, problem solve, add candidate sensors and antennas. FIG. 25C is the launch configuration. FIG. 25D is a side view of the FLIPPER boxes 90. Note that it is deployed for normal operations when Primary mission is underway in first deployed state. FIG. 25E is the external Flipper TRL 2 design in the stowed configuration. The configurable sensor PCB sits on top of the Tuna Can extension, and on the bottom (not shown). In the Tuna Can "Octagon" sits all necessary electrical subsystems for operating the Flipper independently from the mother spacecraft. The labeled hinges are where the Flipper will fold out away from the spacecraft. Shown are the sensor PCB, Octagon (Internal Components), Flight Processor, EyeStar®-S4 TX/RX Radio, Nano EPS+MPPT Chargers, NSL GPS RX Radio, Particle Detector+Collimator, 2× Deployment Hinges, 4×SWh Battery Packs with frame, Sx 3 W Foldout Solar Panels (with Mylar Drag Panels), and an EyeStar®-S4 Antenna. FIG. 25F shows Deployment simulation of two Flippers on a 3×2U CubeSat (#2 diagram Flipper Baseline). Note the optional #3, 4, and 5 Solar and Drag Sail deployment after the primary Sensor deployment. The Flipper can deploy solar panels to charge batteries, as well as a Mylar Drag Sail to deorbit the satellite upon mission completion.

FIGS. 26A through 26D show some of the Recent ThinSat units with Improvements of the improved ThinSat unit 30. These speak for themselves and have the above-described improvements. Provided here are: an improved ThinSat unit 30 as part of the improved ThinSat constellations that are a group of satellites for carrying payloads for experimentation and data collection which are launched into and orbit through Low Earth Orbit (LEO) and Very Low Earth Orbit (VLEO) conditions; a ThinSat string 37—connected series of deployed ThinSats 30; and a Canisterized Satellite Dispenser (CSD) 39 dispenses multiple ThinSats 30.

FIGS. 27A through 27E show some of the prior art for satellite systems used in ELEO and LEO type operations. Here former patents and applications for various bayonets and knife devices are shown. These include: Prior Art 500 U.S. Pat. No. 9,121,932 Sep. 1, 2015 Janky et al.—Refining a position estimate of a low earth orbiting satellite; Prior Art 510 U.S. Pat. No. 7,583,225 Sep. 1, 2009 Cohen et al.—low earth orbit satellite uplink; Prior Art 520 U.S. Pat. No.

11,073,622 Cohen Jul. 27, 2021-performance and cost global navigation satellite system architecture; Prior Art 530 U.S. Pat. No. 11,226,416 Pullen et al. Jan. 18, 2022-system and method to reduce PPP filter convergence time using LEO frequency band signals; and Prior Art 540 TSAT (2U) and PhoneSAT (1U) In P-Pod launcher during final integration at Cal Poly. As can be seen, the Improved ThinSat unit is a unique combination and use as described herein.

The details mentioned here are exemplary and not limiting. Other specific components and manners specific to describing a Special Automatic out the front knife transformed as a bayonet device 30 may be added as a person having ordinary skill in the field of the art of bayonet, knife sporting and military defensive and offensive weapons devices and their uses well appreciates.

Operation of the Preferred Embodiment

The improved ThinSat unit 30 has been described in the above embodiment. The manner of how the device operates is described below. One notes well that the description above and the operation described here must be taken together to fully illustrate the concept of the improved ThinSat unit 30. The preferred embodiment of the improved ThinSat unit 30 is comprised of: a pair of thin patch PCB fastened on each side of an AL7075 aluminum frame, a 2.2 Ahr Battery, an electrical power system (EPS), a data processor, a GPS, a pair of antennas, a set of inhibits, a set of wiring harnesses; a simplex or duplex radio, a set of solar cells, and a series of various sensors; a selected payload; Further the improved ThinSat unit 30 includes an optional fanfold array structure whereby multiple ThinSats can be linked in order to form a constellation; and an addition of a Single panel 85 (previous 3 panel), a ribbon cable replaced with wire; a solar circuit: an updated component 86 to prevent current loops; a set of solar cells: an upgraded component 87 to higher output cells; an upgraded antennas: a pair of GPS and Simplex antennas upgraded 88 to higher quality; and an Upgraded GPS Radio 89 for the GPS wherein the ThinSat design with a thinner and wider design evolved to maximize the surface for the designed enclosed volume and allows sets of solar arrays to be mounted on front and back; wherein the Al 7075 frame clamped between two PCBs permits the electrical design to be greatly simplified and minimize the need for additional connectors and interfacing between boards; wherein the inner volume is divided into two sections, separated by an aluminum wall as a Payload section and a NSL Bus section which permits half of the inner volume of the satellite to be available for the payload and the other half used completely by the NSL Bus electronics which further simplifies the design and allows a single point electrical interface and a clean mechanical interface; wherein the payload has multiple ports, providing an unobstructed access and viewing of space and two circular ports available along the thin, aluminum side and three larger ports are available on the larger face; and wherein the improved ThinSat unit 30 enables more possibilities for research, education, and product development; and wherein improved ThinSat unit 30 is designed to be a cost effective means of getting research into space, making them a perfect option for short term sensor testing, ground station calibration, or any variety of short-term educational or commercial missions. The improved ThinSat unit 30 is further described with enhanced with key product highlights including: Connection to Globalstar (simplex) or Iridium (duplex/command) data network as a 24/7 real-time connection for data communication and distribution; a Zenith Pointing Via Eyestar® radio; an efficient payload integration; an included ground station; an unibody design provides EMI radiation shielding; effectively the smallest satellite on market; at least fifty percent (50%) of structure dedicated to customer payload; and a wide array of launch configurations; as well as other options including: assembly as a set pf constellations or in-dividual units; a Langmuir probe, a temperature sensor, a particle sensor, a system complete with full mission support; a GPS system; and a camera.

FIGS. 8A through 8D are data flowcharts of the flight data communication path as well as the engineering and flight unit interface diagrams. Provided are: a set of data flowcharts 67 of communication path; a flight unit interface diagram 68; an Engineering Unit Interface Diagram 69 and Data Flow; and a flight unit data flow 70. With the Globalstar or Iridium data constellation one can use the improved ThinSat unit and monitor the satellite 24/7 anywhere in LEO orbits with data available anytime, without the need for expensive ground stations. With a nearly one hundred percent (100%) success rate in orbit using the NSL EyeStar® processor and Globalstar or Iridium comm systems (radios have been in space with several of them tumbling) one can contribute with the improved ThinSat units and constellation systems to the commercial, educational, and research of the small satellite market that is rapidly growing. In addition, the accompanying EyeStar radio is ideal for the next step to advance many NASA, DOD, and commercial satellites now that appropriate FCC, NTIA, and ITU licenses have all been approved. Note also: Phase 1 data flow; Phase 2 engineering unit interface diagram and data flow; Phase 3 flight unit interface diagram; and Phase 3 flight unit data flow.

FIGS. 13A through 13D are ThinSat 30 and 3U Stack of ThinSats plus STRINGS and ThinSat after launch as autonomous nodes and with the flipper unit 90. Shown are: an improved ThinSat unit 30 as part of the improved ThinSat constellations that are a group of satellites for carrying payloads for experimentation and data collection which are launched into and orbit through Low Earth Orbit (LEO) and Very Low Earth Orbit (VLEO) conditions; a foldout hinge assembly 36 with copper tape and clamps (FIG. 11A); a ThinSat string 37—connected series of deployed ThinSats 30; and a Canisterized Satellite Dispenser (CSD) 39 dispenses multiple ThinSats 30. FIG. 13A: ThinSat and 3U Stack of 18 ThinSats designed for the PPOD launcher. (See FIGS. 12A and 12B, above for more detail). FIG. 13B: STRINGS: Three 3U CSD launch containers each contained 21 ThinSats and 4 strings each for a total of 12 strings. New Study of Ionosphere below 350 km The Very Low Earth Orbit (VLEO) or Extremely Low Earth Orbit (ELEO) Region (90 to 350 km) can now be explored with periodic launch of constellations of affordable small satellites. ThinSats are particularly suited for new research opportunities in this new region, DOD intelligence gathering, space weather multipoint measurements, and education. Some new areas for investigations include: science: underexplored region of space that is especially important for atmosphere climate coupling, space weather, global electric circuit, E-F region, in situ ionosphere, precipitating energetic particles, gravity waves, and much more! Technology: aerodynamic control, re-entry physics, tethers, intelligence gathering, remote sensing, ion thrusters, radar calibration, attitude control, testing parts to TRL=9. There is little space debris concern: Lifetime in orbit is weeks to months; ideal for constellations; much less radiation or damage from solar flares. Aerodynamic ThinSats—for making unprecedented measurements with low-cost satellites for instant monitoring of waves, plasma, particles, EM spectrum, constituents, and remote sensing. Radiation shielding—of atmosphere in VLEO orbits greatly reduces radiation damage (i.e., resilience). educational: space for many consecutive low-cost missions delivering a virtual a learning sandbox for rapid innovation.

FIG. 13C: Autonomous NODE ThinSat configuration: multipoint and instant data to the internet. By adding a radar reflective box and solar array foldouts to each ThinSat the tracking and power available does not require the satellites to fly in strings. The independent NODE ThinSat configuration give more multipoint measurements with instant data available to the internet as illustrated in FIG. 4 In addition, constellations can be launched that are hybrids of both parallel and serial attachment of ThinSats providing more payload volume and increasing ballistic coefficient. FIG. 13D: Is an Illustration of multiple satellites with different FLIPPER configurations 90. The left 3U can be seen with downward pointing FLIPPER, while a 3×2U has a magnetic field-oriented FLIPPER with the other perpendicular to it. The 12U shows with 4 FLIPPERs. This proposal baseline design is a 6U. The Flipper unit 90 is explained above in FIG. 25C through 25F.

FIGS. 14A through 14 C are deployment sketches of the Foldout hinge assembly and reactions of the deployment. Here are provided a ThinSat string 37—connected series of deployed ThinSats 30; a Dynamic deployment 80 of a full stack 31 of 21 ThinSats 30, in 4 strings 39 over time; a more dynamic deployment 81 of a full stack 31 of 21 ThinSats 30, in 4 strings over time; and a resonant oscillation 82 as the foldouts 39 unfold to steady state. FIG. 14A: dynamic deployment of a full stack of 21 ThinSats, in 4 strings over time. Also note the wave formations, and the snakelike twisting of panel 3. Thinsat Fold-out string dynamics-sketches of the snapshots of video dynamics are shown in FIG. 14A. Note the sinusoidal, low energy, unfolding of the four strings within one CSD. As planned, all the strings push away from each other, so they do not collide. Within a few minutes the strings settle down and become stable if no external disturbance torques are present. FIG. 14B: sketches of the video snapshots from the dynamics video of the maximum first overshoot of the unfolding process for three damping constants. FIG. 14B snapshot of the video shows the foldout shapes during maximum overshooting when first released for undamped, nominal, and overdamped absorbing energy material. Damping: The purpose of the foldouts with associated torsion springs and dampers is to push the individual satellites and strings away from each other when first released. There were three foldout panels between each ThinSat and four hinges with damping. Each foldout panel was approximately 10 cm long giving a separation between ThinSats of 30 cm. The other purpose of the nitinol torsion springs with dampers was to maintain a stiff force along the hinge axis to keep the strings linear. The hinges also allowed a torque to be applied between all the ThinSats in the string that was perpendicular to the hinge pin. This way all the ThinSats in a string would have the same attitude relative to each other for sensor comparisons. The assumption was that the initial vibrations of unfolding would damp out in several minutes. This assumption may be incorrect if there is a disturbance force that can resonate with the natural frequency of the foldout hinge assembly as discussed later (remember that even a steel bridge, like the Tacoma bridge, can collapse from a small continuous disturbance force). FIG. 14C: Resonant oscillations as the foldouts unfold to steady state. Resonance string vibrations dynamic 2-D analysis of the 3 ThinSat string and the 6 ThinSat string were made using measured material, spring, and damping constants. The natural frequency of the first Harmonic is 11 RPM and is shown in the FIG. 14C. Note that the two end ThinSats are pointing in opposite directions during this resonance and flipping back and forth every 6 seconds. This string vibration could explain the rotation spin anomalies if the amplitudes are similar to that shown in the figure. Rotation about the string axis could also explain the spin data. There are likely higher resonant harmonics for the 6-ThinSat string as well which is still being simulated.

FIGS. 15A and 15B are snapshots of baseline NODE configuration and the unfolding of the box solar array foldout. Shown in these figures are: an improved ThinSat unit 30 as part of the improved ThinSat constellations that are a group of satellites for carrying payloads for experimentation and data collection which are launched into and orbit through Low Earth Orbit (LEO) and Very Low Earth Orbit (VLEO) conditions; a ThinSats 31 in groups of three locked together with tabs 31A and slots 31B to fully constrain in X and Y directions; a box solar array foldout 78; and a radar reflector 79. FIG. 15A: baseline NODE configuration showing the box solar array foldout and radar reflector on the right. FIG. 15B: Snapshots of baseline NODE configuration unfolding and showing the box solar array foldout and radar reflector on the right.

One sees in FIG. 15B a Node Thinsat Configuration—the original plan for NG-11 constellations was the NODE ThinSat design because there would be many multipoint measurements and each student team would have their own autonomous satellite to track and understand. However, the initial NODE design was put on the shelf for the reason that it did not meet the FCC and JSpOC requirement of having a large 1U area for radar cross section. Also, there were some benefits with the strings for students to collaborate with their data together on various sensors for comparison and all having the same attitude reference point. The ThinSat launch design allows for releasing hybrids or combinations of Strings, Nodes, and/or 1U or 2U CubeSats.

Requirement Plan for NODE Flock:
A. Optimize message for greater than 80% throughput, even if spinning at 10 RPM
B. Concentrate each string mass and size to increase ballistic coefficient and radar cross section with corner reflector. Creates full 10 cm by 10 cm cross section in all orientations
C. Keep symmetric design with torque cancelation
D. Include 3×1T unfolding strings with one drag foldout
E. Trains of ThinSats would have less ram surface area and higher ballistic coefficient
F. Optional: Front ThinSat could be Mothership, while other two could each support two payloads
G. Mothership has extra batteries and radio, other two ThinSats would only have payloads and solar cells
H. Increases total possible payloads per Mothership.
I. Use drag foldout for aerodynamic stabilization, damping, increased radar cross section in each dimension, collimator for sensor FOVs, and increased solar area
J. Only one hinge between each ThinSat in Train increases stiffness
K. Include a magnetic detumble circuit and control loop FIGS. 16A through 16E are recent sketches of the Foldout hinge assembly, cannister and prototypes of the improved ThinSat units. Shown here are: a ThinSats 31 in groups of three locked together with tabs 31A and slots 31B to fully constrain in X and Y directions; a foldout hinge assembly 36 with copper tape and clamps (FIG. 11A); a ThinSat string 37—connected series of deployed ThinSats 30; a chassis 38 to contain canister; and a Canisterized Satellite Dispenser (CSD) 39 dispenses multiple ThinSats 30. FIG. 16C: Thin- Sats loaded into 3U deployer. FIG. 16D: ThinSat Grouping Examples InstaSat and ThinSat standard formation of 3 or 6 in a strings. Articulating fanfolds or wires are used to group ThinSats in to strings. They are comprised of PCBs and nitinol wire with a distance of approximately 30 cm in-between individual ThinSats. Some of these articulating fanfolds will contain solar arrays to generate additional power for the string of ThinSats. The articulating fanfold choice is also dependent on the payload and mission requirements The CSDs can contain any combination of String lengths, ThinSat thicknesses or even CubeSats. For example, one 3U CSD may have two strings of six ThinSats and three Strings of three ThinSats. The specific layout of each CSD will depend on the given mission's requirements and payloads. ThinSats buses have two configurations: mothership and daughter-ship. Both configurations include the same Globalstar or Iridium radio, C&DH and electrical power systems. If the ThinSats are part of a String, each String will have at least one mothership and any number of Daughter-ship(s). Each mothership contains a GPS and foldout camera. Some motherships contains an energetic particle detector and plasma probe board. The mothership's camera and GPS allow satellite tracking and attitude determination.

FIGS. 17A through 17C are recent sketches of the Foldout hinge assembly, cannister and Improved ThinSat unit on rails. Demonstrated in these views are: an Improved ThinSat unit 30 as part of the Improved ThinSat Constellations that are a group of satellites for carrying payloads for experimentation and data collection; a ThinSat string 37—connected series of deployed ThinSats 30; and a Canisterized Satellite Dispenser (CSD) 39 dispenses multiple ThinSats 30. Other components shown are described in several other views.

THINSAT BUS DESIGN—Each ThinSat will weight approximately 280 g and has dimensions of 111.1×114.2× 12.5 millimeters as shown in FIG. 17A. Of these dimensions, approximately 50% of this volume will be reserved for the payload. This will normally be filled with a student payload such as the X-chips, TSL boards, or custom student developed payloads. The design is meant to fit in the CubeSat form factor allowing ThinSats to use a standard 3U Canisterized Satellite Dispenser (CSD) as shown in FIG. 17C. A 3U volume is equal to 21 ThinSats (7 per U). There is also the option of having ThinSats that are thicker than the standard ThinSat. ThinSats are referred to in thicknesses of T which is equivalent to around 12.5 mm. For example, a 2T ThinSat would have dimensions of ~111.1×~114.2×~25 millimeters. A standard ThinSat is referred to as being one T. Variable numbers of Individual ThinSats can be grouped together to form "Strings" in multiples of 3 (i.e. 3, 6, 9, 12, etc.). The Stings are grouped according to mission requirements and payload specificity in to a "Stack". The ThinSats Stacks are locked into the CSD using two rails on every third CubeSat. Tabs on all four sides hold the ThinSats in place.

FIGS. 18A through 18D are recent sketches of the prototypes of the Improved ThinSat unit as single and double frames and with the foldout solar and the drag details. Provided here are: an Improved ThinSat unit 30 as part of the Improved ThinSat Constellations that are a group of satellites for carrying payloads for experimentation and data collection which are launched into and orbit; a foldout hinge assembly 36 with copper tape and clamps (FIG. 11A); and a drag detail 83.

Other components shown are described in several other views.

Each spacecraft is comprised of one or multiple ThinSat units, one or more units per experiment. Each spacecraft will deploy a drag instead of a foldout panel, from the "end" unit. The drag will provide aerodynamic stabilization of the spacecraft, to maintain the long axis in the RAM direction. One further observes that: FIG. 18A is a single frame 1 Unit, showing foldout detail with a max mass 285 g; FIG. 18B is a single frame showing drag detail; FIG. 18C is a double frame ThinSat unit detail; and FIG. 18D is a double frame ThinSat unit with drag detail. Any drag detail served to slow down the Thinsat and promote more rapid orbit decay after the experiment is completed.

FIGS. 19A through 19E are sketches of the foldout hinge assembly with various numbers of the improved ThinSat units. Shown are an improved ThinSat unit 30 as part of the improved ThinSat constellations that are a group of satellites for carrying payloads for experimentation and data collection which are launched into and orbit; a ThinSats 31 in groups of three locked together with tabs 31A and slots 31B to fully constrain in X and Y directions; a foldout hinge assembly 36 with copper tape and clamps (FIG. 11A); a ThinSat string 37—connected series of deployed ThinSats 30; and a drag detail 83. Other components shown are described in several other views. FIG. 19A is a ThinSat 2E, 1×6T with a Max Mass 1725 g. FIG. 19B is ThinSat 2F, 1×2T and 1×1T with a Max Mass 855 g. FIG. 19C is ThinSats 2B and 2C, 2×2 Ts and 3×1 Ts with a Max Mass 1995 g. FIG. 19D is ThinSat 2A, 1×2T and 5×1 Ts with a Max Mass 1995 g. FIG. 19E ThinSat 2D, 1×2T and 7×1 Ts with a Max Mass 2565 g.

FIGS. 20A through 20C are sketches of the launch details and atmosphere orbit regions for the constellations of the Improved ThinSat unit. Shown are a graphic 360 showing a unique purpose for ThinSats is to map and explore the ionosphere and atmosphere in the VLEO and ELEO region (350 to 90 km); a depiction 370 of a ThinSat Launch Profile; and a launching of a ThinSat 380 i.e., a ThinSat manifest on NG-11 launch. FIG. 20A: A unique purpose 360 for ThinSats is to map and explore the ionosphere and atmosphere in the VLEO and ELEO region (350 to 90 km). While sounding rockets probe this region (vertical profile at one location) for tens of minutes, the ThinSats will make unique horizontal and global cuts and measurements for >40 orbits. FIG. 20B: ThinSat Launch Profile 370 Additional capacity may be added to meet future increases in demand. The orbit for the Antares ride share ThinSats is expected to be 200 to 250 kilometers with a predicted orbital life of 5-7 days which mitigates debris concerns of the regulatory bodies. Each launch can theoretically carry up to 80 ThinSats depending on the demand. This means that solely using the Antares ISS resupply missions up to 480 ThinSats will have launch opportunities over the next 3 years. While the standard payload will belong to students TSL is opening these flight opportunities to education, research and industry organizations that wish to take advantage. At an estimated $30,000 per payload (with bus and launch) the program costs significantly less than a CubeSat launch. TSL hopes to coordinate these partnerships. Another attractive aspect of the ThinSat Program is a significantly reduced burden of paperwork as most paperwork and licensing is handled by TSL. The Antares mission launch approximately every six months. TSL is planning on selecting participating schools and partners at least 12 months in advance. The ThinSat Program provides a true "one-stop shop" space environment research opportunity for customers that includes a ThinSat bus, launch, environmental and acceptance testing, FCC and ODAR licensing, and an online interface for data collection and analytics. Participants only need to provide a payload and minimal information to have it fly in space and receive data. FIG. 20C: ThinSat manifest NearSpace Launch data and ground station services 380 provide a unique alternative to traditional ground station transmissions thanks largely to the fact that NSL system does not require a traditional ground station. NSL ground station and data services are available to a user at a monthly subscription charge that is a fraction of the cost of the competition, while still providing 24/7, reli-able data. It is a unique alternative to traditional ground station transmissions.

FIGS. 21A and 21B are diagrams of the communication system used with the improved ThinSat unit. Provided are: a graphic depiction 390 of Globalstar constellation of satellites for Global coverage and real-time 24/7 visibility; and a chart 400 demonstrating the overall Communications Architecture and Flow Diagram/Data transfer from many ThinSat EyeStar® radios to the internet, console, and dashboard for the constellation ground segment. Globalstar constellation of satellites for Global coverage and real-time 24/7 visibility. Globalstar has sufficient current network and system capacity. Even if there were hundreds of CubeSats in orbit, all simultaneously using the Globalstar network, the communications load would be just a tiny fraction of the traffic that Globalstar currently handles. There are currently no capacity issues at any individual gateway, nor are there anticipated to be any future capacity limitations due to the addition of CubeSats. The Globalstar system appears to have capacity to handle thousands of CubeSats transmitting thousands of packets per day. The Near Space Launce (NSL) ground station technology (FIG. 21B) is comprised of the following elements:
  A. The Globalstar or Iridium communications network
  B. The NSL server
  C. The Web Console
  D. The web Application Program Interface (API)
  E. The Front-End Processor (FEP)

The Globalstar or Iridium communications network provides the actual ground-to-space link. All the normal radio link management issues are delegated to Globalstar or Iridium. The NSL server communicates via the Globalstar/Iridium network to send and receive satellite data. All data is logged and archived on the server. The server database performs real-time replication to a backup server. The typical full path latency for Simplex data from satellite to the NSL server is under 5-15 seconds. For those who desire, the NSL web console permits viewing, graphing, zooming, translation, and downloading Simplex telemetry data (commonly 18 or 36 Bytes per packet). To display and download meaningful Simplex. FIG. 21B: Flow Diagram and Data transfer 400 from many ThinSat EyeStar® radios to the internet, console and dashboard for the constellation ground segment, Constellation Ground Segment—The NSL server web API provides the programming capability to send and receive all data streams over the Internet. That includes receiving simplex telemetry packets, sending and receiving data files, sending SMS commands, and the option of receiving link metadata the Globalstar ground segment can service thousands of satellites with storage available to the client on a single time ordered database. The servers are redundant and fault tolerant. The console provides supervisory management of the various satellites and constellations. Included is a special data dashboard for the student teams. Some of the features of the student dashboard include: The users, students and teachers can . . . . See test data from satellites before launch.

A. See real-time data in charts
B. Pick among potentially hundreds of satellites to
C. view
D. Compare data across multiple satellites in the constellation
E. See real-time constellation tracking
F. Collaborate with others in the same launch in a discussion forum
G. Configure custom parsing for their packet formats
H. Administrators can . . .
I. Configure each mission
J. Control who has access to the site
K. See status of live devices, users logged in, and active teams
L. Send email blast to all participants
M. Upload resources for students FIGS. 22A through 22D are tracking sketches, orbit decay and equations used in the operation of launching and tracking the improved ThinSat unit. Demonstrated here are:
  a chart 410 showing ThinSat orbits for 50 hr life using NASA's General Mission Analysis Tool (GMAT) software; a graph 420 plotting orbit period versus time; an equation 430 for calculating ThinSat orbits; and a graph 440 plotting Orbit altitude versus time for ThinSat. Globalstar Simplex units have been fully demonstrated in space and have the potential as a game changer using a low cost, small, and independent Black Box link if adopted for new satellites. This low power and independent Black Box link ensures mission success, minimizes orbital debris collision with more accurate tracking predictions (JSpOC) from GPS, and greatly improves failure analysis visibility for correcting future designs and assigning insurance risk. All necessary FCC, NTIA, and Globalstar licenses were obtained for the 8 CubeSats and ThinSat constellation. The modular automated manufacture (AM) CubeSat systems that were tested in orbit (TRL=9) included new robotic or 3D printed unibody structure, thin articulating foldouts, EyeStar® Simplex radios, and 241 other subsystems (NSL/Globalstar comms, tracking Black Box comm, EPS power, solar arrays, data processor, horizon IR image, and other sensors). Recent orbital data illustrates Globalstar performance for polar versus lower inclination orbits, latitude, longitude, altitude, attitude, latency, throughput, and other metrics. FIG. 22A: ThinSat orbits for 50 hr life using NASA's General Mission Analysis Tool (GMAT) software. The results of this simulation are to help with interpretation of particle detector data, solar cell data, IR data, and payload data recorded during the flight. Correlating these data points and the simulation, a ThinSat string can be identified, and ID orbit fine-tuned. The model includes an altitude dependent drag force as well as an asymmetric gravitational force to account for the oblateness of the earth. The basic orbit earth track is shown in FIG. 22A for the 50-hour orbit based on the orbital elements given in the official ThinSat TLE. The simulation is written in Mathematica and uses the function NDSolve to numerically solve the differential equations of motion derived. The initial conditions in spherical coordinates were derived from the TLE given from launch. From the particle detector data, one knows that the satellite lasted in orbit about 2-2.5 days, so in the modeling processes the drag parameter, gamma was varied to make the satellite deorbit, or fall below 100 km, from orbit after about 48 hours. This all-encapsulating drag parameter in multiplied by rho (r-R), the density of air at the given altitude above the Earth's surface. For comparison, a simulation was also done using NASA's General Mission Analysis Tool (GMAT) software. It was found that the results of the simulation resemble closely that of GMAT, which provides greater confidence in the relative accuracy of the model, even if there are some obvious problems still to be resolved. FIG. 22B: Orbit period versus time. FIG. 22C: This original model was constructed for the purpose of simulating a ThinSat flight. The results of this simulation are to be compared to particle detector data recorded from the flight. It is anticipated to correlate this data and the simulation, so that one has a reasonable approximation of the orbit of the ThinSat. The model includes an altitude dependent drag force as well as an asymmetric gravitational force to account for the oblateness of the Earth. FIG. 22D: orbit altitude versus time for 50-hour orbit and 65-hour orbit. The Weiss ThinSat lasted 66 hours.

FIGS. 23A through 23D are sketches of tracking and revealing data from the launch and communication with Improved ThinSat unit. Demonstrated are: a chart 450 simplex coverage maps show good global coverage. Red dots show packet transmission; a chart 460 Black Box Particle Detector option demonstrating energetic particle data coverage map; a chart 470 demonstrating terminator periodic variation with ThinSat solar cell data (zero points in eclipse; and a chart 480 Energetic particle measurements for 540 minutes from six ThinSats for comparison. FIG. 23A: simplex coverage maps show good global coverage. Dots show packet transmission. In FIG. 23B is an example of STX-2 Simplex energetic particle data from several orbits of GEARRS2. Small gaps in track show duty cycle of transmitter and long gaps due to sun sync of 78 packets of data sequence to save system power. Note the South Atlantic Magnetic Anomaly (SAMA) and the Aurora Oval. GEARRS2 Simplex coverage maps (FIG. 23A) are uniform over the entire earth with a weaker coverage area in the Pacific Ocean. The 53-degree latitude cutoff is due to the GEARRS2 Satellite inclination and not due to the Globalstar link. FIG. 23C: Terminator periodic variation with ThinSat solar cell data (zero points in eclipse. ThinSat solar cell instant measurements: The relative solar intensity is a unitless value ranging from 0-100 which represents a normalized output of the satellite's two solar cells (see FIG. 23C). The solar voltages were summed and averaged in ten-minute intervals from the time of payload separation before normalizing. To determine whether the satellite was believed to be in daylight at the time of each solar reading, the longitude of the day and night terminators at mission epoch were calculated using SatPC32 software, neglecting the effects of the satellite's latitude and earth's orbit around the sun. These longitude values were then extrapolated through the mission's approximately 50-hour mission lifetime by moving the longitude values westward at a rate of 1-rev/day. Using the longitude predicted by the solution to the model of the orbit, the satellite was inferred to be in light or darkness by its position relative to these terminators. In other words, the peaks and troughs of the square waveform represent predicted daylight and darkness cycles respectively of the satellites in their orbits. FIG. 23D: Energetic particle measurements for 540 minutes from six ThinSats for comparison. ThinSat Energetic Particle Measurements—The high-energy particle detectors on each of the satellites reported a count value over the sampling interval which was used to calculate the number of counts per minute at several times throughout the mission lifetime. Using the solution to the model of the orbit, the team was able to determine the approximate latitude and longitude at which each of the readings was taken (see FIG. 23D). In FIG. 23D, the horizontal axis represents the time since mission epoch which was set at the time of payload separation. The vertical axis scaled on the left-hand side represents the number of high-energy particles per minute through the detector for all points on the scatter plot. The waveforms superimposed on the scatter plot are the predicted latitude and longitude of the satellite which are scaled by the vertical axis on the right-hand side.

FIG. 24 is an example of weather data from one of the improved ThinSat unit. Shown is: a series of charts 490 showing plasma and energetic particle space weather nighttime measurements in the VLEO region (180-240 km). The lower panel in FIG. 24 shows the energetic particles (E>45 keV) for precipitating (LE5) and quasi-trapped (TE2). Prominent are the auroral zone, SAMA, equatorial ion zone, mid-latitude zone, and the Lightning-induced Electron Precipitation (LEP) events. Much space weather research and relevant student education can be advanced with ThinSats and CubeSats in the weakly sampled space weather region below ISS altitude of 400 km. Space weather Phase 1 benchmarks from the National Science & Technology Council, June 2018 Agencies, Departments, Executive Offices follows:

Benchmark: Induce Geo-Electric Fields-Less noise: ThinSat can fly E and B field sensors in VLEO.
Benchmark: Ionizing Radiation-Less Background radiation!
Direct precipitating energetic particle sensors in VLEO. Also monitor UV and X-ray ionization in Ionosphere.
Benchmark: Ionospheric Disturbances-Direct in situ F-region densities, Temperatures, and Dynamics
Benchmark Upper Atmospheric Expansion-Direct in situ measurements of drag, plasma trough, auroral compression, and composition permits data collection above the "black-out" region anywhere on the earth.

In the future, ThinSat or full CubeSat orbits could use high efficiency ion engines to add impulse to compensate for drag. Tether systems could help transform orbital energy into power at high altitudes when drag is low. The extremely low altitude data set of the S81-1 SEEP satellite flown in 1982 (which required propulsion to maintain orbit) provides an example of the rich data available from this region of space. SEEP made some of the first space weather observations10 with unprecedented signal to noise ratios, due in part to the low altitude platform. The SEEP top panel shows the red 630 nm optical line with the Auroral and equatorial fountain emissions. The SEEP plasma probe data in the Center panel used the same electrometer design found on TSAT and ThinSats. It was also attached to the front-end cap edge and in the ram direction. Note the clarity of data in the south to north pass of FIG. 24; auroral irregularities and strong ionization, plasma trough density depletions, increased ionization in the South Atlantic Magnetic Anomaly region, Traveling Ionospheric Disturbance (TID) in the F-region (above thunderstorms), the equatorial fountain effect with equatorial depletions (bubbles), the E-F region transition at lower altitudes, and E-region irregularities.

Potential applications-engineering and technology development: The low cost and high launch cadence of the ThinSat makes it an ideal way to fast track development of new space technologies. A constant difficulty with high risk space missions is a lack of state of the art technology with flight heritage. This also presents a barrier to market entry for small business and startups that first need to fly and prove their technology. ThinSats represent an economical way to demonstrate a part or system in a space environment. The price for CubeSat flight demonstrations may be unobtainable to these enterprises. The competition for flight opportunities can also be a barrier to getting technology flight proven in a short period of time. ThinSats can act as technology demonstrators launching individual components or systems into space. The low cost and short lead time can allow organizations to launch and achieve higher technical readiness levels within the span of longer-term programs and projects. There is also little risk for delayed missions due to the volume of launches and the ability for payloads to be easily integrated into new ThinSats. This can help mitigate risk in larger more expensive space missions. The OA-10 mission has a ThinSat that carries a novel supercapacitor that is having its maiden space flight.

Earth and atmospheric science—The altitude range of 100 to 300 kilometers is formally referred to as extreme low earth orbit (ELEO). This region is of great interest as it represents the transition from atmosphere to space. It is affected by space solar storms and flares from above and from below by terrestrial weather. Despite this, it is a region of the atmosphere that has not received much attention due to limited orbit lifetimes for satellites at that altitude. It is also unreachable by research balloons or fixed wing aircraft. While sounding rockets and traditional SmallSats have targeted this area for study the costs have proven too high for regular missions. Thus, the ThinSat program offers a rare opportunity for atmospheric scientists and other interested organizations to study the ELEO environment. Deploying large constellations of ThinSats in orbit at once, over multiple launches can achieve a volume of atmospheric data available for research that has never been available to the scientific community before. The data gathered by all the student payloads may be made available to the scientific community. A number of ThinSats per launch will have Langmuir probes. This instruments is used to determine the physical properties of plasma such as the electron temperature, electron density, and electric potential of a plasma. Energetic particle detectors alongside the probes will be used to determine the relative environment or "space weather" at the relevant altitude. The US Naval Academy developed a ThinSats payload on the OA-10 which contains an experiment to characterize the location and distribution of abnormalities in the ionosphere and then analyze their effects on GPS and other satellite-to-ground transmissions.

Life science and exo medicine-Gravity has been a constant in biological experiments since their inception, but with the advancement of spaceflight technology new opportunities have arisen that allow the effects of gravity on biological processes to be studied. One of the fundamental tenets of biological research is the reproducibility of results, without the ability to reproduce the results of an experiment it is difficult to determine the efficacy of the procedure and the reliability of the data. As such, most biological experiments utilize large sample sizes, many biological replicates, and many repetitions to ensure the validity of the results. Until now it was near impossible for many institutions to economically justify the expenditures and resources required to conduct biological research in microgravity. There is very limited space aboard launch vehicles, driving up the cost/payload, lowering the frequency of bio-payloads launched, and therefore data yield is low and validation is difficult due to smaller sample sizes, fewer repetitions, and inherent error found when prototyping/testing new technologies. The ThinSat program addresses each of these issues and opens the door to fast-paced, affordable, compact, standard, and repeatable microbiological experimentation. It has the potential to be a game-changing technology, especially for smaller institutions and organizations wishing to get a start in the field. OA-10 contains an experiment that will monitor growth rates of bacterial strains in a microgravity environment. The measurements will be compared to growth rates in normal terrestrial conditions.

With this description it is to be understood that the improved ThinSat unit 30 and constellations that are a group of satellites for carrying payloads for experimentation and data collection which are launched into and orbit through Low Earth Orbit (LEO) and Very Low Earth Orbit (VLEO) conditions is not to be limited to only the disclosed embodiment of product. The features of the Improved ThinSat unit 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. Various features and aspects of the disclosed embodiments can be combined with or substituted for one another in order to form varying modes of the disclosed inventions. Thus, it is intended that the scope of at least some of the present inventions herein disclosed should not be limited by the disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any embodiment, feature, or combination of features shown herein. This is true even if only a single embodiment of the feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed considering the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. An Improved ThinSat unit (30) is comprised of:
   (a) a pair of thin patch (PCB) fastened on each side of an aluminum frame;
   (b) a Battery;
   (c) an electrical power system (EPS);
   (d) a data processor;
   (e) a Global Positioning System (GPS) and a GPS receiver;
   (f) a pair of antennas;
   (g) a set of inhibitors;
   (h) a set of wiring harnesses;
   (i) a radio simplex and/or a duplex;
   (j) at least one solar cells with a group of higher output cells;
   (k) a series of electronic sensors;
   (l) a Zenith Pointing Via an Eyestar® radio;
   (m) an unibody design with Electromagnetic Interference (EMI) radiation shielding; and
   (n) a selected payload in a specified payload zone/section
wherein the improved ThinSat unit has a thinner and wider design evolved to maximize a surface for an enclosed volume of a satellite which allows a set of solar arrays to be mounted on front and back; wherein the aluminum frame is clamped between the pair of thin patch PCBs which permits an electrical design to be greatly simplified for a connector and interface between the pair of thin patch PCBs; wherein an inner volume of the satellite is divided into two sections, separated by an aluminum wall whereby one section is the specified payload zone/section and a second/other section is a NSL Bus section which permits one half of the inner volume of the satellite to be available for the payload zone and an other half to be useable completely by the NSL Bus section and a group of electronics, which further simplifies an electrical and a mechanical interface; wherein the payload has a set of multiple ports that provide an unobstructed access and an unobstructed view of space, the payload section has a set of two circular ports along a side of the aluminum frame, and the payload has a set of three larger ports on a larger face of one of the thin patch PCBs; wherein the Improved ThinSat unit (30) enables a group of opportunities for research, education, and product development; and, wherein Improved ThinSat unit (30) provides a design that is a cost effective way of getting research into space and a good way for short term sensor testing, for ground station calibration, and for short-term educational and commercial missions.

2. The Improved ThinSat unit (30) described in claim 1 wherein the Improved Thinsat unit is a fanfold array structure whereby a multiple of the fanfold array structures can be linked in order to form a constellation af multiple satellites.

3. The Improved ThinSat unit (30) described in claim 1 wherein the at least one solar cell is a fanfold array structure having a group of multiple solar cells whereby the the group of multiple solar cells provide a duplicity of power from the fanfold array structure of the group of multiple solar cells.

4. The Improved ThinSat unit (30) described in claim 1 wherein the radio is selected from the group consisting of a simplex radio and a duplex radio.

5. The Improved ThinSat unit (30) described in claim 1 further comprising a solar circuit with an updated circuitry component which is configured to prevent current loops.

6. The Improved ThinSat unit (30) described in claim 1 further comprising a second GPS receiver.

7. The Improved ThinSat unit (30) described in claim 1 wherein the aluminum frame is further comprising at least five sensor ports wherein each of the sensor ports having access to space outside.

8. The Improved ThinSat unit (30) described in claim 1 further comprising a ground station and a full mission support system.

9. The Improved ThinSat unit (30) described in claim 1 further comprising a Langmuir probe.

10. The Improved ThinSat unit (30) described in claim 1 wherein the series of electronic sensors is selected from the group consisting of a temperature sensor, a particle sensor a light sensor, an IR sensor, a decommissioning sensor, and an earth/horizon sensor.

11. The Improved ThinSat unit (30) described in claim 1 further comprising a camera.

12. The Improved ThinSat unit (30) described in claim 1 further comprising a flipper box mounted as an array with the enclosed volume of the satellite configured to carry additional components.

13. The Improved ThinSat unit (12) described in claim 12 wherein one of the components includes a drag array for de-orbiting.

14. The Improved ThinSat unit (30) described in claim 1 further comprising a backup, redundant radio.

15. An Improved ThinSat unit (30) is comprised of:
(a) a pair of thin patch (PCB) fastened on each side of an aluminum frame;
(b) a Battery;
(c) an electrical power system (EPS);
(d) a data processor;
(e) a Global Positioning System (GPS) and a pair of GPS receivers;
(f) a pair of antennas;
(g) a set of inhibitors;
(h) a set of wiring harnesses;
(i) a duplex radio;
(j) a fanfold array structure of a group of multiple solar cells whereby the multiple solar cells provide a duplicity of power from the fanfold array structure of the group of multiple solar cells;
(k) a series of electronic sensors;
(l) a selected payload in a specified payload zone/section;
(m) a solar circuit with an updated component to prevent current loops;
(n) at least five sensor ports with access to space outside;
(o) a Zenith Pointing Via an Eyestar® radio;
(p) an unibody design with EMI radiation shielding;
(q) a Langmuir probe;
(r) a camera; and
(s) a flipper box mounted as an array with a volume to carry additional components including a drag array for de-orbiting wherein the improved ThinSat unit has a thinner and wider design evolved to maximize a surface for an enclosed volume of a satellite which allows a set of solar arrays to be mounted on front and back; wherein the aluminum frame is clamped between the pair of thin patch PCBs which permits an electrical design to be greatly simplified for a connector and interface between the pair of thin patch PCBs; wherein an inner volume of the satellite is divided into two sections, separated by an aluminum wall whereby one section is the specified payload zone/section and a second/other section is a NSL as the payload zone/section and a NSL Bus section which permits one half of the inner volume of the satellite to be available for the payload zone and another half to be useable completely by the NSL Bus section and a group of electronics, which further simplifies an electrical and a mechanical interface; wherein the payload has a set of multiple ports that provide an unobstructed access and view of space, the payload section has a set of two circular ports along a side of the aluminum frame, and the payload section has a set of three larger ports on a larger face of one of the PCBs; wherein the Improved ThinSat unit (30) enables a group of opportunities for research, education, and product development; and, wherein the Improved ThinSat unit (30) provides a design that is a cost effective means of getting research into space and a good way for short term sensor testing, for ground station calibration, and for short-term educational and commercial missions.

16. The Improved ThinSat unit (15) described in claim 15 wherein the Improved Thinsat unit is a fanfold array structure whereby a multiple of the fanfold array structures can be linked in order to form a constellation of multiple satellites.

17. The Improved ThinSat unit (15) described in claim 15 wherein the series of sensors is selected from the group consisting of a temperature sensor, a particle sensor a light sensor, an IR sensor, a decommissioning sensor, and an earth/horizon sensor.

* * * * *